United States Patent [19]

Stehman

[11] 4,259,549

[45] Mar. 31, 1981

[54] DIALED NUMBER TO FUNCTION TRANSLATOR FOR TELECOMMUNICATIONS SWITCHING SYSTEM CONTROL COMPLEX

[75] Inventor: Carl J. Stehman, LaGrange, Ill.

[73] Assignee: Wescom Switching, Inc., Oak Brook, Ill.

[21] Appl. No.: 832,006

[22] Filed: Sep. 9, 1977

Related U.S. Application Data

[63] Continuation-in-part of Ser. No. 734,732, Oct. 21, 1976, abandoned.

[51] Int. Cl.³ .................. H04M 3/38; H04M 3/42; H04Q 3/47; H04Q 3/52
[52] U.S. Cl. .................. 179/18 ES; 179/18 B; 179/18 D; 179/18 ET
[58] Field of Search .......... 179/18 ET, 18 DA, 18 D, 179/18 B, 18 ES, 15 AT, 15 AQ

[56] References Cited

U.S. PATENT DOCUMENTS

| | | | |
|---|---|---|---|
| 3,560,661 | 2/1971 | Kobus et al. | 179/18 ET |
| 3,631,405 | 12/1971 | Hoff et al. | 445/1 |
| 3,721,769 | 3/1973 | Krock et al. | 179/18 AD |
| 3,820,085 | 6/1974 | Zelinski | 179/18 ES X |
| 3,898,621 | 8/1975 | Zelinski et al. | 445/1 |
| 3,969,701 | 7/1976 | Hemdal | 179/18 ES X |
| 3,974,343 | 8/1976 | Cheney et al. | 179/18 ES |
| 3,978,455 | 8/1976 | Valassis et al. | 340/172.5 |
| 3,997,874 | 12/1976 | Kelly et al. | 179/15 AT X |
| 4,010,326 | 3/1977 | Schwartz | 179/15 BA |
| 4,021,783 | 5/1977 | Highberger | 340/172.5 |
| 4,031,328 | 6/1977 | Pitroda | 179/18 BC |
| 4,068,099 | 1/1978 | Mikkola et al. | 179/18 B X |
| 4,074,072 | 2/1978 | Christensen et al. | 179/18 ES X |
| 4,119,805 | 10/1978 | Pratelli | 179/18 FC |

FOREIGN PATENT DOCUMENTS

1958221 5/1971 Fed. Rep. of Germany ......... 179/18 B

Primary Examiner—Thomas W. Brown
Attorney, Agent, or Firm—Leydig, Voit, Osann, Mayer & Holt, Ltd.

[57] ABSTRACT

A telecommunication switching system adapted to be connected to lines and trunks has a digital switching network and a control complex for executing system operational functions by program operated processors in response to dialed numbers received from stations in separate customer groups. Customer groups are groups of stations on discrete sets of lines served by the system, all customer groups sharing the hardware forming said switching system while all operational functions are normally separately executed for each customer group in response to dialed numbers included within a separate comprehensive number plan for each customer group. Representative system operational functions include processing standard calls between stations on lines in the same customer group and processing conference calls between multiple stations. The control complex provides a dialed number to function translator in the form of addressable data base memory which provides function-instruction data in a multiple level table structure of separate groups of locations for each customer group of stations, each location having coded electrical signals representing an identifier word including an instruction to execute one system operational function. The data base memory also provides restricted class of service information among customer groups. The processors address locations in memory fields in response to coded electrical signals representing an originating station, and address locations in the table structure in response to the combination of coded electrical signals representing a dialed number received from said originating station and those identifying the customer group of said originating station.

35 Claims, 25 Drawing Figures

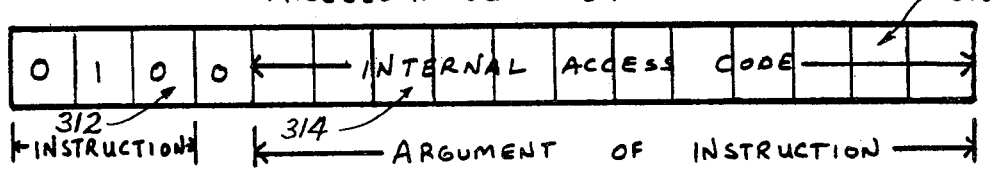
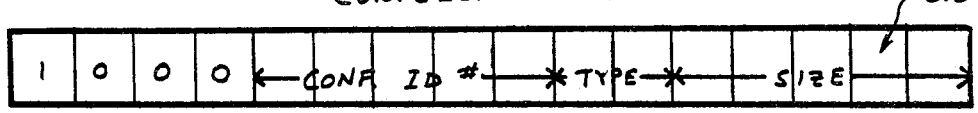
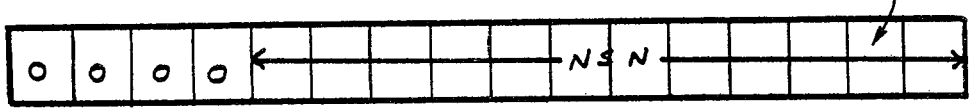
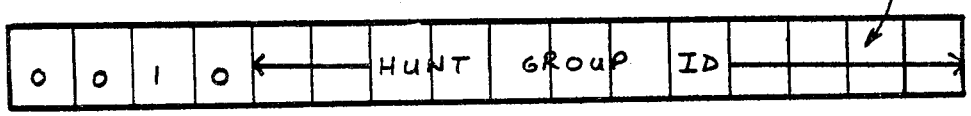
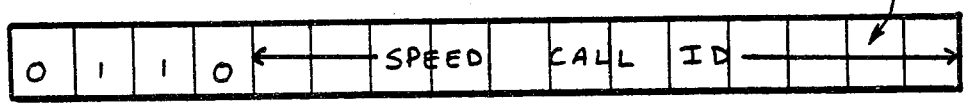
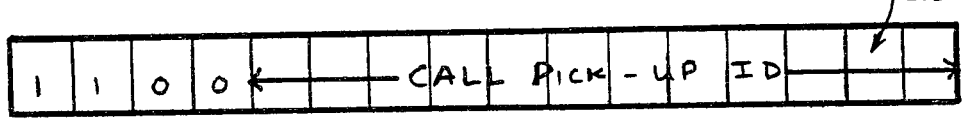
Fig. 5.

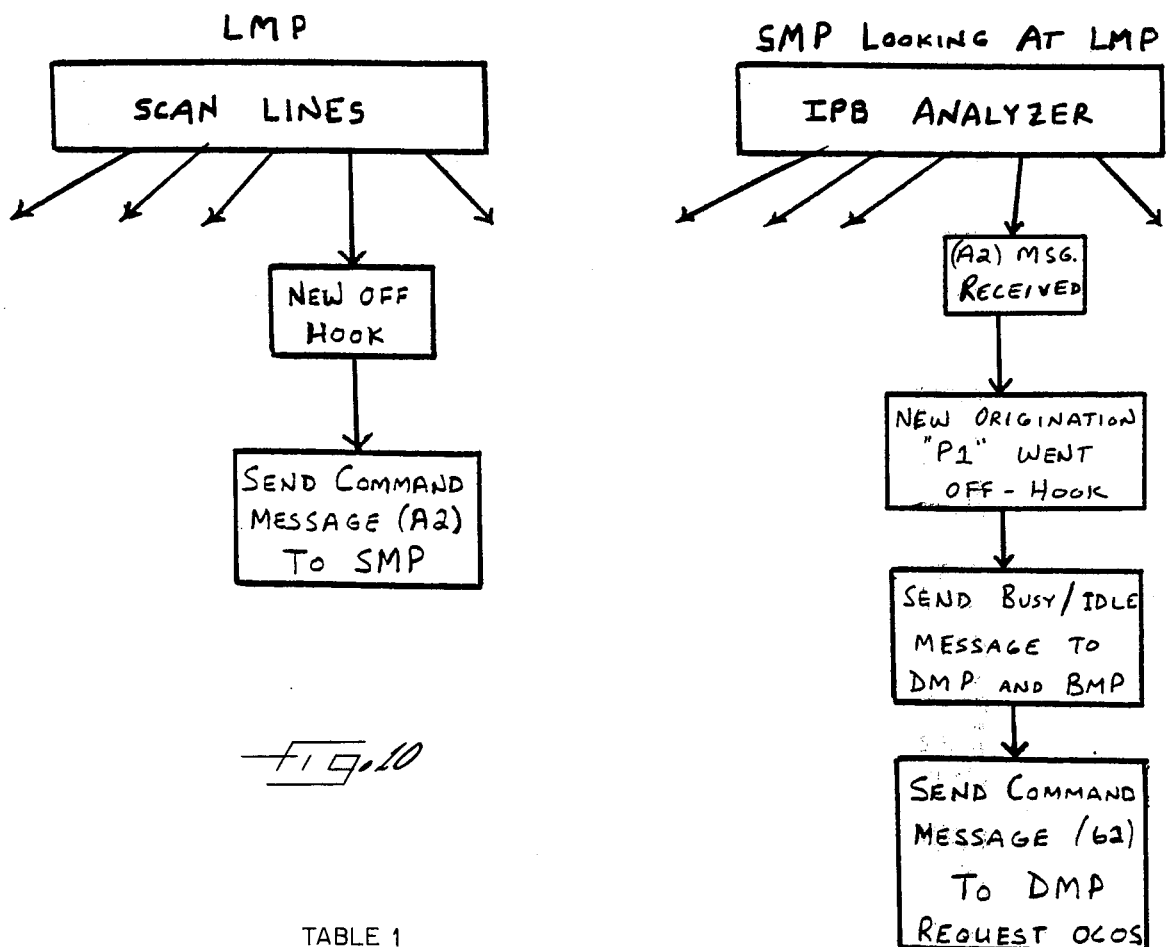

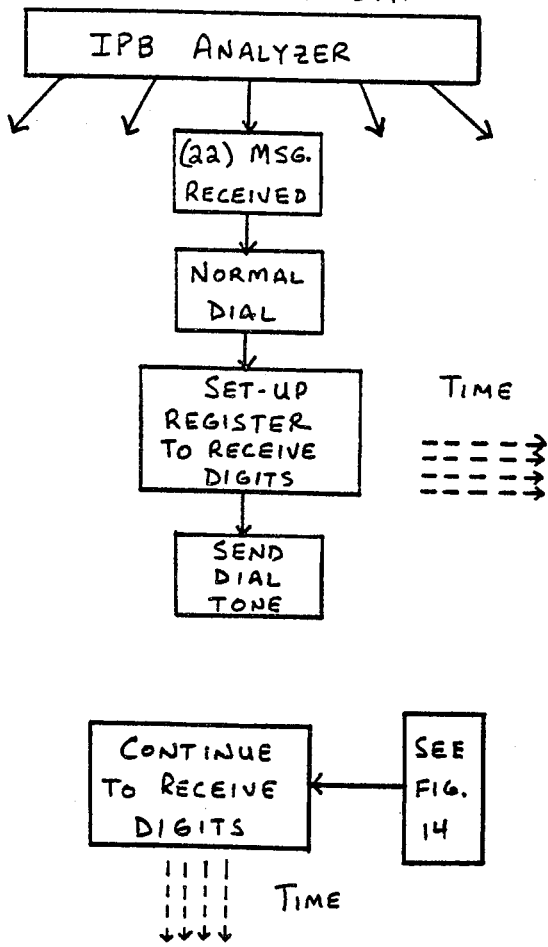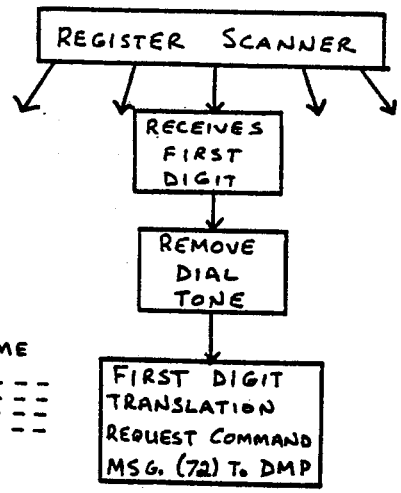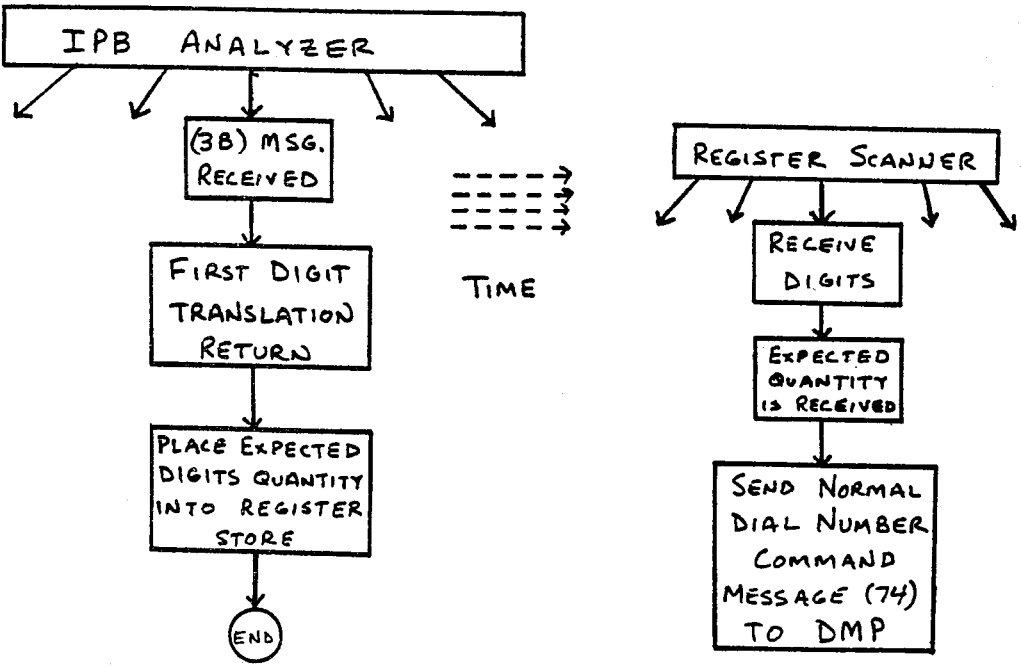
Fig. 15.

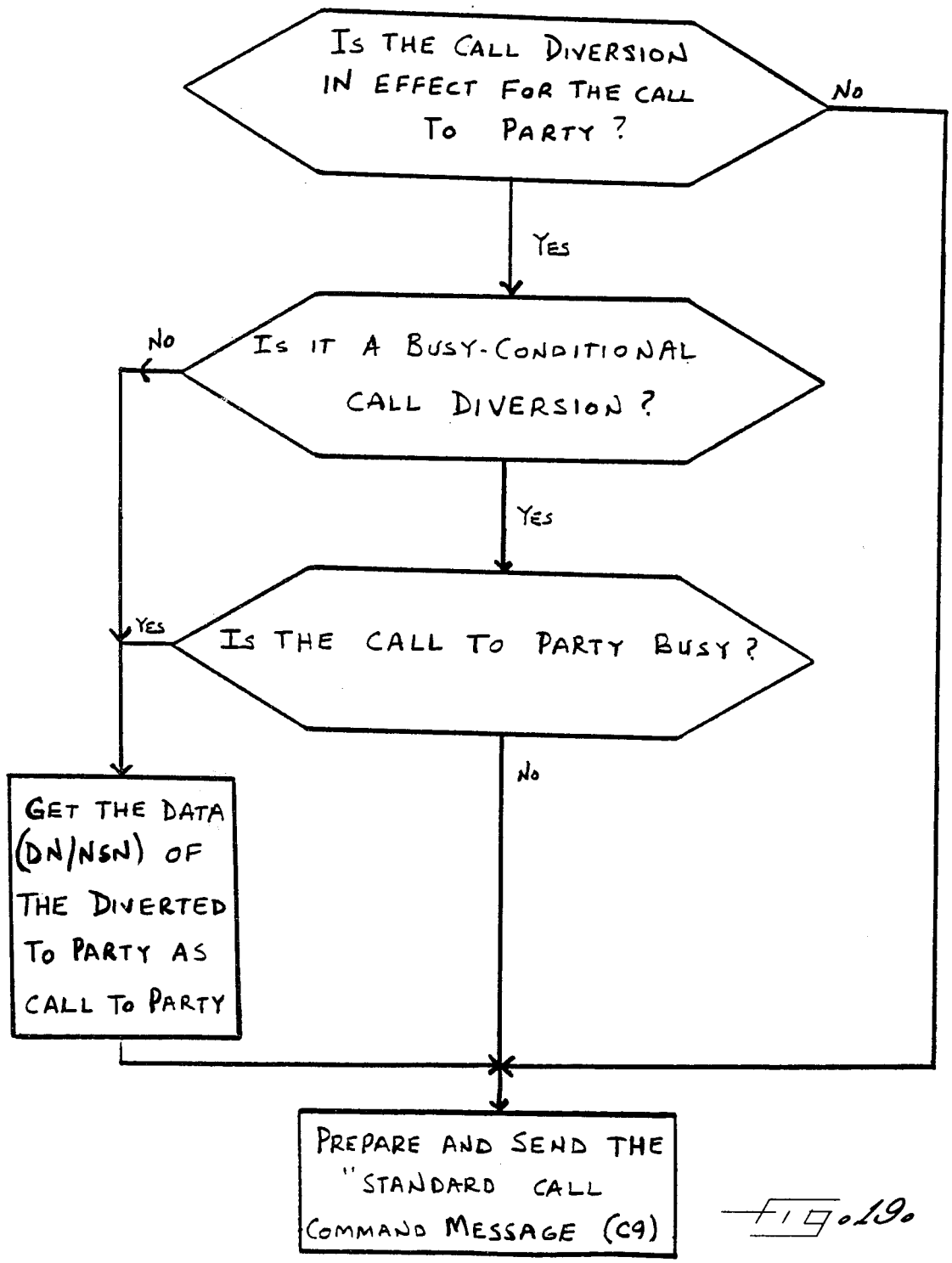

DIALED NUMBER TO FUNCTION TRANSLATOR FOR TELECOMMUNICATIONS SWITCHING SYSTEM CONTROL COMPLEX

This is a continuation-in-part of Carl J. Stehman et al. Application Ser. No. 734,732, filed Oct. 21, 1976, now abandoned.

BACKGROUND OF THE INVENTION

This invention relates to microprocessors in a control complex of the type which finds application in controlling the operation of a telecommunications switching system, and more particularly to the implementation of such a control complex so that a dialed number from a station served by the system results in the performance by the control complex of a designated system function.

Telephone switching systems have evolved to include various forms of computerized common controls of the programmable or stored program variety. Conventionally the computerized controls have been configured as multi-task monoprocessors with the result being the need to implement relatively complex control tasks and memory configurations. One of the characteristics of the monoprocessor approach is the need for an executive program or an executive processor for controlling system operations. Typically this results in a program which is interrupt driven thereby requiring a potentially complex hierarchy for the various interrupts. Moreover it is generally necessary to queue work for the purpose of distributing the real time work load of the processor. The resultant complexity of the programming task will be apparent from the foregoing, not only as it applies to initially generating and debugging the programs, but also in maintaining the system should a fault develop.

The present invention is related to and has particular utility when used in telecommunication switching system as described in the co-pending application Ser. No. 842,091 entitled Microprocessor Control Complex which has a multiprocessor control complex to provide distributed call processing. With such a control complex, the call processing functions are distributed among the processors in the complex in such a way as to modularize the control functions and simplify the programming.

While said co-pending applications are addressed to the overall configuration and hardware implementation of the control complex, and particularly the construction and operation under program control of the distributed processors which execute the operational functions of the system, as well as the interrelationship between the control complex and other portions of the switching system such as the digital switching network, the invention disclosed in the present patent application is primarily concerned with the provision in such a control complex of memory stores for the data base utilized by the processors in carrying out distinct, separate and widely varied operational functions under the direction of distinct and separate programs.

It is a fundamental characteristic of the telecommunication switching systems in which this invention is incorporated, that a directory number dialed at an originating station served by the system results in a certain pre-assigned function being performed by the system.

The primary object of the present invention is to provide memory structure and data organization for data utilized both in the invoking of programs for and carrying out of such programs by the processors of the control complex to execute designated operational functions in response to dialed directly numbers.

Another object is to provide a telecommunications switching system which requires no fixed numbering plan, but rather, permits a free and unconstrained numbering plan to be used, allowing, in essence, any one or more numbers in the numbering plan to call for the performance of a designated system function.

According to a further aspect of the invention, it is an object to economically implement telecommunications switching systems by configuring the control complex wherein the processors are commercially available microprocessor circuits and the data memory is provided by commercially available RAM circuits. Furthermore, an object is to simplify the structure of such a control complex by providing one of the microprocessors with its own program memory and also with the data base memory stores for the entire system.

While not limited to a telecommunication switching system having a multiprocessor implemented control complex, the present invention has particular utility in such a control complex, where a plurality of microprocessor control units are provided, each having a microprocessor and associated memory means. The various microprocessors are programmed to perform a portion of the total function of the switching system, so that the total function is distributed among the microprocessors. With this arrangement each microprocessor control unit may continue to perform the functions assigned to it independently and asynchronously of the other control units. Of course, it is necessary to transfer data between the control units for performance of the total switching function. To minimize the amount of time spent in interprocessor communication, and to decrease system complexity due to such communication, each microprocessor control unit is provided with an interprocessor buffer for receiving data from the associated microprocessor and for communicating data to the associated microprocessor. Means are provided for exchanging data between selected ones of the interprocessor buffers asynchronously of at least one of the associated microprocessors so that the microprocessors may continue to operate under program control while the buffers exchange data relatively independently thereof.

Another important object of the invention is to provide a system which simultaneously serves multiple "customer groups" with the same system hardware. By "customer groups" is meant separate groups of stations, typically on discrete sets of lines, served by the system. From all appearances to the user of the system, he has his own private system, even though a number of other "customer groups" or users are also sharing the same hardware. Thus, the use of the system including use of trunks, use of all features, and all recording and accounting of use is separately handled for each customer group.

A further object is to provide simultaneous service to more than one customer group, each with an independent directory number plan where the numbers used to designate functions in each customer group do not conflict with identical numbers used in another customer group to designate other system functions, yet allow cross-over between customer groups when desired.

While the invention will be described in connection with certain embodiments presently considered to be preferred, there is no intent to limit it to those embodiments. On the contrary, the intent is to cover all alternatives, modifications and equivalents included within the spirit and scope of the invention as defined by the appended claims.

BRIEF DESCRIPTION OF THE DRAWINGS

FIG. 5 illustrates the format of various identifier words found in the lowest level of the directory number table;

FIGS. 10–18 are flow charts illustrating, generally in sequential order, subprogram S executed by various processors and which combine to provide the "standard call" system function; and FIGS. 19–24 are flow charts illustrating, respectively, subprograms for the data base processor for various system functions provided by the system.

FIG. 25 illustrates the length of inter-processor buffers.

DETAILED DESCRIPTION OF THE INVENTION

Figure 1:
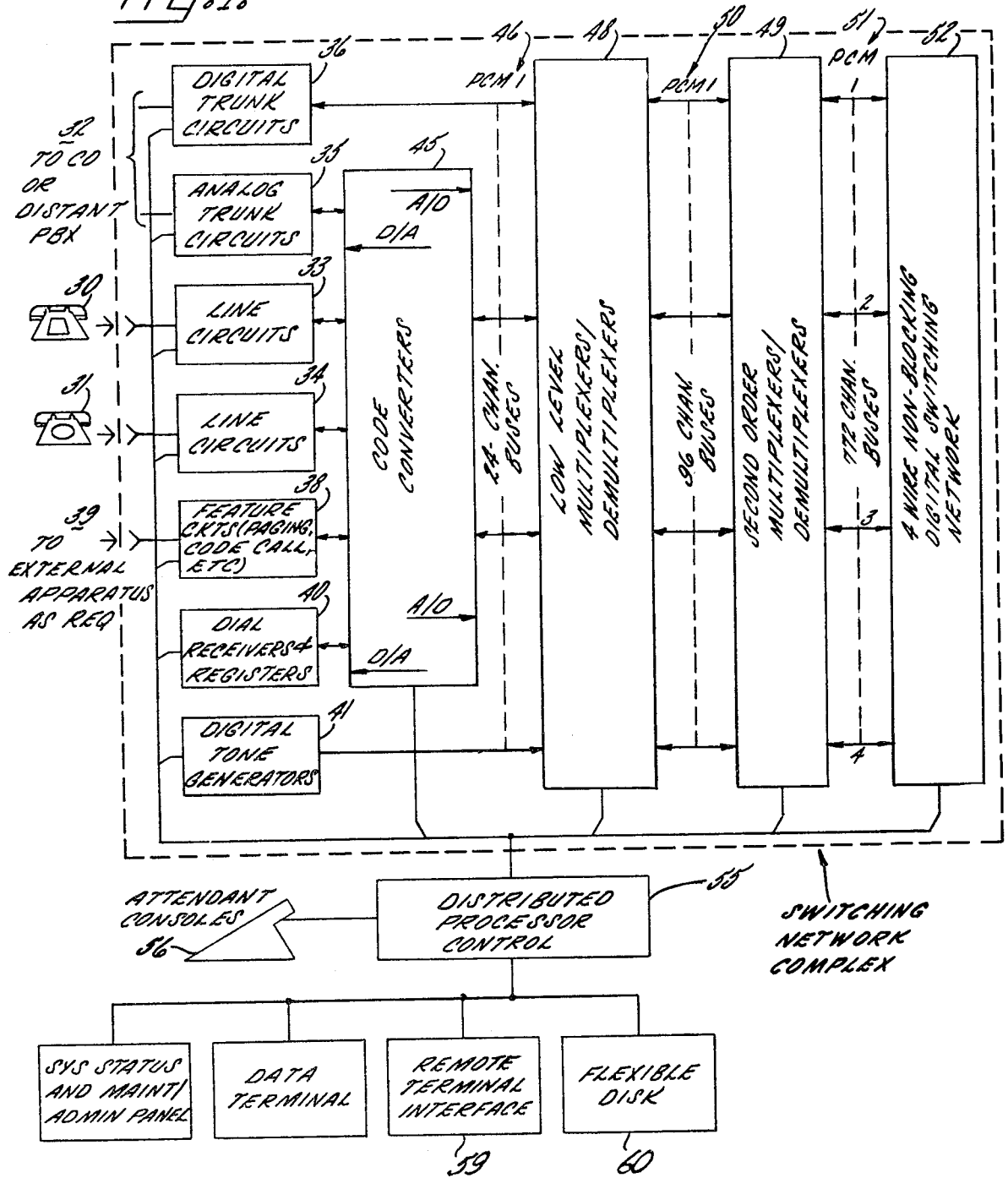
FIG. 1 is an overall block diagram of a telecommunication switching system in which a preferred form of the invention is embodied.

Referring now to FIG. 1, there is shown an overall block diagram of a telecommunications switching system intended to serve as an exemplary environment for the control complex including data processor means and memory structure and organization of the present invention. The system is adapted for connection to a plurality of lines represented by telephone instruments 30, 31, and also to a plurality of trunks generally indicated at 32.

Switching Network Complex

Included within the block labeled switching network complex are circuit blocks generally representing the circuit components of the complex. Thus, circuitry is provided to interface the lines and trunks to the switching system, such circuitry being represented by line circuits 33, 34, analog trunk circuits 35 and digital trunk circuits 36. Since the switching system is of the four wire variety, the line circuits 33, 34 and the analog trunk circuit 35 include hybrids for converting the two wire line signals to four wire for use by the switching system. Additionally, and as will be explained in greater detail below, the line circuits, 33, 34 and the trunk circuits 35 include appropriate sense points for indicating the status of the lines or trunks to which they are connected and also appropriate control points for allowing the switching system to control the status thereof. The digital trunk circuits 36 are shown for sake of completeness. Such circuits are intended to directly interface a T1 digital line to the switching system without the need for code conversion of any sort.

In addition to establishing and maintaining the "standard call" connections between lines and trunks, the system is capable of providing additional functions, such being represented by element 38. For example, the system may be configured to carry out, as optional functions, paging, code call, multi-port conferences and the like. Additional apparatus as required, for example audio equipment for use with the paging function is indicated generally at 39. One of the principal aspects of this invention is the configuration of the data base memory portion of the control complex that provides the requisite data for the control complex to perform these optional functions, as well as the standard cell function.

Means are provided for receiving and storing dialed digits used by the control complex in establishing connections between the lines and trunks as required. Such equipment, generally indicated at 40, may include both dial pulse receivers and DTMF receivers, the general term dial receivers being used to encompass both. In addition, the equipment includes registers for storing the digits as they are received.

In order to inform the user of the response of the system to his request, progress tones are required, such tones in the instant embodiment being produced by digital tone generators 41. The tones produced by such generators include dial tone, ring back, busy tone and the like. While analog tone generators may be utilized, the digital tone generators 41 of the instant embodiment eliminate the need for code conversion, and are therefore directly compatible with the switching system.

As noted above, the switching system is configured as a four wire digital system and therefore requires conversion between the analog information on the trunks, lines and the like to digital format. To that end, a plurality of code converters are provided indicated generally at 45. In the preferred embodiment the digital code utilized is compatible with North American Industry standards, utilizing an eight-bit format, a 1.544 megabit transmission rate and compression with $\mu$ equal to 255. As a result, the code converter block 45 may be comprised of a plurality of rather conventional T1 PCM code converters, each capable of handling 24 channels, and each providing analog to digital conversion in the direction toward the network and digital to analog conversion in the direction toward the lines and trunks. A practical embodiment of the illustrated switching system was configured to handle a maximum capacity of 3088 channels, 3072 active channels and 16 lost to framing. Such a system would require approximately 128 code converters, each capable of handling 24 channels, thereby providing at the output of the code converters 45 a plurality of 128 serial PCM buses 46, each carrying bidirectional information for 24 channels, [Note that the 24 channel buses are serial.]

In order to properly route the coded signal samples from the lines to the network for efficient switching, and from the network to the lines for distribution, a pair of multiplexers are provided, indicated as first order or low level multiplexer 48 and second order or high level multiplexer 49. The low level multiplexer 48 arranges the incoming information from the code converters into 32 buses 50 each carrying serial information for 96 channels. The high level demultiplexer performs the complementary function in the opposite direction. The high level multiplexer 49 receives the information on the 32 incoming buses, converts it to parallel and arranges it on four parallel buses 51 each carrying information for 772 channels. The high level demultiplexer performs the complementary function in the opposite direction. The four 772 channel buses are provided to the four wire non-blocking digital switching network 52 which serves to switch in time information from selected channels for the purpose of completing connections between those channels.

The configuration of the digital switching network itself is known, being explained, for example, in "A Review of Telecommunications Switching Concept-Part 1" and Part 2 thereof, published in Telecommunications February 1976 and March 1976, respectively. Suffice it to say that the network, or each block thereof includes an information memory having individually addressable locations for each channel in the system. Information received and processed through the code converters is multiplexed onto the appropriate busses where such channel occupies an indicated time slot. This information is sequentially written into the dedicated memory locations, with all samples being updated each 125 microseconds. For the purpose of making connections, the network, or each block thereof includes one or preferably two connection memories, each having an addressable location dedicated to each channel in the system. A connection is established by writing into the slot in the connection memory the address of another channel to which that slot is to be connected. Thereafter, during the time slot for the first channel the information memory is written with the data from that channel and also data is read out of the information memory at the address established by the connection memory, thereby placing the sample from the second channel into the time slot for the first channel for return to the first channel. Subsequently during the occurrence of the time slot for the second channel a similar occurrence takes place with the result being that samples from the two channels are swapped in time causing the first channel to receive samples from the second channel and vice-versa. In short, a communication path is established.

In order to efficiently accommodate the 3072 channels, the network is preferably broken into four blocks. Each block writes information to only one-fourth of the total number of channels, that is 772 channels. However, to provide full availability, information from each channel is written into each of the four blocks.

Control Complex

The interaction between the elements of the system described thus far are under the control of the distributed processor control complex 55. The control complex detects requests for service from lines, trunks and the like, determines available class of service for those elements and completes connections in the network. To that end the distributed processor control complex 55 has circuit connections to the line circuits 33, 34, and specifically to sense points thereof for detecting the on hook or off hook condition of the lines and changes between such conditions, and to control points thereof for starting or terminating ringing to selected lines. The complex 55 also has circuit connections to the trunks, and specifically to the sense points for detecting the conditions thereof and to control points for controlling such conditions. Similar connections are provided to the feature circuits 38. The complex 55 also has circuit connections to the dial receivers and registers 40 to cause those receivers to collect dialed digits, and to receive the collected digits for the purpose of completing connections. The complex 55 also has circuit connections to digital tone generators 41, the code converters 45 and the multiplexers 48, 49. Connections are also provided between the complex 55 and the network 52 for allowing the complex to write addresses into the connection memories for the purpose of establishing connections.

The system also makes provision for attendant consoles 56 which typically include an array of indicators or readouts for informing an attendant of system conditions combined with an array of pushbuttons for allowing the attendant to cause the system to perform specific functions.

Finally, for the sake of completeness, additional elements are shown connected to the distributed processor complex 55, including a system status and maintenance administration panel, generally located in the equipment frame for informing a craftsperson of the operational status of the equipment. A data terminal provides a port for entry of information into the system, such as for changing number assignments, and for read-out of information from the system, such as traffic information or the like. A remote terminal interface 59 allows the processor control 55 to be accessed from a remote location for the purpose of trouble-shooting or updating of the program. Finally, a flexible disc 60 contains the operating program for the system, and may be automatically actuated to reload the program in the event of a major system failure.

In summary, each line circuit (a practical embodiment of the system provides for 2400 maximum), each trunk circuit (the same practical embodiment provides for 576 maximum) and each register (illustratively, sixty-four) occupies a dedicated channel on one of the code converters within converter module 45. Those channels are multiplexed through multiplexers 48 and 49 such that ultimately each line, trunk, register or tone occupies a dedicated channel on one of the 772 channel network buses. Each dedicated channel of the network busses is identified by a network slot number that represents the position on the bit stream of the time slot for the respective channel and the network block which receives the information on the channel. During a simplified call processing routine, the control processor 55 detects through the sense points a subscriber off hook condition while scanning the array of sense points. Upon detection of the off hook, the call processor ultimately establishes network-through-connections by writing corresponding addresses into the connection memories in the network. The PCM encoded samples received from the lines, trunks, or the like are exchanged between called and calling subscribers every 125 microseconds. When the network-through-connection is established by the processor, the network memories accept the PCM encoded samples from subscriber A during subscriber A's dedicated time slot and store that sample until the occurrence of the subscriber B time slot. Thereupon as the network memories and connection memories pass on the PCM encoded sample of subscriber A and accept for storage the PCM encoded sample of subscriber B to be passed on during the reoccurrence of the subscriber A time slot. This action continues independently of the processor until a call termination or other action is sensed whereupon the connection may be cancelled or altered via a further writing of addresses into the network connection memories.

Distributed Microprocessors

Figure 2:
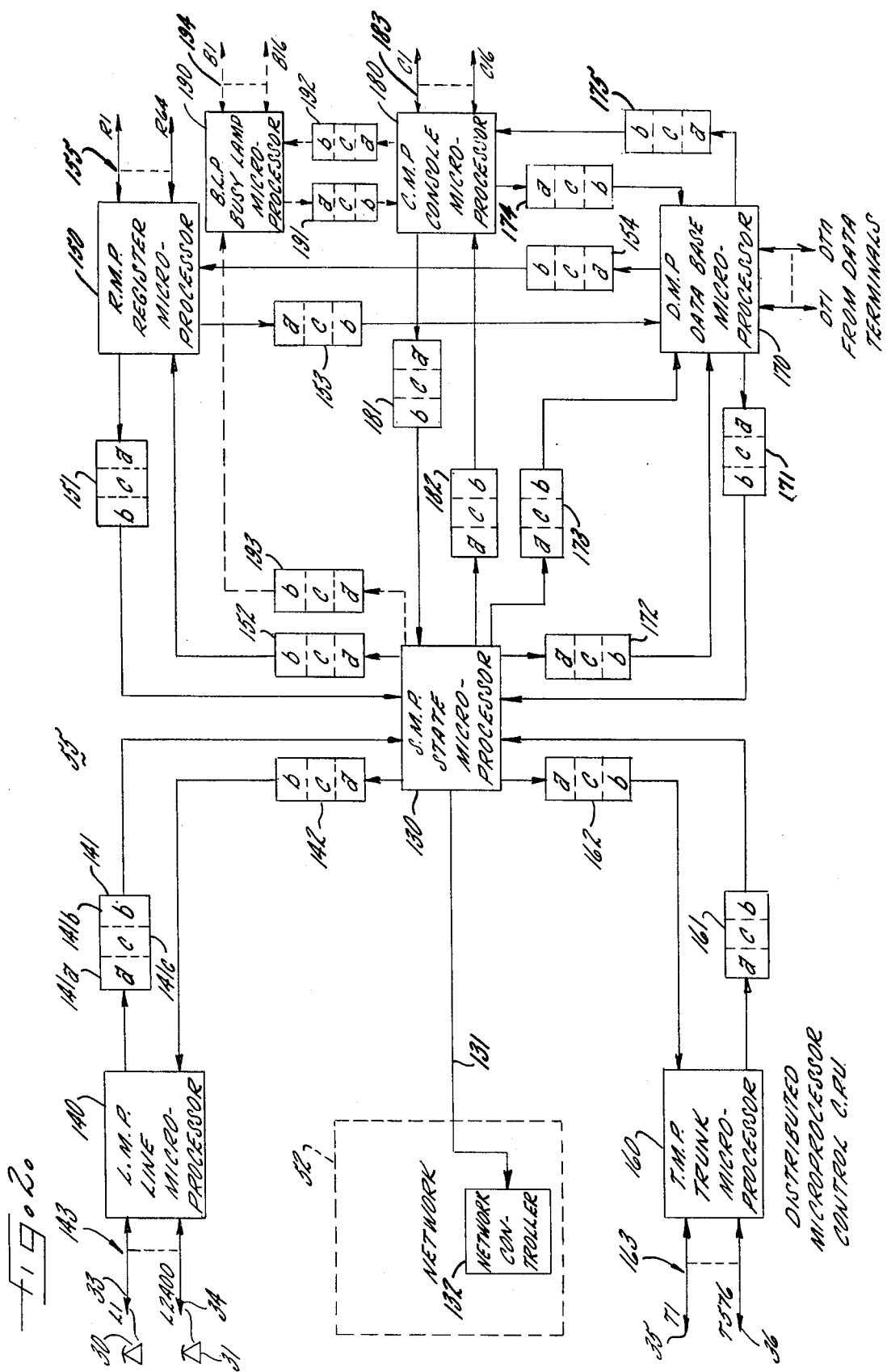
FIG. 2 is a schematic diagram showing the arrangement of the distributed processors of the control complex portion of the system illustrated in FIG. 1.

Turning now to FIG. 2, the microprocessor control complex 55 is shown in greater detail, illustrating the system architecture. The complex 55 which, taken as a whole, controls all of the functions of the switching exchange, distributes those functions among a plurality of microprocessor controls, in the exemplary embodiment of FIG. 2 comprising state microprocessor control 130, line microprocessor control 140, register microprocessor control 150, trunk microprocessor control 160, data base microprocessor control 170, console microprocessor control 180 and busy lamp microprocessor control 190. It should be noted at the outset that this particular distribution of microprocessor controllers, while preferred, is merely exemplary and that in some conditions the switching functions may be distributed in a different manner. For example, in a smaller system the functions of the line and trunk microprocessor controls might be combined to eliminate one of such controls. Additionally, the busy lamp microprocessor 190 is illustrated by dashed connections, indicating that such microprocessor is optional, and is used only when an auxiliary busy lamp field is provided with the attendant console.

In contradistinction to conventional monoprocessor configurations wherein the sub-units communicate via a common bus under the control of an executive, the microprocessor controls of FIG. 2 are interconnected via dedicated communication channels joining partner processors such that the partners can exchange information as necessary while operating asynchronously of each other. Thus the processors can each be provided with their own clock which need not be phase locked to the clocks of the other processors. In addition, the interactions between the programs of the respective processors are greatly simplified.

Alternative Embodiment—Single Processor

A practical, alternative embodiment of the invention has been constructed in which a single processor is utilized in the control complex 55 to carry out the functions performed by the multi-processors as herein shown and described. In that alternative embodiment, essentially the same division of tasks disclosed herein to carry out a total system function was achieved by operating the single microprocessor in separate program controlled modes corresponding, substantially, to the modes the individual and discrete microprocessors of the complex 55 are operated uner their individual program control. Thus, it was possible to utilize the same programming approach with the single microprocessor control complex 55, and in many cases to utilize the same programs of the multiple levels herein described and shown.

The practical embodiment of the invention utilizing the single microprocessor control complex 55, was constructed to serve fewer trunks and lines than the system described herein and to provide fewer functions and features. Nevertheless, the alternative embodiment of the invention provided a highly practical multi-featured system at relatively lower cost.

Multi-Processor Embodiment—Interprocessor Buffers IPBs

In the illustrated preferred embodiment whose multi-processors are utilized having communication paths between partner processors, such communication paths are provided by means of interprocessor buffers which function as asynchronous simplex communication channels which have a limited amount of storage capacity for data being transmitted between partner processors. Such channels are provided only between processors which have a need to communicate. Thus, the line microprocessor which must communicate only with the state microprocessor has a first interprocessor buffer 141 for carrying data from the line to the state microprocessor controller and a second interprocessor buffer 142 for carrying data in the reverse direction. Because the interprocessor buffers are alternately under the control of the sending and receiving microprocessors, depending on whether it is accepting data from the sending processor transmitting data to the receiving processor, each buffer may be thought of as comprising a sender buffer and receiver buffer. This is illustrated, for example, by interprocessor buffer 141 having sender section 141a connected to the line microprocessor and receiver section 141b connected to the state microprocessor. As noted above the interprocessor buffer includes a limited amount of storage for data being transferred. Because it is convenient to use the same storage for both the send and receive side buffers, it is useful to think of each buffer as having a third section, for example section 141c as memory means accessible to both send control 141a and receive control 141b. To that end each of the interprocessor buffers illustrated on FIG. 2 is shown as a rectangle with internal dotted divisional lines providing send side control a, receive side control b and intermediate memory means c.

Line Microprocessor—LMP

Referring now in greater detail to the illustrated architecture of the control complex of FIG. 2, it is seen that the line microprocessor 140 is provided with bidirectional communication paths 141, 142 for communicating with the state microprocessor 130. In the illustrated configuration the line microprocessor 140 need not communicate with any of the other microprocessors. The function of the line microprocessor is to service the line circuits by detecting requests for service and communicating those requests to other processors of the control complex, and by exerting some control over the line circuit, in the illustrated embodiment such control being the initiation or termination of ringing on the lines. To that end the line microprocessor 140 has circuit connections to the line circuits 33, 34 to which the telephone instruments 30, 31 are connected. The two illustrated line circuits and telephone instruments represent the entire range of lines which the system may service, that fact being indicated by designating the line circuits as L1-L2400, showing that the system is capable of handling up to 2400 lines. The circuit connections to the line circuits are specifically an array of sense and control points which the microprocessor is capable of addressing as memory. In other words, a block of addresses of the line microprocessor 140 are dedicated to line circuits, and when the microprocessor addresses any location within that block, it is then in communication with the sense or control points rather than actual memory. As will be described in greater detail below, the sense points are controlled by the respective line circuits to indicate the status of the associated line. The line microprocessor continues to scan the sense points to detect significant changes of state, and to communicate such state changes to the state microprocessor via the interprocessor buffer 142. As a result, the system is capable of detecting requests for service, call terminations, hook switch flashes, dial pulses and the like.

The circuit connections 143 are illustrated as bidirectional, indicating that the line microprocessor is also capable of sending data to the line circuits. In the illustrated embodiment, this feature is used to control ringing in the lines. When the control complex determines that a particular line is to be rung, that fact is communicated to the line microprocessor 140 by the state microprocessor 130 via the interprocessor buffer 141. The line microprocessor 140 responds by addressing the word including the line circuit of interest and writing the control point of the particular line circuit in that word which sets a latch to apply an external ringing generator to that line. The line microprocessor continues to perform other tasks while the line is being rung. if the party answers, the line circuit detects the on hook to off hook transition during the normal scanning of the sense points just as the initial request for service was detected. It communicates that fact to the state microprocessor and it also writes the appropriate control point ringing from the line. Although the description of that operation might take some moments to read, the operation itself is carried out almost instantaneously.

Trunk Microprocessor—TMP

For performing operations analogous to those of the line circuit for the trunks in the system, the trunk microprocessor 160 is provided with bidirectional communication paths 161, 162 to the state processor and bidirectional circuit connections 163 to sense and control points in the trunk circuits 35, 36. Just as with the sense and control points of the line circuits, the sense and control points of the trunk circuits are addressable as memory, and blocks of memory for the microprocessor are dedicated to such sense and control points. Because trunk operation is somewhat more complex than line operation, each trunk circuit has four sense and four control points. Accordingly, if the sense and control points are configured as eight bit words as in a line circuit, each word will accomodate only two trunks.

The trunk microprocessor 160 continually scans the sense points via circuit connections 163 to detect significant sense point transistors. Upon detection of such a transition, an appropriate control message is configured and relayed to the state processor 130 via interprocessor buffer 161. Because of the wide variety of trunk types and signaling protocols, the trunk microprocessor must reduce all trunk signaling for any trunk type to a common set of standard messages such as trunk disconnect, stop dial, etc. Upon receipt of such a message the state processor 130 determines the appropriate action, configures an appropriate control message to carry out such action, and communicates such control message to the trunk microprocessor 160 via the interprocessor buffer 162. The trunk microprocessor 160 responds by writing the appropriate control point of the trunk in question via the circuit connections 163.

Register Microprocessor—RMP

As noted previously, the system includes a plurality of dial receivers and registers for receiving dialed information from the various network ports by way of the network. For receiving and analyzing dialed information, a register microprocessor 150 is provided having bidirectional communication paths provided by interprocessor buffers 151-154, and circuit connection 155 to the registers in the system. When the state microprocessor 130 determines that dialed digits are to be received, after connecting an idle receiver to the appropriate port, it sends a message to the register processor via the interprocessor buffer 152 defining the type of digits to be collected. The register processor monitors the receiver dial pulses or DTMF tones via the circuit connection 155 until the first digit is recorded. Once recorded, the first digit is sent to the data base processor via the interprocessor buffer 153 with a request for a first digit translation to define the number of digits to be received. The register processor 150 continues to receive digits and awaits a reply message from the data base microprocessor which is communicated via the interprocessor buffer 154. The register processor takes in the expected digits, and after all digits have been received sends them along with identifying information to the data base processor via the interprocessor buffer 153. Thereupon the data base processor communicates with the state processor 130 for completing the connection.

State Microprocessor—SMP

As can be appreciated from the previous mentions of the state microprocessor control 130 in connection with description of the other microprocessor controls, the state microprocessor control is a focal point of the control complex in that it communicates with each of the other microprocessor controllers. The state microprocessor maintains a record of the current state of activity of each line, trunk and register in the system. Incoming interprocessor buffer messages from the various controllers inform the state microprocessor of progress by devices in the system. As a generality, the state microprocessor considers the current state of a device and the devices to which it is connected, the current incoming interprocessor buffer message, and the relevant class of service information to determine what next state the device in question should acquire. Having determined the next state, it accomplishes that either through appropriate interprocessor buffer messages to the partner processor processors, or by way of establishing connections in the network. The state microprocessor has circuit connections indicated at 131 to the network 52, and specifically to network controller 152 which is illustrated as a portion of the network. The network controller 152 serves to interface the state microprocessor output lines to the network, and specifically to the connection memories. The network is thus available to the state microprocessor and addressable as memory. The state microprocessor writes appropriate messages in the connection memories described above in order to make connections between the ports in the system.

Console Microprocessor—CMP

For interfacing the control complex to one or more attendant consoles, up to a maximum of 16, circuit connections indicated at 183 are provided interconnecting such consoles to the console microprocessor 180. It should be noted in passing that attendant consoles are not necessary to the operation of the system but are provided only when desired. The console microprocessor receives messages corresponding to button pushes at the attendant consoles via the circuit connections 183, analyzes the messages, returns messages that will light appropriate lamps on the attendant consoles via the circuit connections 183. In addition, the console microprocessor sends commands to the state processor 130 via the interprocessor buffer 181 to keep the state processor properly informed of device states, and to request the state processor to make appropriate connections. The console microprocessor 180 also receives messages from the state processor 130 via interprocessor buffer 182, such commands by the state processor directing the console processor to attend certain calls.

The console microprocessor also communicates with the data base microprocessor 170 via interprocessor buffer 174, for example to request class of serfice information, and receives messages from the data base microprocessor via the interprocessor buffer 175, for example, responses to class of service requests.

Busy Lamp Microprocessor—BMP

It was noted above that an optional busy lamp field may be provided with the attendant's console to indicate the status and allow direct station selection for selected ones of the system lines within particular groups. To accomplish that it is necessary to provide communications between the busy lamp microprocessor 190 and the console microprocessor 180, such communications being accomplished via interprocessor buffer 191 communicating requests by the busy lamp microprocessor to the console microprocessor, and by interprocessor buffer 192 communicating requests or messages in the opposite direction. In addition, the busy lamp microprocessor has simplex communication with the state microprocessor via the interprocessor buffer 193, such buffer allowing the state microprocessor to issue busy/idle information to the busy lamp microprocessor. The busy lamp microprocessor has circuit connections 194 to the busy lamp field/direct station select consoles, the connections 194 indicating that up to 16 busy lamp field consoles may be provided.

It is noted in summary that the control complex architecture described above simplifies both programming and communication between processors in the distrbuted complex by providing dedicated channels only to processors which must intercommunicate. In the simple case of the line or trunk microprocessors, communication is provided only between such processor and the state microprocessor. In that case, two interprocessor buffers are required one to route information in each direction. The interrelationship between the register, data base and state microprocessors, detailed more fully hereinafter, indicates a more complex situation where the register and data base microprocessors must communicate not only with the state microprocessor, but also with each other. The bus structure described in detail above serves to accomplish this function. Also worthy of note are the interprocessor buffers 172 and 173 which both communicate data from the state microprocessor to the data base microprocessor, indicating that more than one such buffer may be provided to assure adequate communication over a path expected to be busy.

Figure 6:
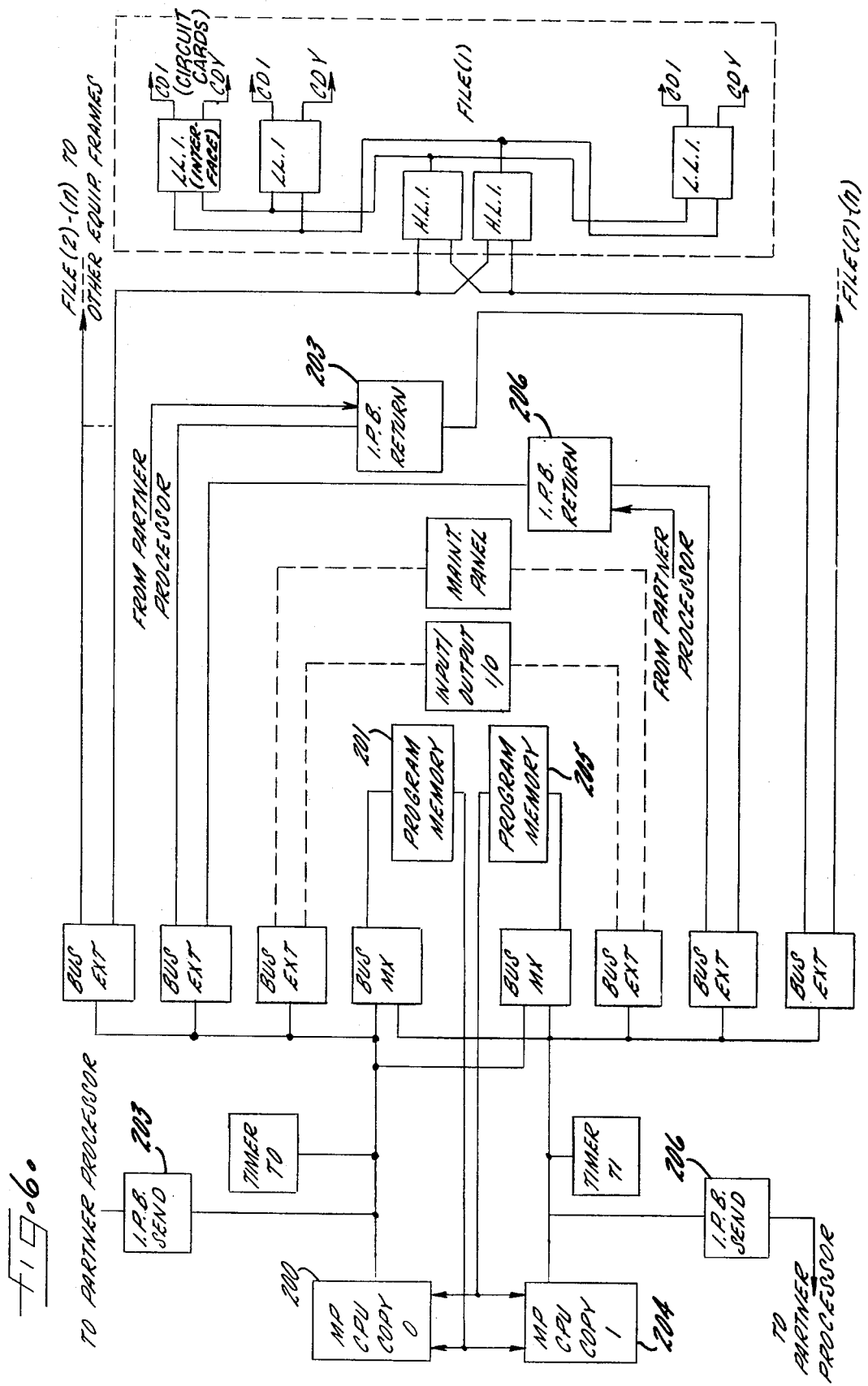
FIG. 6 is a more extensive schematic diagram of the redundant microprocessor arrangement of one of the distributed processors.
Figure 7:
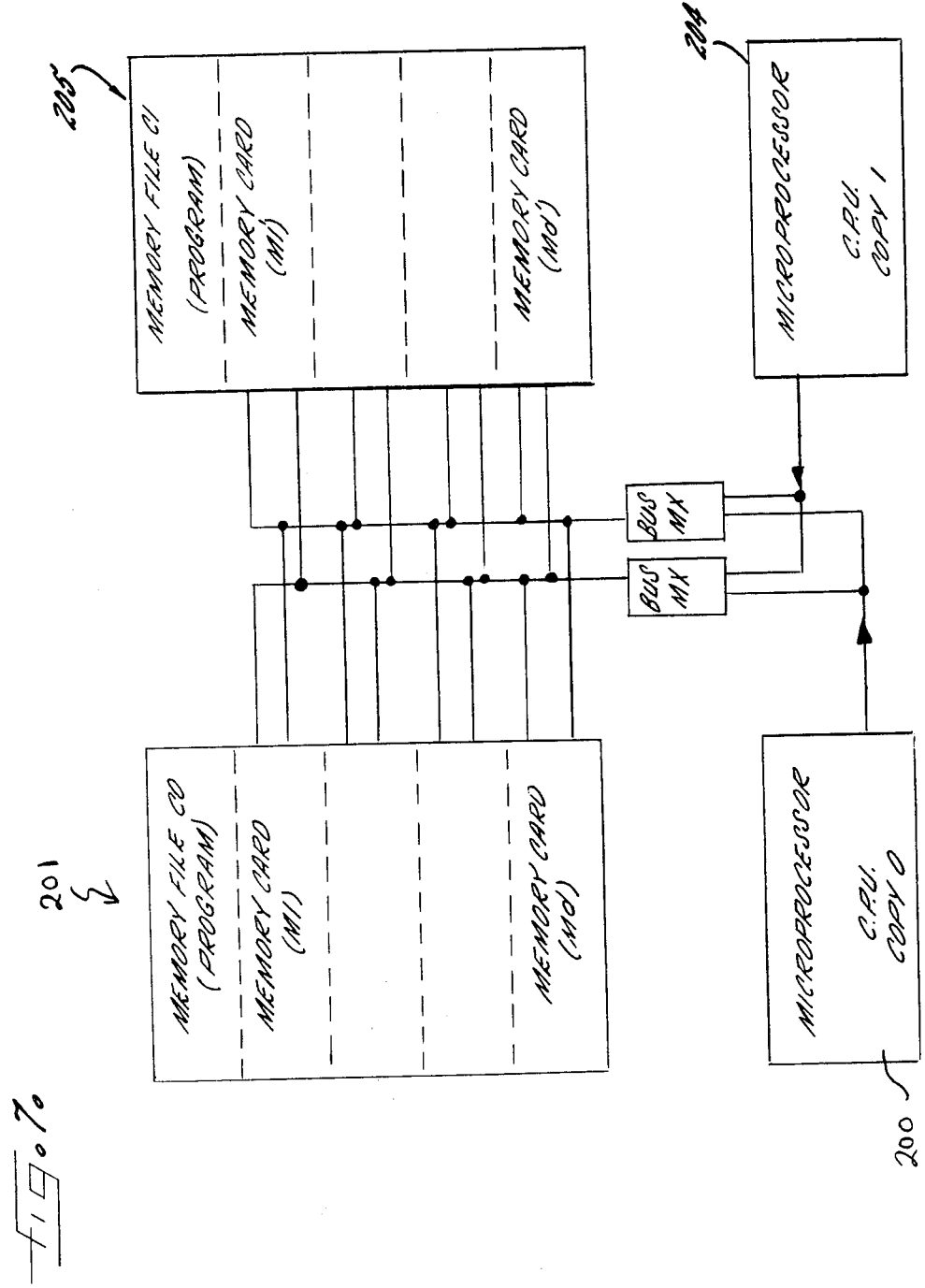
FIG. 7 is a schematic diagram of the program memory structure for each processor.
Figure 8:
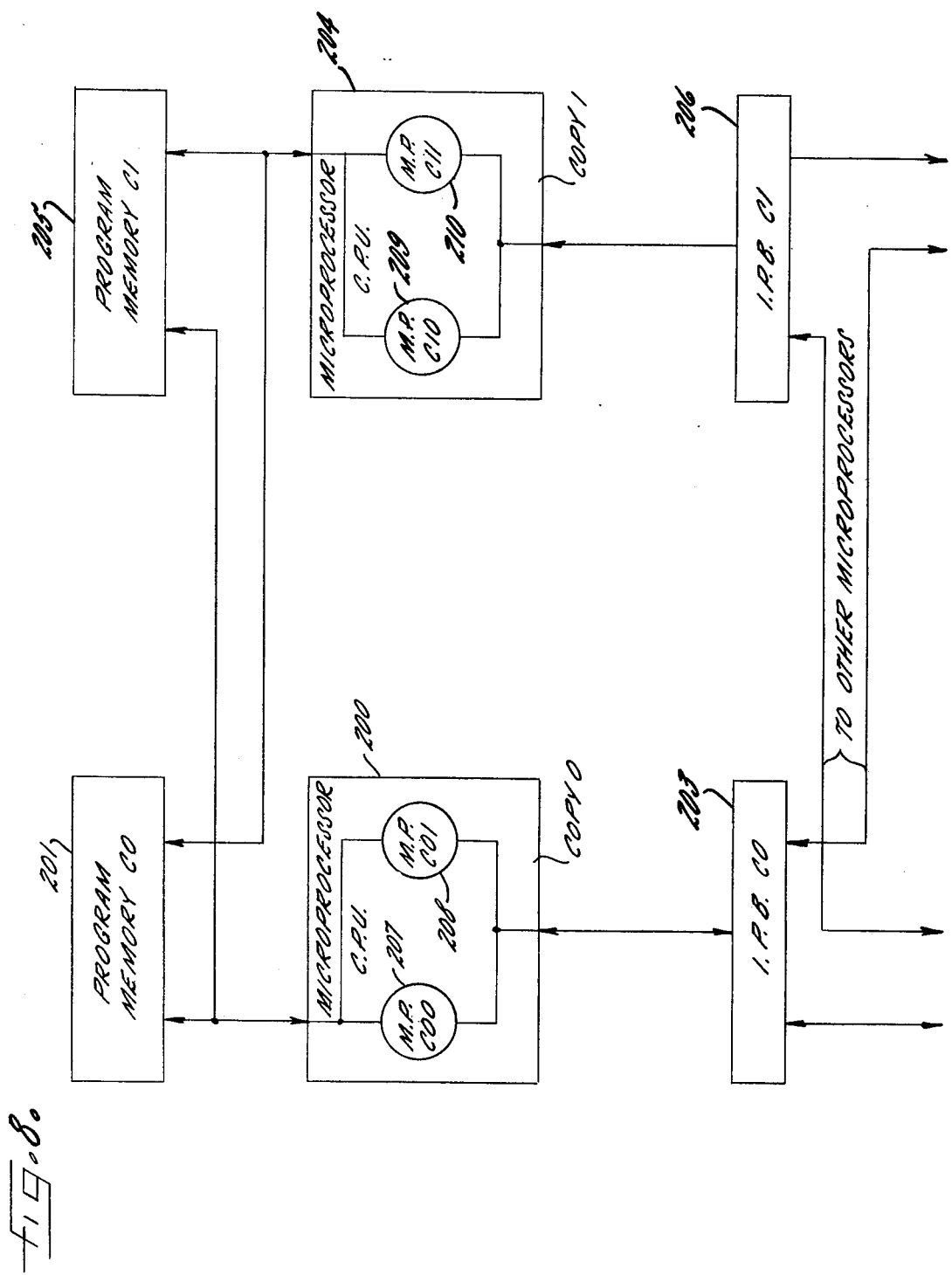
FIG. 8 is a schematic diagram illustrating the program memory fields and redundant construction utilized for the microprocessors in the control complex 55.

FIGS. 6-8 schematically illustrate the interrelationship between the elements of the control complex 55 as well as the relationship between those elements and other portions of the switching system. FIG. 6 relates to the microprocessor control itself, and therefore illustrates the structure of each of the state 130, line 140, register 150, trunk 160, data base 170, console 180 or busy lamp field 190 microprocessor controls. Each of those controls includes a processor 200 which is the control element of the system, a memory 201 is programmed to cause the processor to carry out the functions assigned to it and interprocessor buffer means 203 for providing communication paths with partner processors. For the sake of system reliability, the entire controller thus described, as well as the bus structure is duplicated such that if a module of the primary processor fails a corresponding module of the secondary processor can be automatically switched into position in its place allowing the system to continue to function. To that end, a second processor 204 is provided as well as a second program memory 205 and a second set of communication paths illustrated by interprocessor buffer 206. As one means of detecting system malfunctions, each of the processor controls includes two microprocessor chips, microprocessor chips 207, 208 making up processor 200 and microprocessor chips 209, 210 making up processor 204. Each of the microprocessors within a processor is driven by the same program, and the microprocessor outputs are continually compared such that any discrepancy noted by the comparator is used as a signal indicating a potential system malfunction.

Data Base Microprocessor And Stores

While the foregoing generally describes the system operation, and particularly the operation of the distributed processors to carry out system functions, in order to describe that portion of the complex to which the present invention is primarily directed reference should be made to FIGS. 2-5.

Within the control complex, the register, data base, and state microprocessors (RMP, DMP and SMP) form a subgroup performing particular and unique operations in executing system functions.

In carrying out the invention, semi-conductor memory devices and circuits are provided for storage of data utilized in the performance of system functions, and the data base microprocessor 170 is connected to retrieve required data from these memory stores upon request from other processors of the control complex.

Among these data base stores are:

| | |
|---|---|
| Directory Number Table | (DN) |
| Class of Service Tables | (NSN/COS) |
| First-Digit Translations | (1st Digit TR) |
| Group Hunt Tables | |
| Restriction Tables | |
| Call Forwarding Tables | |
| Speed Dial Tables | |

The data base microprocessor 170 also stores peg counters of various system device usages, and supports the non-call-processing ports to the connecting switching system such as a common keyboard terminal, AIOD, originating number display and magnetic backup media (such as disk or tape).

The data base microprocessor 170 maintains two-way communications through the IPB's 153, 154, 172, 173 with the state and register microprocessors 130, 150. The primary interchange of information comes in the form of requests for data concerning a particular network slot number or directory number and is delivered as the data requested. The data base microprocessor 170 is driven primarily by the request commands from other processors. It has no sense points that input call-processing stimuli.

While not the largest memory area within the data base stores, the directory number table 300 (also labeled DN) serves a primary role in providing data utilized in the execution of system functions. Recalling the emphasis earlier on the point that with the present system a dialed number represents a system function, it is the directory number table 300 that prevents the means for correlating the dialed number and the system function. To this end, the directory number table provides a multiplicity of memory locations each one corresponding to a dialed number and having stored therein an identifier word including an instruction to carry out one of the operational functions which the system is capable of performing. The data base microprocessor 130 is operable to read the identifier word stored in a memory location corresponding to a dialed number. Based on the instruction portion, the data base microprocessor is operated under program control to assemble and transmit a command message to one or more other processors, and the system function designated by the reference code transmitted with the command message and produced responsive to the instruction portion of the identifier word is then executed by the distributed processors of the control complex.

The system functions are divided, for convenience and clarity in describing the system, into six large categories: standard call; conference call; group hunt; call pick-up; speed call; miscellaneous. To execute one of the primary functions of the system, namely to execute the "standard call" function to connect lines to lines, or lines to trunks in either the incoming or outgoing direction, requires a significant quantity of data in addition to the instruction designating the system function. In the case of calls between stations on lines served by the system, that significant amount of additional or supplementary data includes, for example, (1) the network slot number (NSN) of the dialed station along with (2) the class of service (COS) data for the originating and the terminating station. Also needed is the customer group of the originating and terminating stations (CG#).

To execute more complex functions, such as making conference call connections, searching through groups of stations for an idle station, call forwarding, and the like requires unique and, in some cases, extensive further data for each function.

NSN/COS Table

As indicated in the above list, the data base stores associated with the data base processor comprise a plurality of tables and data fields in addition to the directory number table 300. The largest such table is called the NSN/COS table 301, and is organized by network slot number (NSN) to provide ten bytes of data for each network slot number. The data stored in this table 301 for each network slot number includes originating and terminating class of service information (OCOS,TCOS). Access codes class of service data (ACCOS) are provided, designating whether each particular network slot number is permitted to invoke the function represented by a particular access code. The directory number for the network slot number is provided, for reverse translation. The customer group (CG#) for that network slot number is also provided. Other data such as trunk group access codes (TGAC) may be provided, as desired.

The practical embodiment of a switching system constructed in accordance with the invention and described hereinbefore, provides 3,072 network slot numbers; providing ten bytes of information for each network slot number means that the total amount of memory capacity required for this table 301 is 30,000 bytes.

Figure 3:
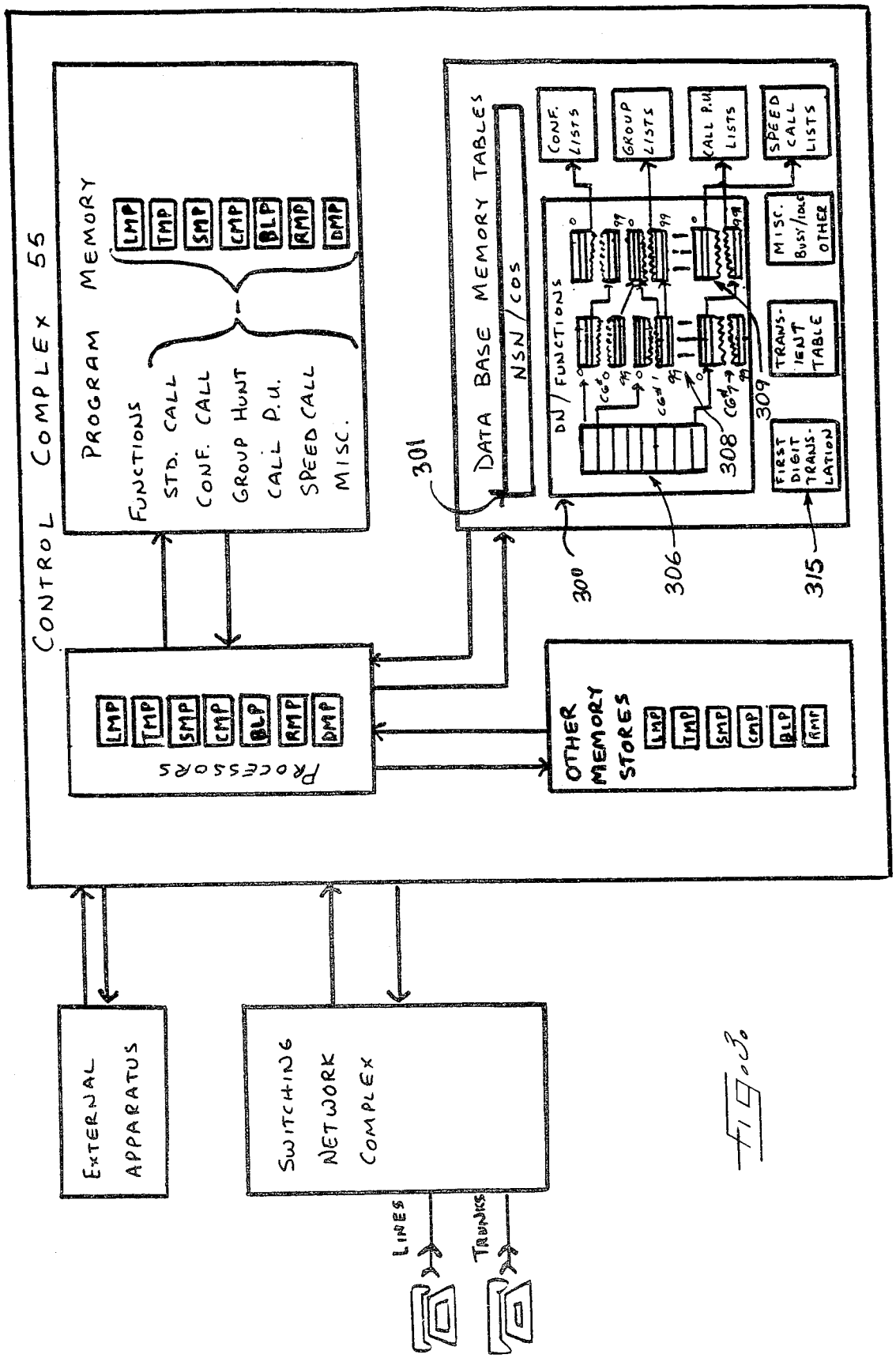
FIG. 3 is a block diagram, highly schematic, showing the structure and organization of the data base and program memory components of the control complex portion of the system.

While the "standard call" function may be carried out with data read from the directory number and NSN/COS tables 300, 301, the other functions require further data. For example, in the case of the group hunt function, multiple lists of directory numbers are required through which the system will hunt for an idle station when a particular directory number is dialed. In the case of the speed dial function, lists of external numbers co-relates to abbreviated codes, are required. To provide the requisite data for all the system functions, in addition to the directory number and NSN/COS tables 300, 301, the data base memory, therefore, provides a multiplicity of other tables as generally shown in FIG. 3. The data base memory also provides for storage of data required for other functions outside the processing call stream. For example, tables of data are provided for purposes of reference rather than for use in executing functions associated with processing calls. One example is a traffic counter table, which stores traffic count of given trunks, lines or groups of lines being pegged every so often—being stepped ahead—to register the ongoing count. Another example is a group hunt overflow table and another, restriction table. Before detailing the structure and organization of the data base memory in regard to tables and other forms of storage of this supplementary data, the organization of the directory number table 300 will be described, because of the primary role played by that table in the operation of the system.

Directory Number Table

In carrying out the invention, the correlation between the dialed directory number and the designated system function is established in the directory number table 300 by utilizing, in addition to the directory number, the customer group number of the originating station as a means of addressing the table. As herein shown, this table 300 is a multiple level table in which the various levels are linked by pointers. Thus, addresses stored in locations in the entry level 306 point to locations in an intermediate level 309, which in turn contain addresses which point to locations in a third, lowest level 308 where either (a) a pointer to another memory location having the required data, or (b) the required data itself, is stored.

In the directory number table, the entry level 306 has a block of locations (for example, eight) corresponding to the total number of "customer groups" for which the system is intended to provide service. The particular one of the locations in this entry level block addressed in response to a dialed number, is identified by the customer group number of the originating station, which is determined from the equipment address of this originating line or station and supplied to the data base processor 170 with the directory number.

By "customer groups" is meant groups of stations served by a single hardware system in such a manner that calls for each group of stations are processed separately from calls within another group. Thus, in accordance with the present invention, a system is provided where more than one "customer" can share a single system hardware.

With the memory structure and organization shown, the system provides up to eight "customer groups". Eight different groups of stations are sharing the system. The system keeps track of the eight different "customer groups"—and establishes and maintains all calls separate within their respective groups. Thus, normally all calls are between stations within the same group unless, as a permitted class of service, originating stations in one group can connect to terminating stations in a different customer group.

An important feature of the system is that it allows the use of very flexible and unconstrained numbering plans. There is no inherent requirement, as in many systems, as to the number of digits for a directory number; for example, in the illustrated system a numbering plan may be employed using up to a maximum of four digits, but a directory number may be any of 1, 2, 3 or 4 digits in length.

The same first digit may be used for 1, 2, 3 or 4 digit numbers. This is accomplished by the use of hesitation dialing. In hesitation dialing, for instance using the dialed number "9" to make an outside call using a trunk, after the "9" number is dialed, and after a slight hesitation. The system recognizes, through the use of that hesitation between the first digit and subsequent digits that the number "9" is a completely dialed number, calling for a specific system function, in this case a "standard call" to an external number via a trunk, and is not associated with the following digits as a dialed directory number.

One of the features of the system is that the same directory numbers may be used in different customer groups. This follows from the structure and organization of the data base memory; specifically, the directory number table as will now be shown.

As noted above, the entry level 306 of the directory number table 300 has a block of eight locations corresponding, respectively, to the eight customer groups. Also as earlier noted, the initial step in the processing of a "standard call" occurs when the line processor 140 having during its scan program detected an off-hook on a line, and determined it to be an idle line, requests the data base processor 170 for class of service (COS) data as to the originating station, having determined the network slot number (NSN) for the originating station from the equipment address and supplied that NSN data to the data base processor 170.

The customer group number (CG#) for the originating station is also obtained by the data base processor from the same area of the NSN/COS table.

The directory number table 300 is used by the data base processor to determine the system function designated by a dialed number. Once all dialed digits have been collected by the register processor 150, they are transmitted in a command message to the data base IPB 153 where it is stored, and when the data base processor executes its "Analyze IPB" program, it detects the loaded state of the IPB, receives the message including the dialed number, and recognizes it as a command to locate in the directory number table for the designated function identifier.

Each location in the lowest level 309 of the directory number table stores data representing the function called for by the user when dialing the corresponding particular directory number.

Identifier Word Format

The format of the bit pattern for the data is the (FIGS. 4, 5) same throughout the locations of the lowest level of the directory number table. Each location stores an identifier word 310 (FIG. 5) which is two bytes in length and includes a first four bit group 312 of signals, and a second twelve bit group 314 of signals. The pattern of the first three bits in the first group 312 represents a system function—that data can be considered an instruction. The bit pattern of the second group 314 represents an argument of the instruction, and directly or indirectly provides supplementary data required for executing the system function called for by the instruction portion of the identifier word.

The lowest level 309 of the directory number table has a set of (for example, up to forty) blocks, each one of the forty blocks containing one hundred locations. Each block of one hundred locations is pointed to by a pointer address in the second level 308 of the table. The two lower order digits of the dialed directory number are used to identify the particular location in the one of the lowest level blocks pointed to by the block address read from the intermediate level 308. These lowest level blocks are thus, sometimes referred to herein as the tens/units blocks (00/0).

The specific number of separate blocks in the lowest level is arbitrary, dependent on the system configuration and sets the limit of "directory numbers" permitted in a particular number plan. With forty such blocks, and one hundred locations in each block, a limit of 4000 directory numbers is set. The lowest level blocks of locations contains the ultimate data to be derived from the directory number table. That ulitmate data may be the data utilized for transfer in the form of a message from the data base microprocessor to another microprocessor for executing a function; the data in the lowest level may comprise a pointer address to still a further table for obtaining supplementary data for use in carrying out the operational functions.

The intermediate level of the table 300 has a set of eight separate blocks, each corresponding to one of the "customer groups" and each containing multiple locations (for example, one hundred locations in each block). Each one of the eight blocks is addressed by a pointer in one of the eight locations in the entry level table. In the present system, the numbering plan involves the use of up to four digit directory numbers. The two higher order (thousands, hundreds) digits are utilized to locate the particular location in the "customer group" block in the intermediate level. These blocks are, therefore, sometimes referred to as the thousands/hundreds (000/00) blocks.

Figure 4:
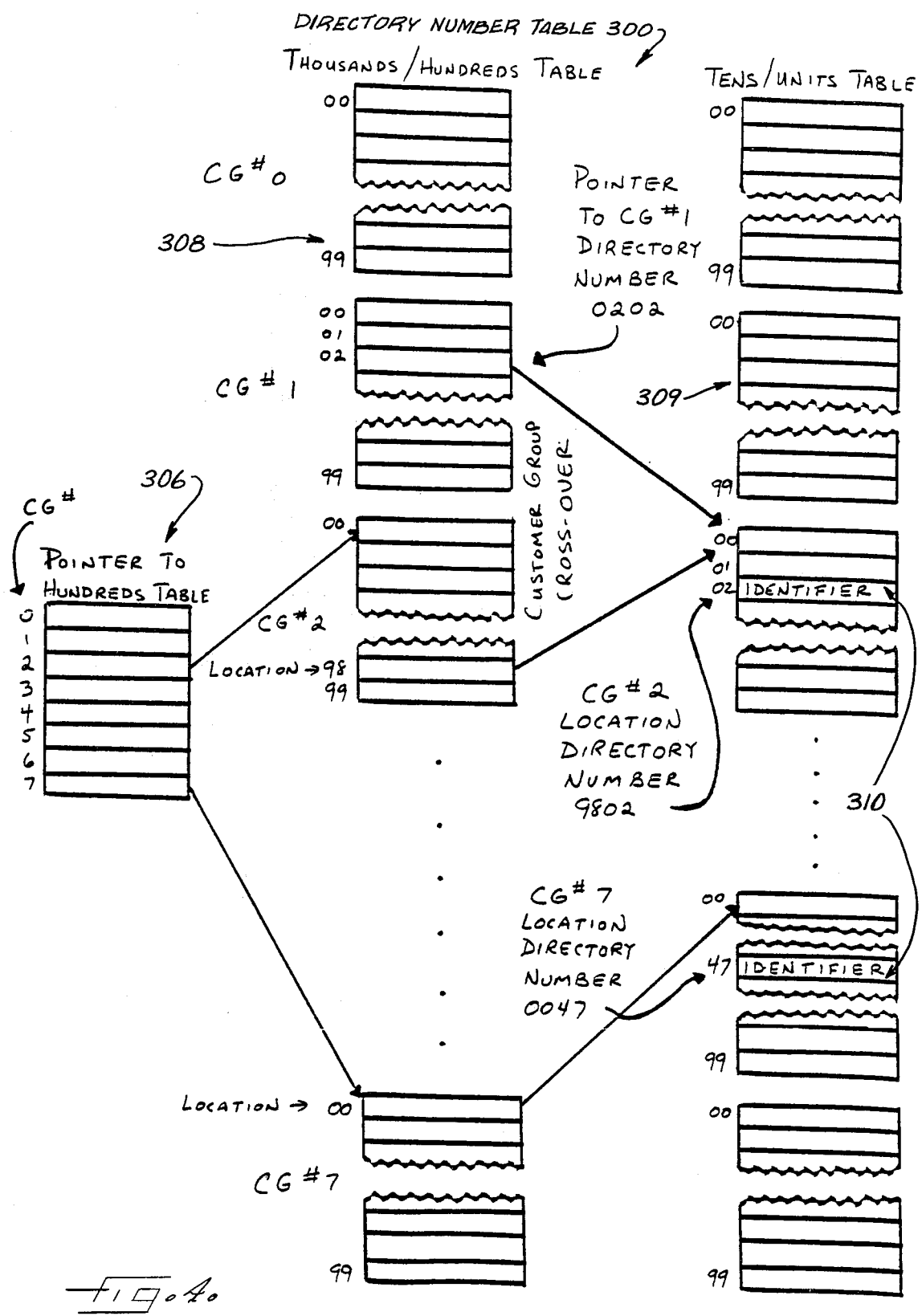
FIG. 4 is a schematic illustration of the organization of the directory number table included in the data base memory component.

Turning now to FIG. 4, it will be seen from this Figure that the format of the identifier word provides for the three bit instruction, which designates one of the system functions previously listed, for example, standard call, conference call, group hunt, etc. The argument portion of the identifier word represents in most cases a pointer address to another table, or in some cases, for example, the standard call function, the network slot number NSN of the terminating Party P2. How the identifier word read from a designated location is employed will be described in connection with an exemplary standard call sequence.

Efficient use of data base memory, cutting down the amount of storage capacity required for a given system, may be achieved by utilizing one of the features of the invention; namely, that entire blocks of adjacent directory numbers may be made to call for the execution of identical system functions, whether such blocks of adjacent directory numbers are dialed from the same or different customer groups of stations. This means that a block of 100 locations in the lowest level of the directory number table 310 could be accessed by many hundreds of different directory numbers. Each location in the lowest level of the table, which contains a system function identifier, could be reached by two or more different dialed directory numbers. These different dialed directory numbers could originate from stations in the same customer group.

From the foregoing it should be evident that the directory number (DN) table 300 which together with the means to access the table serves as a dialed number to function translator, provides alternative ways of correlating different directory numbers with the same system function. The identifier word designating a given system function may be repeated in different locations in the lowest (first) level of the directory number table 300; alternatively, pointers may be mixed together at some intermediate level of the table 300. As shown in FIG. 4, for example, pointers from locations in different blocks of the thousands/hundreds level of the table structure, point to the same block in the lowest level of the table structure. As designated in FIG. 4, the "02" line of that block in the lowest level of the table is addressed by two directory numbers: 9802 of customer group 2, and 0202 of customer group 1.

Command Message Format

The information format within any IPB instruction is a command message which consists of one or more information bytes. The first Byte thereof is the reference code (see Table 3) and specifies the command corresponding directly to a task to be done within the receiving microprocessor. The number of subsequent information bytes varies from command to command, but is known for each particular command by the receiving microprocessor. If there is adequate capacity in the buffer, several command messages may be transferred at once. Specific commands and command formats are uniquely specified for the sending and receiving microprocessors. This is desirable to ease decoding and illegal state checking of command bytes and to ease system debugging and maintenance functions. The command code 00 (null) issued throughout the system is a stop/no-command indicator. Any byte that is 00 where a command code is expected means "no further information in this buffer."

Each IPB has receiving storage capacity of 16 bytes in length, the first byte of which is used both to carry data and as the ready/done flag for the IPB buffer. Command messages may be as short as two bytes or as long as sixteen bytes, hence a number of commands may be loaded into a single IPB transmission. The receiving microprocessor knowns the number of bytes associated with each command, hence can unload the buffer without difficulty. The first zero byte encountered where a command is expected instructs the end of the transmission.

In general the sending microprocessor only writes the IPB and the receiving microprocessor only reads. Some exceptions are as follows:

1. The receiving microprocessor may perform a dummy write to the location of byte #1 and cause reset of byte #1. This indicates receiver done.

2. The sending microprocessor may read byte #1 to determine whether the buffer is available (receiver is done).

The normal processing sequence is as follows:

1. The sending microprocessor loads the IPB, lastly loading the command byte of message #1 into byte #1 of the buffer.
2. The receiving microprocessor scans byte #1 of the buffer periodically and tests it for all zero. When a non-zero condition is found, the buffer is ready. The receiving microprocessor will re-read the first byte (to assure that the first read was not at transition time) and proceed to perform (one by one) the command messages contained in the buffer.
3. The receiving microprocessor will write to the location of IPB byte #1, resetting byte #1 to all zero.
4. If the sending microprocessor has command messages waiting to be sent, it periodically tests byte #1 of the IPB for zero. When the byte goes to zero the buffer is available and the microprocessor may load it again (Step 1).

Buffer Addressing

There are 256 locations of memory reserved in every microprocessor for buffer addressing. The sending and receiving microprocessors use identical addresses to access the buffers. There are two sets of address usage, one primarily grouped about the state microprocessor and another grouped about the data base microprocessor.

The overall buffer addressing plan uses the high order 8 bits as a displacement to the buffer location, the next four bits identify a specific IPB (1 of 16), and the final 4 bits select individual data bytes within the buffer.

The 16 byte length of the IPB buffers are depicted in FIG. 25 wherein designations are in hexidecimal format and "JJ" identifies memory displacement and "X" identifies buffer byte designation (1 of 16).

Program Hierarchy

Figure 9:
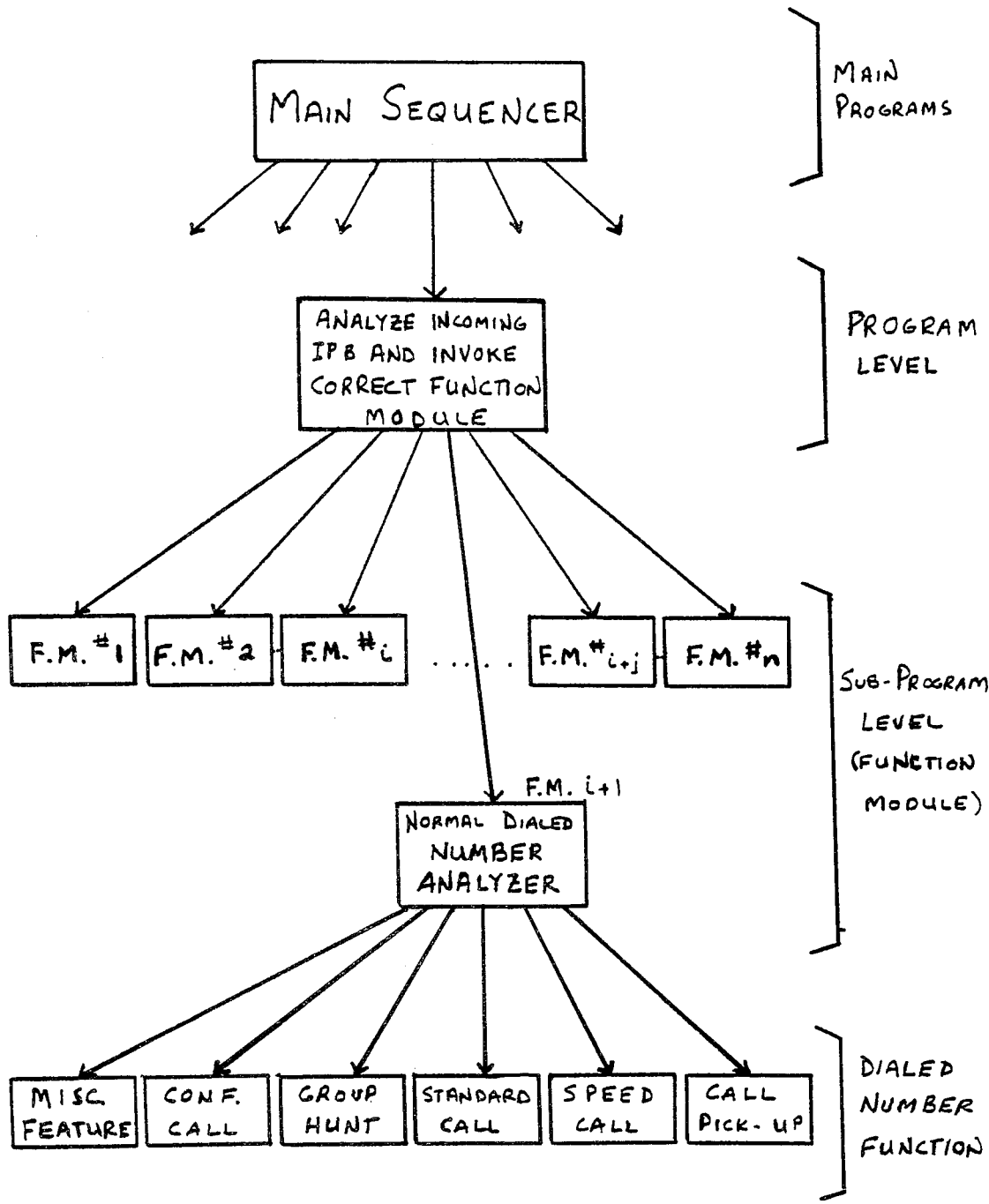
FIG. 9 is a diagram illustrating the program hierarchy of the stored data base microprocessor programs.

FIG. 9 graphically illustrates for the data base microprocessor 170, the multiple level hierarchial organization typical of all microprocessors in the control complex 55. The levels are main programs, programs, and sub-programs.

Main Program Level Routines—All Microprocessors

All microprocessors use these main programs:

1. Master Sequencer: This routine determines the sequence of services to be performed by invoking routines of the program level in a predetermined and established sequence. The Master Sequencer loops through the established sequence infinitely.
2. Time Interrupt Handler: A ten-millisecond interrupt is provided as the only processing required interrupt in the switching system. The Time Interrupt Handler maintains a clock in memory that may be referenced by other routines for testing time dependent conditions.

Program Level Routines—All Microprocessors

1. IPB Loader

The programs concerned with loading a selected IPB and unloading data therefrom are uniform in all microprocessors. In the sending microprocessor, loading is done by a program after an IPB queue has been loaded by other sub-programs. In the sending processor this loading is done by a program that moves data from a portion of a 64 byte queue area within the processor memory to the 16 byte IPB. The 64 byte internal queue is a communications buffer between the call processing logic sub-programs and the IPB. The queue is desirable to:

1. Provide a holding area for outgoing commands during periods when the IPB is being unloaded (from the last IPB transmission) by the receiving processor.

2. Consolidate a number of commands, each considerably less than 16 bytes, into a single IPB transmission, thus making more efficient use of the IPB.

3. Accommodate activity surges that could momentarily overload the 16 byte IPB.

As selected sub-programs in a microprocessor create command messages, the same are loaded into the appropriate IPB queues. The buffer loader program is brought into action periodically by the processor main program. The buffer driver will test the queue for messages waiting to be sent, and if there are any, it will test byte #1 of the IPB for all zero (buffer available condition). If the buffer is available, the driver will load as many messages as possible into it; follow them with a null in the next consecutive memory location (unless all sixteen bytes of the buffer are used); and load byte #1 last to show the ready condition.

2. IPB Command Analyzer

In the receiving microprocessor, a command analyzer program looks at the IPB to determine if the IPB is loaded, and if so, analyzes the 1st command (in Byte #1 of the IPB) and jumps to the sub-program, i.e., function module, handling that specific command. This is depicted in FIG. 9 for the Data Code Microprocessor program organization, the chart showing that in executing the "command analyzer" program the "normal dialed number" command, reference code 74 in the Byte #1 of the IPB, has been read and the "normal dialed #" command handler sub-program has been invoked. After the command has been serviced, control is returned to the command analyzer program for analysis of the next command in the IPB. All remaining commands required to be serviced are serviced in this manner.

The main program in the receiving processor will periodically call the command analyzer program which will test each incoming IPB for non-zero (ready condition). When a ready buffer is detected, the analyzer re-reads the command byte to assure its integrity. The byte is tested for all-zero (stop/no command) and if tested to show all-zero, the analyzer returns to main program. Valid command bytes are used to call the appropriate command handler sub-program. The sub-program reads the data (if any) following the command byte and performs the required function and then returns to the analyzer with a memory pointer to the next command, if any. The analyzer checks that the next command byte location is still within the IPB, and if it is reads the command. The processing continues until command messages in the IPB are exhausted, then returns to the main program.

Other Program Level and Sub-Program Level Routines—Individual Microprocessors

Line Microprocessor

Operations:

The line microprocessor or 140 serves as the introductory service port through which all control signals pass to and from line circuits. For each line in the switching system, a single bit sense point and single bit control point are available to the line processor 140, from which the LMP 140 determines the on-hook/off-hook condition of the particular line circuit, detects significant on-hook/off-hook transitions and reports the same to the state processor 130 through the associated sender interprocessor buffer 141 and receive IPB buffer 133. Significant line transitions that are detectible are new off-hooks, disconnects (sustained on-hook) and flashes. Controls which are exercised are ringing and halt ringing on each line circuit. The analysis of dial pulses is specifically not a task of the line processor 140.

The line processor 140 reports line activities only to the state processor 130 and receives control information only from the state processor 130. For all information being sent out, the line processor 140 converts the pertinent line equipped address (hardware location) to its network slot number. Likewise, for all information received from the state processor 130, the line processor 140 converts the network slot number to an equipment address.

Buffer Communications:

The line processor 140 communicates only with the state processor 130 and this is done through the interprocessor buffers, using the commands and formats outlined in Table 3.

Other Program Level Routines:

1. Scan Program: The scan program monitors the on-hook and off-hook status of each line circuit and modifys that state of the line and prepares relevant outgoing IPB commands.

Sub-Program Level Routines:

1. Ring Control: Causes ringing current to be applied or removed from a specified line (but does not provide 2-seconds-on, 4-seconds-off interruption of ringing).

2. Command Handlers: Each IPB Command received by the LMP 140 causes a command handler sub-program to be executed, thus setting the conditions dictated by the command.

3. NSN to EA Translator: Converts Network Slot Numbers to Equipment Addresses.

4. EA to NSN Translator: Converts Equipment Addresses to Network Slot Numbers.

5. Attenuator Control: Drives sense points with specified attenuation selection data.

Trunk Microprocessor

Operations:

The trunk microprocessor 160 serves the switching system as an introductory service port through which all trunk sense and control signals pass from and to the trunk circuits. The TMP 160 detects and assimilates any significant state changes in trunks and, regardless of the trunk type, reports changes in a uniform format to the state processor 130. Analysis of incoming dial pulses and the sending of outgoing dial pulses is specifically not a task of the trunk processor 160.

The trunk processor 160 receives four sense points and delivers four control points to each trunk. The significance of sense and control points varies from trunk-type to trunk-type and thus the procedures for utilizing the points will vary. In order to correctly process each trunk, the trunk processor 160 maintains an abbreviated class-of-service table with enough information to correctly identify each trunk's type. This classof-service table is derived from the general class of service information kept by the data base processor 170.

Conditions to be recognized and interpreted by the TMP 160 are incoming trunk seizure, trunk disconnect, stop/allow dial, distant party answer, and trunk flash. Controls to be exercised are outgoing seizure, disconnect, answer supervision, allow outdialing, set attenuation, recognize/disregard flash, and permit outward flash. Control information from the remainder of the system is received from the state processor 130. In these commands, trunks are identified by a network slot number that must be translated into a trunk equipment number (hardware location). Likewise, the trunk processor 160 must make the reverse translation when preparing a command message for the state processor 130.

Buffer Communications:

The trunk processor 160 communicates only with the state processor 130 and this is done through the interprocessor buffer IPB using the commands and formats oulined in Table 3 hereof.

Other Program Level Routines:

1. Scan Program: The scan program monitors the sense points of each trunk for significant changes and invokes the appropriate trunk logic sub-program when changes are detected.

Sub-Program Level Routines:

1. Trunk Logic Sub-Programs: There is one trunk logic sub-program for each trunk type that the trunk processor 60 must handle. Each sub-program modifys the trunk's state appropriately and prepares relevant outgoing IPB commands.

2. Command Handlers: Each IPB command received by the TMP 60 causes a command handler sub-program to be executed, thus setting the conditions dictated by the command.

3. Delay Queue Handler: The delay queue handler is a convenience routine designed to uniformly handle the large number of times events that occur during various protocols for trunk seizure and release.

4. Attenuator Control: Drives sense points with specified attenuation selection data.

5. NSN to EA Translator: Converts network slot numbers to equipment addresses.

6. EA to NSN Translator: Converts equipment addresses to network slot numbers.

Register Microprocessor

Operations:

The register microprocessor RMP 150 receives and sends all dialed numbers for the switching system. The dialed numbers may be presented as pulse streams direct from DC signalling or as 4-bit parallel binary numbers provided by a DTMF receiver. Regardless of input format, the register processor 150 outputs the dialed number as a series of digits stored in four bit codes to the appropriate microprocessor.

The register processor 150 receives two fundamental types of call processing commands from the state processor 130, namely, receives digits and send digits, and one fundamental command type from the console processor 180, namely, receive n digits. The register processor 150 receives sense information with DC signalling and/or DTMF digits from dial receiver/sender units of the registers and sends control information with pulse signalling or DTMF digits to the dial receiver/sender units. Up to 64 dial receiver/sender units may be equipped, each supporting dialing on one circuit to which it is connected by the network 52.

Upon completion of a dialed number, the register processor 150 sends a completion command with the dialed number usually to the data base processor 170, but in some instances to the state processor 130. The register processor 150 also sends control bits to the receivers to select certain tones that are returned to the attached originating party, to set-reset the the 9th Bit as sent to a terminating party, and to reset certain sense points from the receiver.

Register Sense and Control Points:

There are 8 sense and 8 control points for each receiver/sender. The sense points are read and the control points are written in a single byte-per-receiver/sender format. For each register the sense and control bytes are located at an identical address and are differentiated only by the read (for sense) and write (for control) instruction that is used to access them. There are 64 memory addresses reserved for register sense/control points and each is accessed using its equipment address.

Buffer Communications:

The register processor communicates with the state processor 130 and the data base processor 170 through the IPB, using the commands outlined in Table 3.

Other Program Level Routines:

1. Scan Program: The scan program monitors the sense byte of each register and passes control to an appropriate state logic program as determined by the condition of the sense byte and the correct state of the register.

2. Outpulse Drivers: Three routines are invoked at selected, staggered 10-millisecond interrupts to provide the register outpulsing function. These routines are:

Prepare outpulsing set outpulses reset outpulses

Sub-Program Level Routines:

1. Sense Point State Logic: A number of sub-programs provide appropriate actions for the individual state and sense point conditions encountered. Each sets a new state and/or prepares relevant outgoing IPB commands.

2. Elapsed Time State Logic: A number of sub-programs provide appropriate actions for certain elapsed time periods of certain states. Each sub-program sets new states and/or issues IPB commands as may be relevant.

3. Command Handlers: Repeat Command Handlers for line microprocessor 140.

State Microprocessor

Operations:

The state microprocessor SMP 130 coordinates the bulk of call processing activity in the switching system. The SMP 130 makes all decisions concerning call states, party states, next allowable states, and register assignments. Through an interface with the switching network, the SMP 130 controls all connections among lines, trunks, registers, attendants, and tone sources.

The state processor 130 maintains two-way communication with all other processors in the system through the inter processor buffers (IPBs) which send and receive a large variety of command messages.

The state processor 130 is driven solely by the commands it receives; there are no sense point inputs. Most commands are related to a particular call in progress and to the state and class assignments of the parties involved. Processing results in the issue of one or more commands to the other microprocessors and/or connection commands to the network 52.

Other Program Level Routines:

1. Busy/Idle Update: The busy/idle update program periodically transmits updating data to the data base processor 170 so that it may maintain a current map of busy and idle conditions of lines and trunks, and (if implemented) the B.F. microprocessor 190.

2. Short Action Queue Servicing: The short action queue servicing program scans entries of time conditional events that have been placed in a queue by other programs and sub-programs. If the conditional time of any event has expired the short action queue servicing routine causes the event to occur.

3. Camp-On-Queue Servicing: The camp on queue servicing program searches a list of calls waiting to be made when both parties become idle.

4. Register Allocation: This is a group of routines designed to allocate available registers and to service a queue of parties wanting registers when none are available.

5. Time Audit: The time audit program periodically checks the time that each line, trunk, and register has been in its current state and invokes appropriate action if that time has exceeded a predetermined limit.

6. State Audit: The state audit program performs a periodic consistency check of the state and reference memory of each station, trunk, and register in the system and between parties talking to each other.

Sub-Program Level Routines:

1. Command Logic: Each IPB command received by the SMP 130 causes a particular command handler sub-program to be invoked. Each command handler contains the logic for permitting or denying, based on states of the parties involved, the action requested by the incoming command.

2. State Driver: The state driver sub-program performs all the actions necessary to change a party from one state to another. Included are the modification of the state, modification of the reference memory indicating to whom the party is talking, modification of the network control memory (connection), and issue of appropriate IPB commands.

3. Device Usage Monitor: Gathers counts of usage data (number of times used) from lines, trunks, registers, consoles and so forth for the system.

4. Traffic Recording: Provides as output data all significant events required to reconstruct complete calling information (monitor particular numbers dialed for checking and charge-back functions).

Console Microprocessor

Operations:

The Console Microprocessor CMP 180 performs all call processing functions associated with attendant console activity. This includes assuming a level of control normally exercised by the state processor SMP 130 in such activities as specifying whether conditions are correct to allow connections, specification of the connections, maintenance of console call states, call camp-on feature implementation, call holding feature implementation and time audits.

The console processor 180 maintains two-way communication via IPB(s) with the SMP 130, DMP 170 and, in a minor role the Busy Lamp Field Processor BMP 190. The primary interchange of information is connection commands to the SMP 130 and affirm/disaffirm commands in response from the SMP 130.

The console processor 180 is driven by a combination of the IPB commands received (representing new calls and connections) and the selection button activity on the attendant consoles (representing human direction as to how the calls are to be handled). Attendant consoles are scanned by the CMP 180 for selection button activity by looking at a single input port per console. Button selections are expressed at this port by eight bit codes, a unique code being used to represent each push button on the attendant console. Likewise, lamps on each attendant console are controlled by a single output port per attendant console. The large number of lamps on the attendant console combined with the requirement for steady or flashing display of each lamp requires that two bytes be transmitted to properly illuminate any particular lamp.

The CMP 180 handles calls for several customer groups. All tasks performed by the CMP 180 must provide for assigning and manipulating calls within the correct customer group.

Buffer Communications:

The console processor 180 communicates with the SMP 130, DMP 170, and the BMP 190 through the interprocessor Buffers (IPBs) using the commands outlined in Table 3.

Other Program Level Routines:

1. Read Keys: The read keys program scans all input ports and passes control to the proper sub-program when new button depressions (activations) from an attendant console are discovered at the port.

2. Assign Call: The assign call program looks at the attendant queue (for each customer group) and if there are any waiting calls, assigns them to the longest idle attendant of the proper customer group.

3. Time Audit: The time audit program periodically checks all console call states and invokes appropriate action if the allowable time of the particular state has been exceeded.

4. Write Console Lamps: The write console lamps program transmits control information via the output ports to the appropriate attendant consoles from an internally kept queue.

Sub-Program Level Routines:

1. Key Modules: A number of individual key module sub-programs provide the logic that must be executed for each particular key press and state condition encountered.

2. Control Table Driver: The control table driver sub-program supports key module sub-programs by permitting a large part of the work to be expressed in a tabular form referred to as a control table. The control table defines next states to be entered, IPB commands to be sent, and lamps to be lighted.

3. Command Handlers: repeat command handlers for line microprocessor 140.

Busy Lamp Field Microprocessor

Operations:

The busy lamp field microprocessor BMP 190 serves as an input and output information handler for one or more optional busy-lamp-field/direct-station-select consoles hereinafter referred to as BLF consoles. The BMP 190 detects requests from BLF consoles for the status display of a specific hundreds/group of stations and provides display data to the requesting BLF console. The BMP 190 also detects connection requests made by an attendant (operator) through the selective depression of a select pushbutton adjacent to a particular station lamp located on the BLF console.

The BMP 190 maintains in its associated memory storage means a busy/idle map of all stations, and also trunks, if desired. The BMP 190 organizes the busy/idle information by hundreds/groups, for example, 400/499 and 1700/1799, in preparation for requests from the BLF consoles. The BMP 190 must accommodate and partition the customer groups. The BMP 190 has a single IPB 193 connected from the SMP 130 to provide busy/idle information, and an IPB 191, connected to the CMP 180 for providing requested directory numbers DN(s).

Buffer Communications:

The BMP 190 receives a single call processing command through the IPB 193 from the SMP 130. This command contains information updating the BMP busy/idle map. The BMP 190 sends a single call processing command through the IPB 191 to the CMP 180. This command sent contains the directory number DN as derived from the specific hundreds/group currently being displayed and added to a direct-station-select button activated by the attendant (operator).

Primary Programs:

The BMP 190 has a two level hierarchial program organization typical of the main programs and program level routines for all other processors in the system.

Main Program Level Routines:
1. Master Sequencer

Program Level Routines:
1. Busy/idle Handler: Receives busy/idle data from the incoming IPB 193 and updates the busy/idle map.
2. Read Keys: Scans all input ports and either directs a new hundred/group of busy/idle lamps to be displayed, or a requested directory number to be placed in the internal outgoing IPB queue.
3. Lamp Driver: Periodically sends new lamp display data to each BLF console.

Data Base Microprocessor

Operations:

The data base microprocessor DMP 170 provides storage and retrieval upon request of all primary data structures in the control system. Among these are the tables and fields previously listed. The DMP 170 also stores peg counters of various system device usages, and supports the non-call-processing ports to the connecting switching system, as previously noted.

The DMP170 maintains two-way communications through the IPB(s) with the SMP 130, RMP 150, and CMP 180. The primary interchange of information comes in the form of requests for data concerning a particular network slot number or directory number and is delivered as the data requested. The DMP 170 is driven primarily by the request commands from other processors. It has no sense points that input call-processing stimuli. Several customer groups may exist in the system, and the DMP 170 must perform in a manner that maintains separation of the customer groups. This requires maintaining some internal data tables separately for each customer group; other data tables may be mixed together. The magnetic backup media is used for initial system loading and for recovery in the event of catastrophic failures. The keyboard terminal is the mechanism whereby recent change data and maintenance messages are entered into the control system. Because of these important input ports, the DMP 170 also serves as a distributor of program and operating data to all other microprocessors in the system. During these periods the DMP 170 makes special use of IPB(s) to convey the data directly to the SMP 130, RMP 150, and CMP 180. Data for the LMP 140 and TMP 160 is sent first to the SMP 130, which in turn forwards data to the LMP 140 and TMP 160.

Data Base Sense and Control Points:

The various input and output ports associated with the CMP 170 may be thought of as sense and control points respectively. Each is accessed by a specific pair of adjacent memory addresses. At one address is a status byte used to determine the readiness of the port to send or receive data. The other address of the pair contains the actual data byte sent or received. All DMP 170 ports use eight bit ASCII (American Standard Code for Information Interchange) codes for the transfer of information.

Buffer Communications:

The DMP 170 communicates with the SMP 130, RMP 150, and CMP 180 through the IPB(s) using the commands outlined in Table 3.

Other Program Level Routines:
1. Group Camp-on Queue Service: The group camp-on queue service program searches a list of callers waiting to be connected to an available member of a station or trunk group.
2. Keyboard Service: The keyboard service program is periodically invoked to test the terminal input port, to bring in characters appearing there and to pass control to a message analyzer when a full message has been input.
3. Output to Ports: The output-to-ports program is periodically invoked to send data waiting in internally kept queues to their respective output ports.
4. Data Audit: The data audit program continually tests the integrity of data structures by assuring that indirect address are within preset ranges and that address chains are consistent.

Sub-Program Level Routines:
1. Command Logic Sub-Programs: Each IPB command received by the DMP 170 causes a particular command handler to be invoked. The work of command handlers consist primarily of retrieving data requested and formatting the data into a responsive command; however, in some cases the retrieval process is quite complex requiring several levels of translation and/or group hunts.
2. Message Analyzer: The message analyzer sub-program tests messages from the keyboard and passes control to the proper routine to execute the message request.
3. Recent Change Driver: Modifies data base entries as requested by operating personnel from the keyboard.

Exemplary "Standard Call" Function

The following station-to-station call sequence is representative of the sequential programmed operations carried out by individual microprocessors of the control complex 55 in executing the overall "standard call" system function, and is the normal procedure for dialing another station without the attendant's assistance using DTMF or rotary dial. The station-to-station "standard call" utilizes five different microprocessors of the control complex 55, and the following explanation thereof is organized by action and response of a user call sequence and shows commands generated and response of the control complex 55.

Each command identified by reference code, is essentially a command to the receiving microprocessor to perform some work operation. The command message, including the ref. code together with data is loaded into an outgoing IPB. As such, the IPB units and the associated driving programs also act as the work queueing areas for the control complex 55.

means by which data is retrieved from that memory and utilized in the carrying out of system functions.

LMP Operation FIG. 10

Turning now to FIG. 10, and referring also to the exemplary sequence given above, the first "ref. code" listed is "A2" (all reference codes are in hexidecimal

STANDARD CALL STATION TO STATION CALL SEQUENCE

User Call Sequence:

| Action | | Response |
|---|---|---|
| Go Off-Hook | | Receive Dial Tone |
| Dial A Station's Directory # (DN) | | Receive Ringback Tone |
| | | Term. Station Rings |
| Go Off-Hook on the Term. Station | | 2-Way Talk Path |
| Proceed as usual for Normal Talk | | |

Control Complex Call Sequence:

| IPB Commands Generated | Ref. Sending/ Code Receiving IPB | Response |
|---|---|---|
| Line Orig. | A2 L→S | |
| Busy P1 | 6E S→B, S→D | |
| Request OCOS | 62 S→D | |
| OCOS Data | C8 D→S | Register is Seized |
| Standard Dial | 22 S→R | P1 gets Dial Tone from R |
| 1st Digit Trans | 72 R→D | After 1st Digit Dial Tone Stops |
| Receive N More Digits | 3B D→R | |
| Normal Dialed # | 74 R→D | |
| Standard Call | C9 D→S | P1 gets Ringback Register is Released |
| Send Ring | 03 S→L | |
| Busy P2 | 6E S→B S→D | |
| P2 Line Orig | A2 L→S | Two-Way Talk Path |

Note:
B - BMP
S - SMP
L - LMP
C - CMP
R - RMP
D - DMP

Individual Processor Programmed Operations FIGS. 10-18

Referring to the flow charts of FIGS. 10-18, these illustrate the programmed operations executed by each microprocessor in the order given in the foregoing exemplary sequence. Such programmed operations executed by all the multi-processors, in combination, achieve the "standard call" system function.

In addition to the accompanying flow charts, reference also is made to the appended Table 3, which provides an extensive listing of reference codes, command descriptions and command message formats. The relatively few specific reference codes referred to in the exemplary sequence and in the flow charts, are described in Table 3.

The "standard call" sequence and accompanying flow charts are provided in order to explain, in detail, how the multiprocessors are controlled, in combination, to execute system functions. While this detail is provided only for a "standard call" function, it will be evident to a man skilled in the telephony programming art how to program the microprocessors of the complex 55 to carry out their assigned portions of other overall functions, such as "conference call", "group hunt", or other system functions based on the Table 3 information and the illustration which is provided of exemplary program steps for the "standard call" function. The ability of the control complex processors to execute these and other system functions under program control is, in carrying out the invention, dependent on the organization and structure of the data base memory, and the format) which is transmitted in a command message from the line microprocessor LMP to the state microprocessor SMP via an IPB 141. According to the program description earlier provided for the line microprocessor, at the program level the routine is continually scanning lines to detect off-hook line transitions. Having detected a "new off-hook", the line microprocessor under program control assemblies the complete message, consisting of the reference code "A2" and the network slot number (NSN) of the originating line, obtained by translation from the equipment address. As shown in Table 3, the format of the command message is the ref. code A2 and "LS8/MS4", which by definition (Table 2) is the least significant 8 digits and the most significant 4 digits of the network slot number (NSN) of the originating party, P1. Network slot number refers to the time and space slot in the switching network assigned to the station trunk, register, tone or attendant. The FIG. 10 representation in flow chart form of this initial segment or series of steps carried out by the line microprocessor under scanner program control, ends, as shown in FIG. 10 with the block "Send Command Message (A2) to SMP", the state microprocessor 130, which represents that ref. code "A2" and the network slot number LS8/MS4 is loaded into the outgoing IPB 141.

SMP Operation

Referring again to the above "standard call" sequence, it illustrates that the next command message transmitted is identified by the ref. code "6E".

Referring to Table 3, the section "Commands Sent By The SMP", under the reference codes there listed is "6E" and the statement that the corresponding command is transmitted to the data base microprocessor DMP as a representation that the originating line P1 is busy, and in the command message format column, the statement that the same command is also sent to the busy lamp microprocessor BMP. The data base microprocessor maintains a busy/idle "map" as one of the "other" tables in the data stores; the busy state of the originating network slot number is stored in the data base memory and provides data, retrievable by the data base microprocessor as to the availability of that station or link to receive calls.

Referring now to FIG. 11, this figure in flow diagram form represents the two segmented operations given in the above standard call sequence as identified by the reference codes 6E and 62. Thus, in the scanning of the incoming IPB 141 the A2 command is found and analyzed. The command handler routine invoked, generates and sends the 6E command to the DMP and the BMP. As shown in FIG. 11, the command handler sub-program then calls for the state microprocessor SMP to transmit to the outgoing IPB 173 (in the communication path with the data base microprocessor 170), the ref. code "62". In Table 3, the ref. code 62 is described as a "request originating COS" (class of service) information, i.e., coded information on restrictions (see Table 4) applicable to the originating line P1. The format given for the complete command message is ref. code "62" and "LS8/MS4", which as noted earlier, is the network slot number of the originating line provided by the line microprocessor as part of the original command message. The command message is assembled by the state microprocessor SMP and loaded into the outgoing IPB 173.

Figure 12:
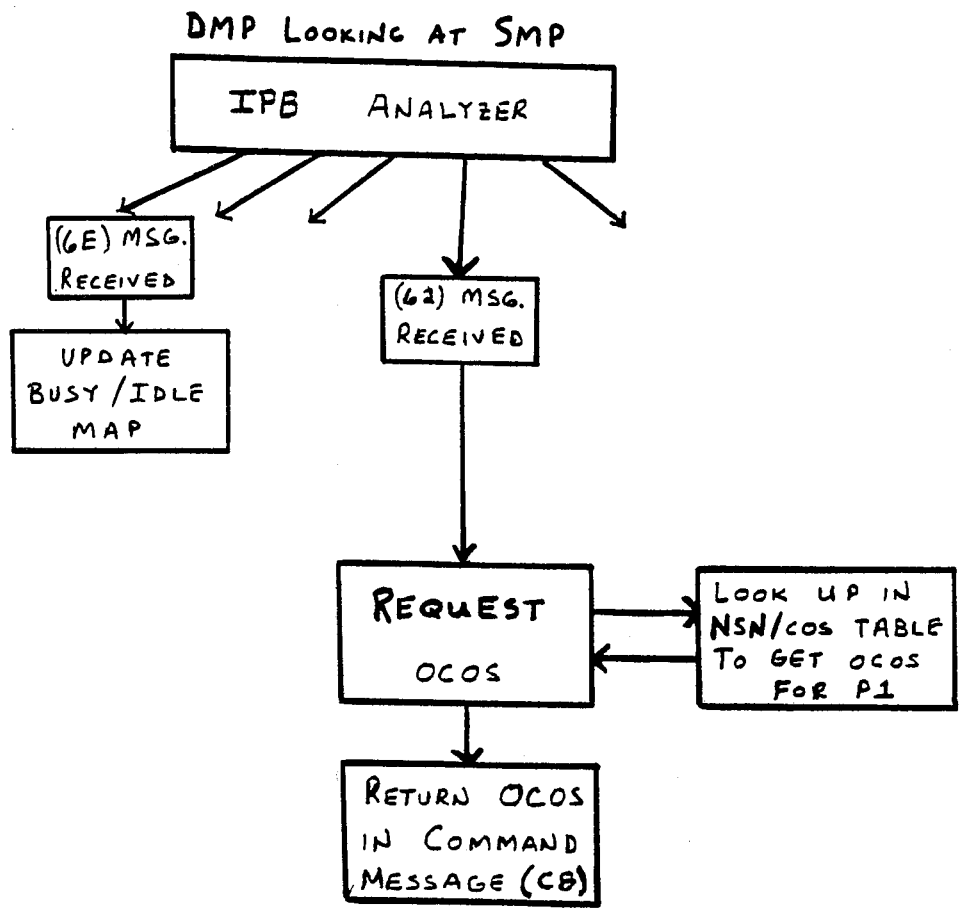

DMP Operations FIG. 12

The busy/idle IPB message 6E is received (as shown in FIG. 12) by the data base microprocessor DMP and the busy/idle map in the other field of the data base memory, updated to reflect the busy state of P1. As shown in FIG. 12, the IPB analyzer program for the data base microprocessor DMP invokes a second sub-program appropriate to that command, and receives the "request originating COS" message. The flow chart in FIG. 12 indicates that the steps followed are to "Look up in NSN/COS Table to get OCOS for P1" and "Return OCOS In Command Message (C8)", the latter step invoking the assembly of the command message indentified by the ref. code "C8" by the data base microprocessor and operating under IPB loader program to load the command message in the outgoing IPB 171 in the path to the partner microprocessor SMP.

Figure 13:
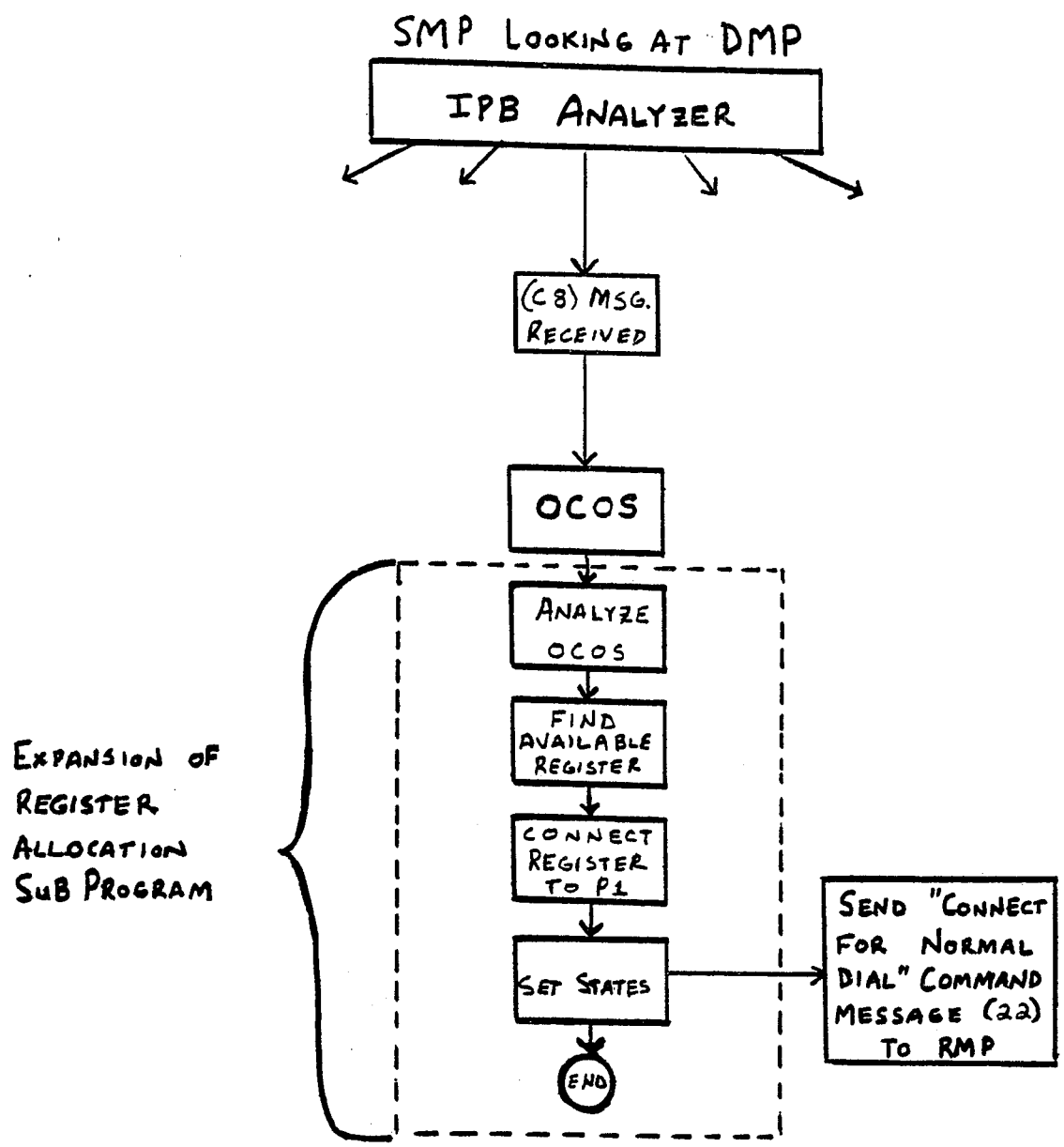

SMP Operations FIG. 13

The next program segment, shown in FIG. 13, represents the response of the state microprocessor; scanning the incoming IPBs under the IPB analyzer program, the state microprocessor receives the command message identified by the reference code "C8", and invokes the command handler sub-program to analyze the OCOS, find an available register, connect the line circuit thereto, and place the line and tone receiver into the IN-Register States, and load a command message identified by the ref. code 22, representing a command to "connect for normal dial", in an outgoing IPB 152 which is coupled to the register microprocessor RMP. Format of the complete command message identified by the ref. code 22 is shown in Table 3, and includes together with the reference code: R/LS8/MS4.

RMP Operations FIG. 15

Referring not to FIG. 15, the response of the register microprocessor RMP is shown in the upper part of the figure. It is illustrated that the register microprocessor RMP driven by the IPB analyzer program, scans the incoming IPBs, and detects the stored message in the incoming IPB 152. The command message identified by the reference code 22 "connect for normal dial" is received and in the command handler sub-program invoked in response, the specified register seized and set up to receive digits dialed from the originating party P1, and a dial tone sent to the originating line or party P1.

Also shown in FIG. 15 in the upper right hand portion of the Figure, is the program segment representing the further action of the register microprocessor RMP under program control after a brief time interval. The register microprocessor RMP is driven by the register scanner program and monitors the sense byte of the seized register. When the first dialed digit has been received, the dial tone is removed from the P1 line, and a command message, identified by the ref. code 72, sent to the data base microprocessor DMP, requesting a first digit translation. The command message of ref. code 72 is loaded into the outgoing IPB 153. The format of the command message identified by the ref. code 72, as shown in Table 3, is R/Digit/LS8/MS4.

Referring to the exemplary "station-to-station call sequence" above, the list of reference codes A2, 6E, 62, C8, 22, and 72 correspond, respectively, to the programmed operations diagrammed in the flow charts of FIGS. 10-13 and the upper two portions of FIG. 15.

Figure 14:
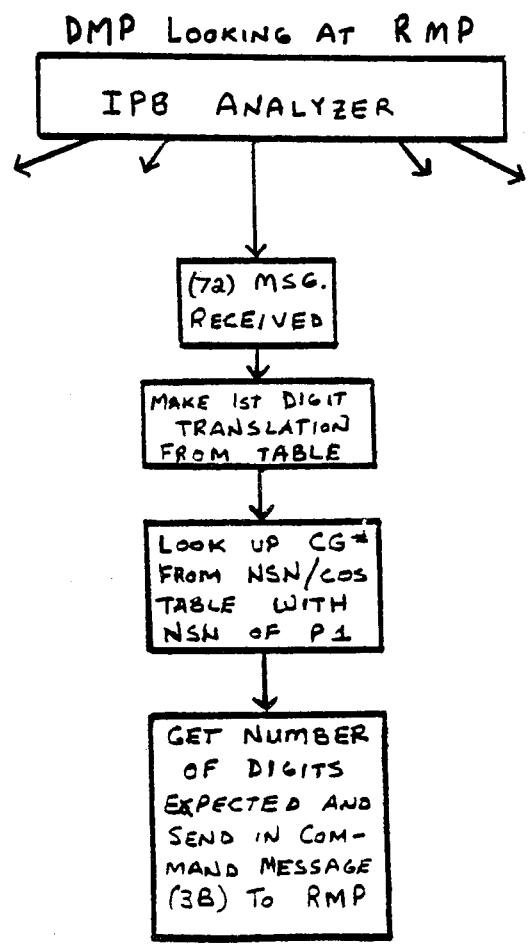

DMP Operations FIG. 14

FIG. 14 is a flow chart of the programmed operation of the data base microprocessor DMP to scan the incoming IPBs under the IPB analyzer program and in response to receiving the command message identified by the ref. code 72 to branch to the command handler sub-program. The steps of FIG. 14 correspond to the ref. code 3B listing in the "station-to-station call sequence" which is identified as the command "Receive n more digits".

To provide such information as to the number of expected digits, the data base processor DMP has in the data base memory, a first digit translation table 315. The NSN/COS table under a command handler sub-program is addressed with the network slot number (NSN) to obtain the customer group number (CG#) of the originating party P1. Using the found CG# and the first digit dialed, the expected length of the directory number is found in the first digit translation table 315. In most instances a firm response may be given, based on the CG# and the 1st digit translation table, that the directory number having that first digit is one, two, three or more digits in length. Any directory number that is not firm, is flagged for "hesitation dialing". A command "Expect n digits", the maximum number included in the numbering plan is returned to the register microprocessor RMP. With the register microprocessor programmed to recognize "hesitation dialing", the register microprocessor will expect "n" digits but recognize a directory number with fewer than "n" digits by the occurrence of a predetermined "hesitation" interval. A directory number having less than four digits is treated as left zero filled to the total of four digits, for indexing the number in the intermediate and lower levels 312, 314 of the directory number table.

One of the features of this invention is that the numbering plan can be completely flexible allowing virtually a completely free choice of directory numbers; for example the following may be assigned as directory numbers to different stations in the same customer group, or in different customer groups, or may be assigned to different functions without constraint:

(1) 1,
(2) 1, 2
(3) 1, 2, 3
(4) 1, 2, 3, 4

Even though such four directory numbers may have the same first digit, and are in the same customer group, the system can accomodate the use of such numbers.

In many telecommunication systems heretofore, access codes to special features are required to be in a dedicated group of codes. In the present system, access codes to functions or directory numbers of called station are all treated as "normal" directory numbers. The function of "call forwarding" for example, may be preassigned a directory number of as few or as many digits as desired and in any area of the numbering plan desired, since a directory number designates a system function, according to the present invention. When the full number of digits assigned as a directory number to a function such as "call forwarding" have been dialed, then received and stored in one of the registers by the register microprocessor RMP, the digits are transferred as a "normal dialed number" to the data base microprocessor DMP, precisely as illustrated in the case of the "standard call" function as diagramed in the lower righthand flow chart on FIG. 15.

In short, all system functions (standard call, and the other functions such as conference call, group hunt, etc.) involve the same sequence of programmed operations shown in the flow charts of FIGS. 10–15, and the same sequence of reference codes listed above in the exemplary listing through ref. code 74, the eighth listed.

Directing attention, therefore, to the ninth ref. code in the station-to-station call sequence; namely, "C9", identified as the "standard call" command, according to the listing such ref. code is assembled and transmitted in a command message to the state microprocessor SMP. Table 3 provides the format of the command message identified by the ref. code "C9" and states that it contains in subsequent bytes following the reference code:

| | |
|---|---|
| LS8(P1)/MS4 | network slot number of P1 |
| LS8(P2)/MS4 | network slot number of P2 |
| (P1) TCOS | terminating class of service P1 |
| (P2) TCOS | terminating class of service P2 |
| P1 (OCOS) | originating class of service P1 |

Figure 16O:
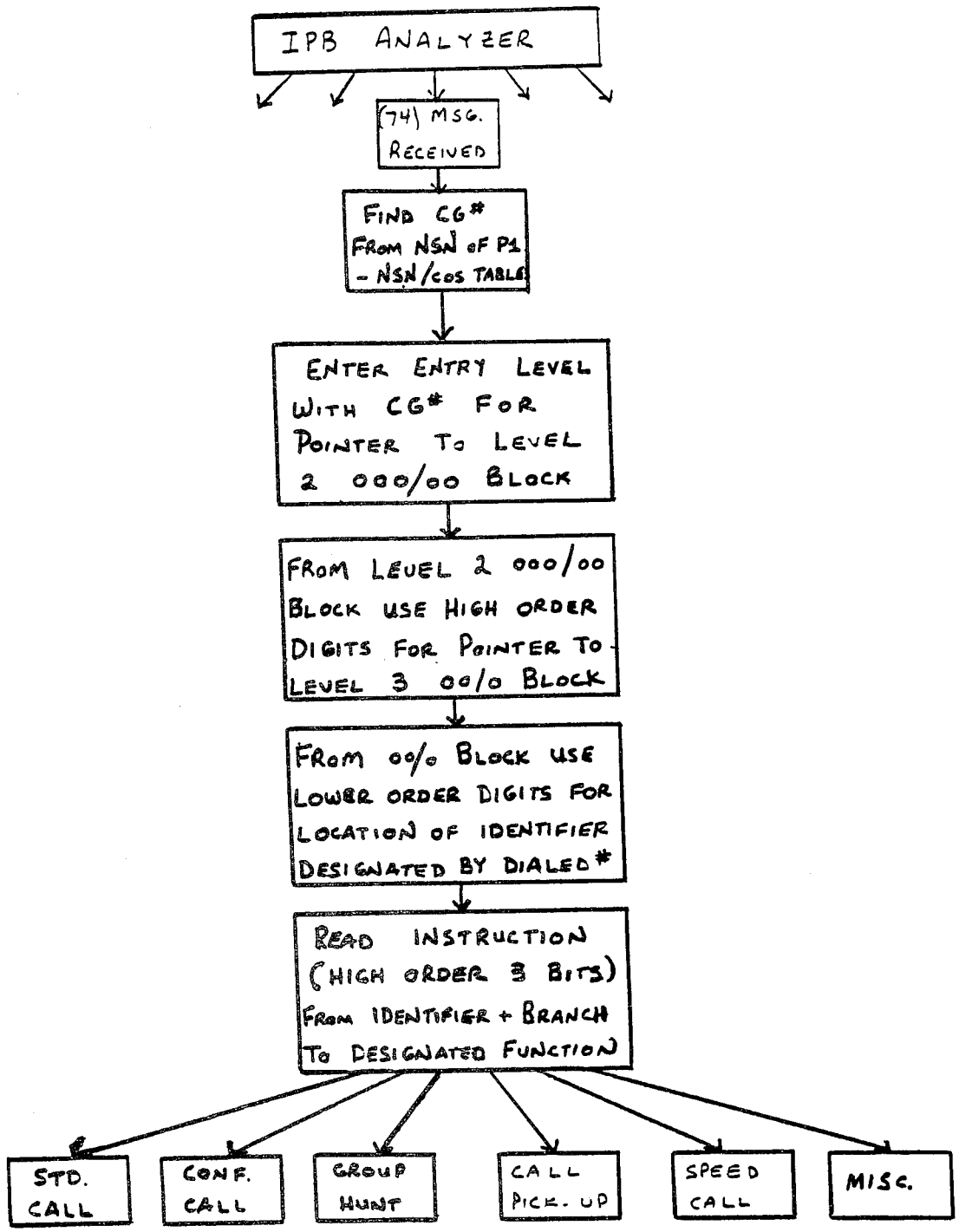

DMP Use Of DN Table FIG. 16

In the earlier section of this disclosure entitled "Data Base Microprocessor and Stores—Directory Number Table", how the directory number table 300 of the data base memory is utilized for correlating system operational functions and dialed directory numbers separately for each customer group was fully described. In brief, the directory number table is a multiple level table in which the various levels are linked by pointers. Locations in the lowest level store coded electrical signals representing a two byte identifier word having a three bit instruction portion and one and one-half bytes representing an argument of the instruction. The format of the identifier word is disclosed in FIG. 5 and is the same for all categories of system functions. As shown in this Figure, the three bit instruction word designates one of the larger categories of system functions by the pattern of bits. The one and one-half bytes representing an argument of the instruction, in the case of the "standard call" function represents the network slot number (NSN) of the called party P2. In the case of group hunt, speed call and call pick-up functions, the argument portion of the identifier work represents an identification (ID) number serving as a pointer to separate tables of further data. In the case of the hunt group, for example, the "ID" is an address pointing to one of multiple lists of network slot numbers. Under program control the data base microprocessor will hunt through the designated hunt group for an idle station. In the case of the speed call "ID", the identification number is a pointer address to lists of directory numbers, including prefixes and area codes which are designated by an abbreviated directory number for convenience in dialing.

In the case of the conference call function, as indicated in FIG. 5, the one and one-half bytes of data provide the "conference ID number", type, i.e., is it preset conference, progressive conference of a "meet me" type conference—this two bit code thus identifies which type of conference is designated by the identifier word. The final five bits of the argument portion of the identifier word identifies the size of the conference call.

The conference ID number is a pointer address to another table which identifies a specific port by network slot number of the conference hardware network, and can be utilized in establishing the conference call connections.

With regard to the miscellaneous features or miscellaneous functions argument portion of the identifier word, the one and one-half bytes are used to store a standardized access code which is a reference to the specific system function to be performed. For instance in the case of "message waiting", one of the miscellaneous functions, a dialed number is converted to the standardized number for that "message waiting" function, which in turn directs the state microprocessor SMP to execute assigned tasks to perform this function. To carry out the "message waiting" function, the state microprocessor redirects the register microprocessor RMP (which is already connected) to receive digits from the last dialing to now collect digits of a directory number, specifically for the purpose of placing the directory number identifying a station in a "message waiting" mode.

The directory number table is addressed in response to the combination of (1) coded electrical signals representing a dialed directory number and (2) coded electrical signals identifying the customer group number (CG#) of the originating station P1. The entry level of the table is indexed by the CG#, to find a pointer to the intermediate level of the table, which has blocks of locations corresponding to the customer groups. The intermediate level is indexed by the two higher order digits of the directory number, to obtain the pointer address of one of the multiple blocks of locations in the lowest level. The location in the addressed lowest level block is indexed by the two lower order digits of the directory number.

Referring to FIG. 16, this flow chart illustrates the command handler sub-programs which drives the data base microprocessor DBM in response to the "normal dialed #" command 72. As in the case of the other microprocessors of the control complex 55, the data base microprocessor is driven under control of an IPB analyzer program, to scan the incoming IPBs and detect and read the normal dialed number command message identified by the ref. code 72. This command message includes the digits of the dialed number (see Table 3) together with the reference code 72, and is transmitted from the register microprocessor RMP and stored in the IPB 153. FIG. 16 represents expansion of the command handler sub-program driving the data base microprocessor in response to receiving the command message identified by the ref. code 72, and illustrates that the CG# is obtained using the network slot number of P1 and the NSN/COS Table. The CG# is used to enter the directory number table 300, as indicated in the next logic block of FIG. 16, and obtain the pointer address to the intermediate level 000/00 (thousands/hundreds) block. Referring now to FIG. 4, this Figure illustrates the structure and organization of the directory number table and represents that structure as three linked levels of memory locations and represents the two byte identifier word including the instruction and argument portions previously described as providing system function identification and data utilized in executing such a system function. This directory number table is preferably implemented in hardware by RAM provided by semiconductor memory devices compatible with the microprocessors. Practical embodiments of the illustrated system have been implemented with INTEL 8080 or Texas Instruments TMS 8080 microprocessors, and compatible memory devices.

To provide a brief example of how a location in the lowest level of the directory number table is addressed by the data base microprocesor, taking for example, a directory number "0047" as given in FIG. 4, and assuming that the system provides for customer groups and that the originating station is in customer group number "7", the block labeled "7" in the intermediate level of the table is shown addressed from the "7" customer group location in the entry level. The location block "7" of the intermediate level is indexed by the two higher order digits. Assuming that directory number of "0047", the two higher order digits "00" index the first location in the "7" block. This block contains the pointer address of one of the multiple blocks in the lowest level table. The arrow points to the lowest level block, and the two lower order digits "47" index the location in that lowest level block containing the identifier word designated by a combination of the customer group "7" and directory number "0047".

Referring again to FIG. 16, the designated function represented by the bit pattern of the higher order three bits in the identifier word, is one of the system functions listed in the six blocks at the bottom of FIG. 16.

In the case of the "standard call" function, as shown in FIG. 5. The argument of the instruction is the network slot number (NSN) of the called party P2.

The data base microprocessor assembles the command message identified by the standard call reference call "C9" and loads, under the IPB loader program, the command message including reference code, into the outgoing IPB 171. As a preliminary to assembling the "standard call" command message, the data base processor also tests, as shown in FIG. 19, "is the call diversion in effect for the called to party?" Among the tables and memory fields of the data base memory is a table called the transient COS table, which includes a listing of all stations or parties on call forwarding status. The question—is the call diversion in effect—for the party P2, is determined by checking the transient service area provided by the transient table. If the answer to that question is "no", the sub-program driving the data base microprocessor branches to the routine to "prepare and send" the "standard call" command message to the IPB 141. If the answer to the call diversion question is "yes", and it is not a "conditional" call diversion, then the network slot number of the station to which calls are to be forwarded is determined, and the command message prepared and sent to the IPB 141 by the data base microprocessor. In place of using the network slot number of "P2", the network slot number is used of the station to which the party P2 calls are to be diverted or "forwarded".

In addition to the network slot number of the originating party P1, and the network slot number of the called party P2, or in the case of a diverted call the network slot number of the station to which calls are being forwarded, certain class of service information of both parties P1 and P2 is required in the assembly of the command message by the data base microprocessor DMP. That class of service data is obtained from the NSN/COS table using the network slot number of the called party P2. That class of service data for the parties P1 and P2 included in the command message, is subsequently utilized by the state microprocessor in determining whether the class of service assigned to the calling or called party restricts the completion of the standard call between them.

Figure 17:
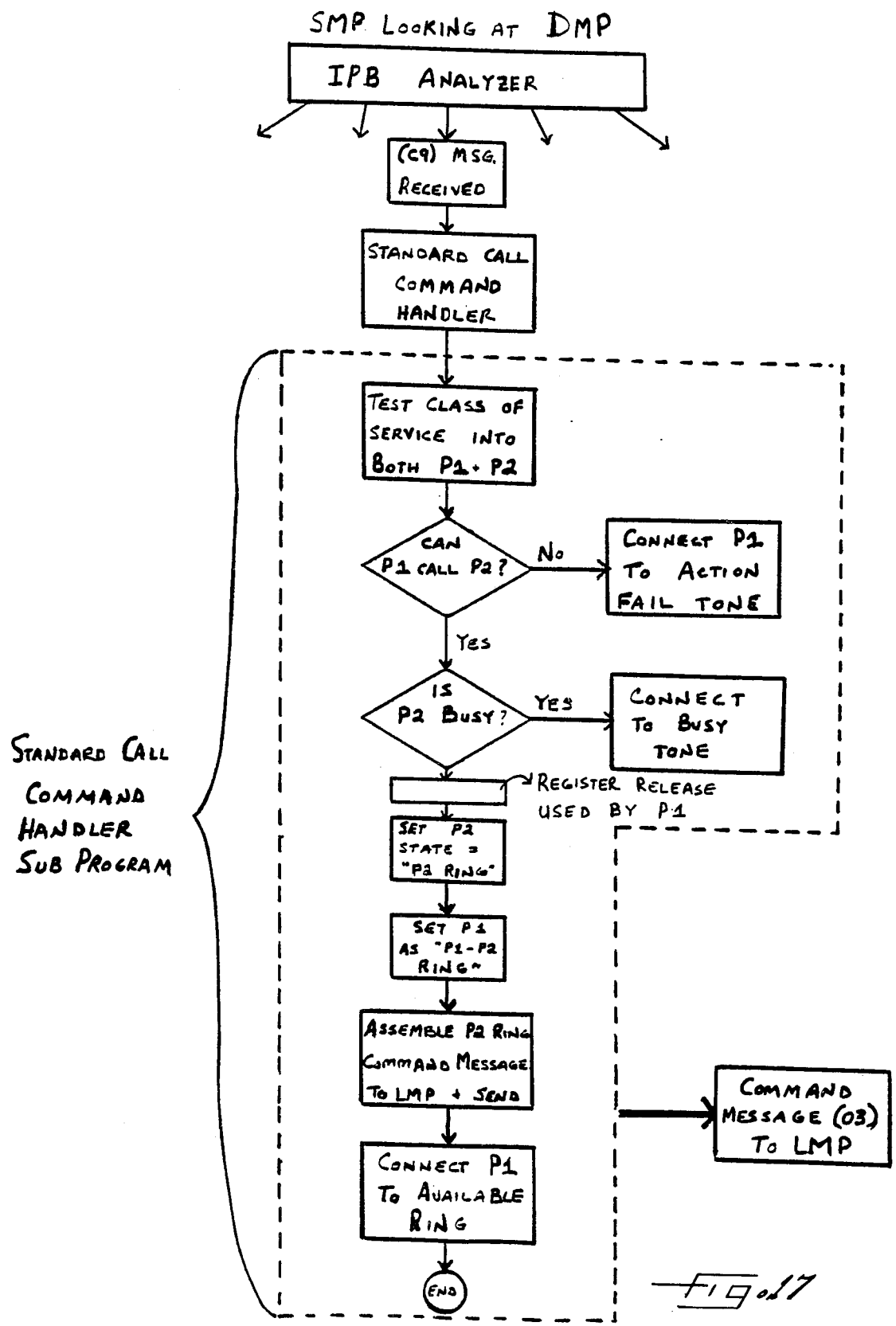

SMP Operation FIG. 17

Now turning to FIG. 17, this flow chart represents the operation of the state microprocessor SMP under the IPB analyzer program, and the scanning of the incoming IPBs for messages. The message previously loaded into the IPB 141 by the data base microprocessor and identified by the command "C9" is detected and read. The standard call command handler sub-program is invoked and as shown in the lower portion of FIG. 17, the state microprocessor tests the class of service of both parties and if it finds no restrictions, tests whether the called party is "busy", sets the appropriate states of P1 and P2, assembles a P2 ring command message and transmits a command message identified by the ref. code "03" to the outgoing IPB 142.

As noted in the "station-to-station call sequence" the "03" reference code represents a "send ring" command to the line microprocessor. The state microprocessor also sends the command message identified by the code "60" if it finds P2 in a busy state.

Figure 18O:
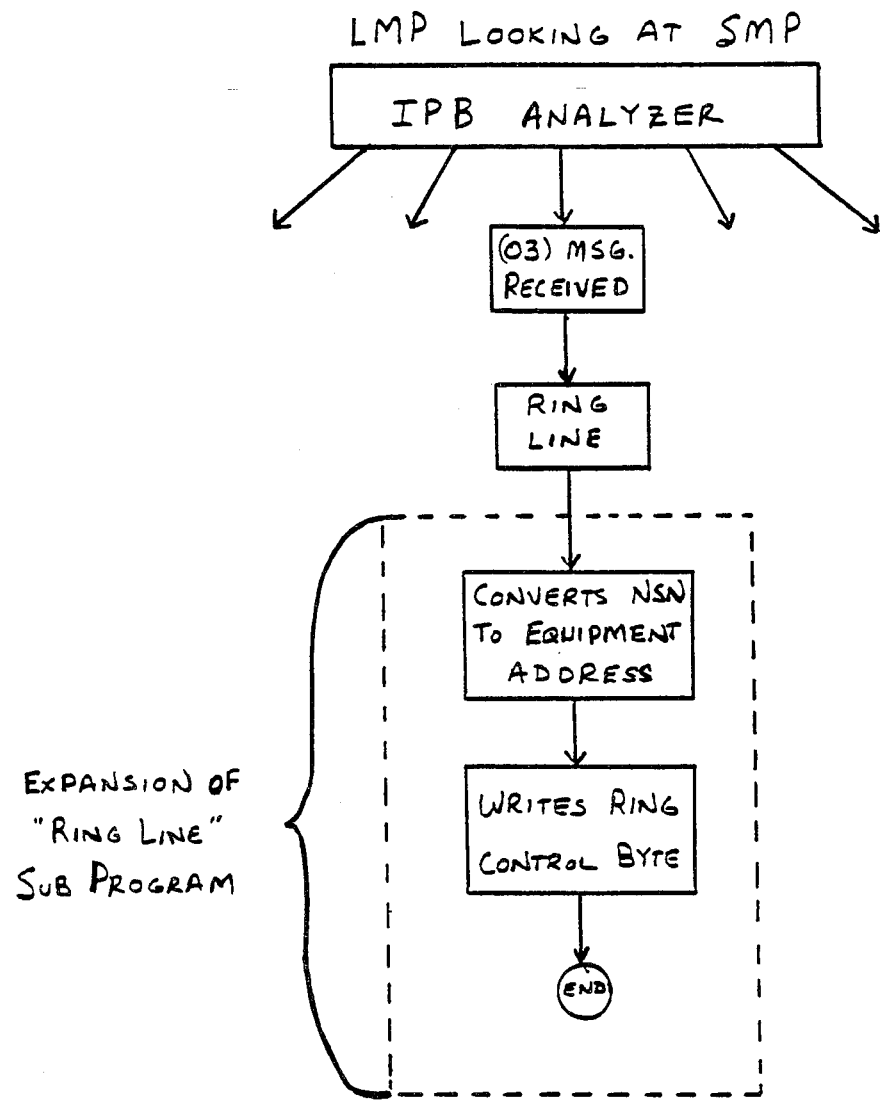

LMP Operation FIG. 18

FIG. 18 illustrates the operation under program control of the line microprocessor, specifically the operation under the IPB analyzer program driving the line microprocessor LMP to scan incoming IPBs for messages. As indicated in FIG. 18, the line microprocessor LMP in scanning the incoming IPB 142, unloads the command message represented by the ref. code "03" and recognizes that command message as a command to ring the P2 line. It receives, as indicated in Table 3, the network slot number of the called party (either the party P2 or the station to which the original P2 calls have been diverted by a call forwarding function) and the newtork slot number is converted to an equipment address under a sub-program provided for that purpose for driving the line microprocessor LMP. The flow chart of FIG. 18 of the operation of the line microprocessor terminates with the "writes ring control byte" step being executed. Referring to the station-to-station call sequence, that illustrates the establishing of the two-way talk path by the line microprocessor and the sending of the command message identified by the code A2 to the outgoing IPB.

DMP Program Hierarchy FIG. 9

In carrying out the invention, the data base microprocessor is provided in its program memory with stored command handler sub-programs which are invoked in response to command messages read from incoming IPBs. The chart of FIG. 9 is included to illustrate the data base microprocessor program hierarchy. The first block represents the IPB analyzer program level routine executed by the data base microprocessor in analyzing incoming IPBs for such messages, and in response to those incoming messages invoking a "function module"; i.e., a sub-program called for by the reference code in the command message. An incoming message might be, for example, a request for originating class of service data (ref. code 62) or for a first digit translation (ref. code 72) which would call for the data base processor to access the NSN/COS table, and the first digit translation table of the data base memory stores, to obtain the requested data and return the data to the requesting processor.

In keeping with the invention, one of the principal operations carries out by the data base microprocessor is the execution, under control of a command handler sub-program, of steps and response to receiving the digits of a dialed number from the register microprocessor (RMP) together with the "normal dialed number" command (74). This is specifically depicted in the chart of FIG. 9 as represented by the legend "normal dialed number analyzer". Under sub-program control the data base microprocessor is operated to access the directory number table 300 for the identifier word corresponding to the received dialed directory number. As illustrated in FIG. 9, having accessed the directory number table 300 and read the identifier word, the data base microprocessor initiates performance of that one of the system functions designated (see FIG. 5) by the instruction portion of the identifier word; i.e., standard call, conference call, group hunt, call pick-up, speed call, miscellaneous features.

Standard Call Function (FIG. 19)

The steps carried out by the data base microprocessor DMP in response to the reading of the instruction (000) designating "standard call" from an identifier word location in the directory number table are shown in FIG. 19. These steps result in the assembly and sending of the standard call message (C9) to the state microprocessor SMP via the outgoing IPB 141.

Figure 20:
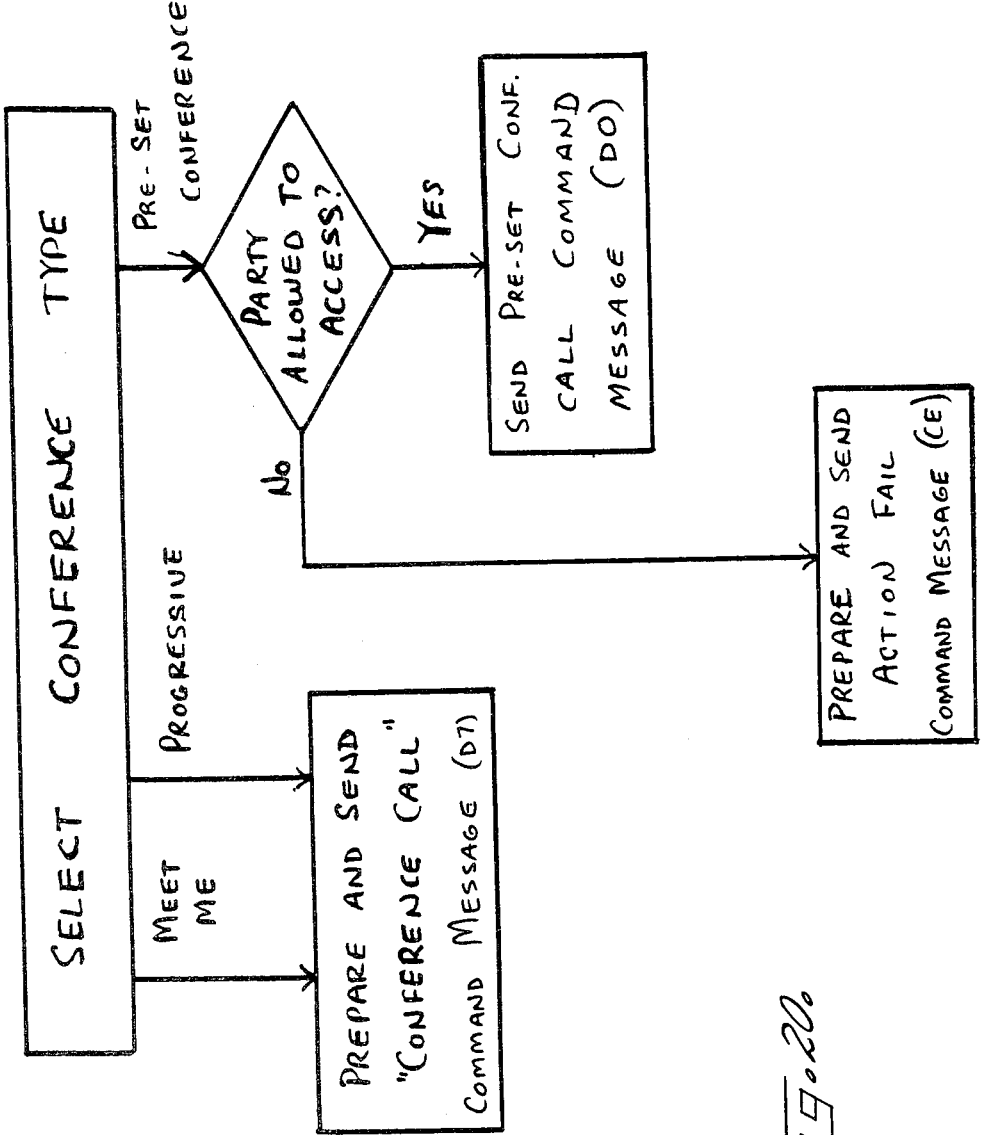

Conference Call (FIG. 20)

Referring to FIG. 20, the steps carried out by the data base microprocessor in response to the reading of the instruction (100) designating "conference call" in an identifier word located in the directory number table, are illustrated in this flow chart. Referring to FIG. 5, the "type" code in the argument portion of the identifier work specifies whether the conference call is "meet me or progressive" or a "preset" conference. If either a "meet me" or "progressive" type conference, both being handled in essentially the same manner, the data base microprocessor DMP prepares and sends a conference call command message D7 to the state microprocessor, the contents of that command message being shown in Table 3.

In the case of the "preset" conference the decision is made as to whether the party is allowed to access, by analysis of the class of service data and restriction table—if the answer is "no", the data microprocessor DMP prepares and sends an action fail message (CE). If there is no restriction on the party, the preset conference is set-up by preparing and sending the command message DO (see Table 3).

Figure 21:
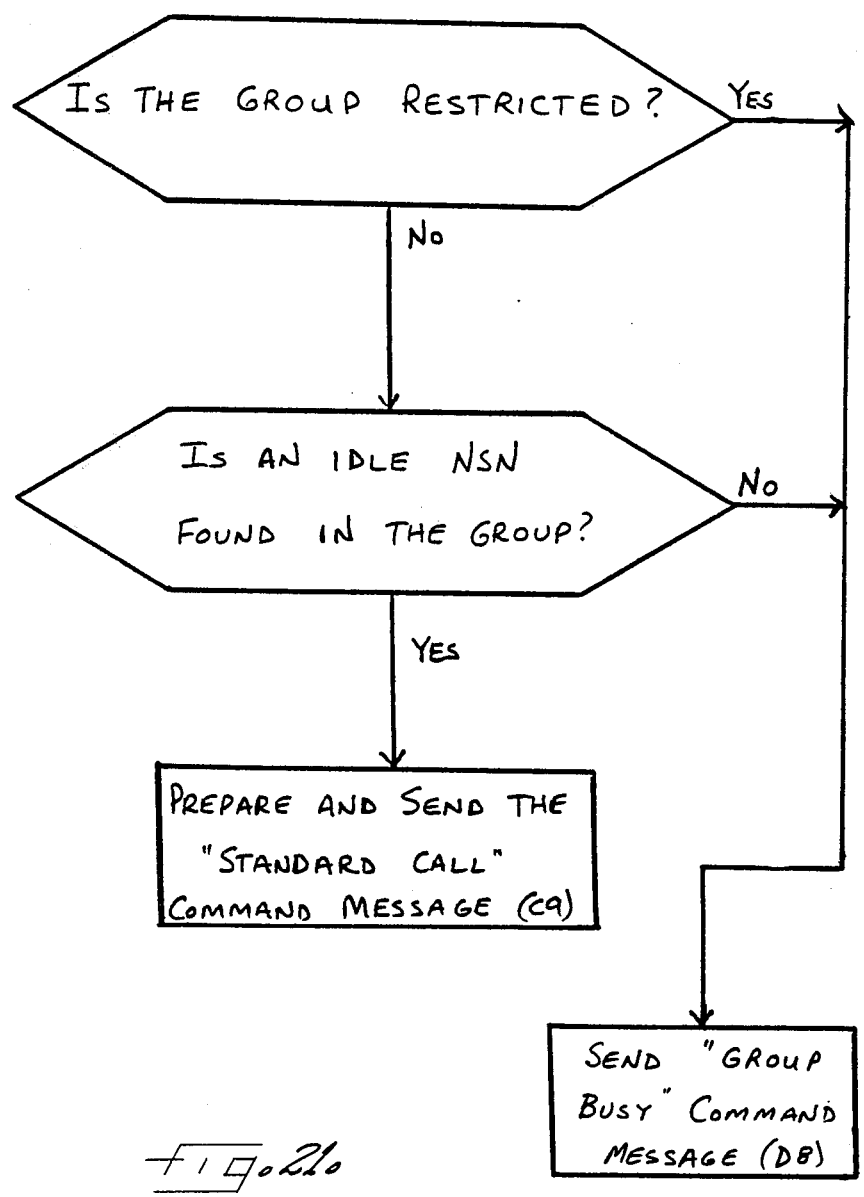

Group Hunt (FIG. 21)

As noted earlier, in the group hunt operation a search is made through a listing of NSN numbers for an idle station, or trunk when the group hunt directory number is dialed and the dialed digits are received by the data base microprocessor DMP. Shown in FIG. 21 are the steps executed in response to finding a directory number table identifier word containing the group hunt instruction "001". If the group is "restricted" from access to the calling party, a "group busy" command message D8 is returned to the state microprocessor. If unrestricted, the question is asked "is an idle NSN found in the group?". If there is no idle station in the group listing, the same "group busy" command message D8 is returned to the state microprocessor. If an idle NSN number is found, the call is processed to the network slot number in the same manner as completing a "standard call", by the data base microprocessor preparing and sending the command message C9 to the state microprocessor SMP.

Figure 22:
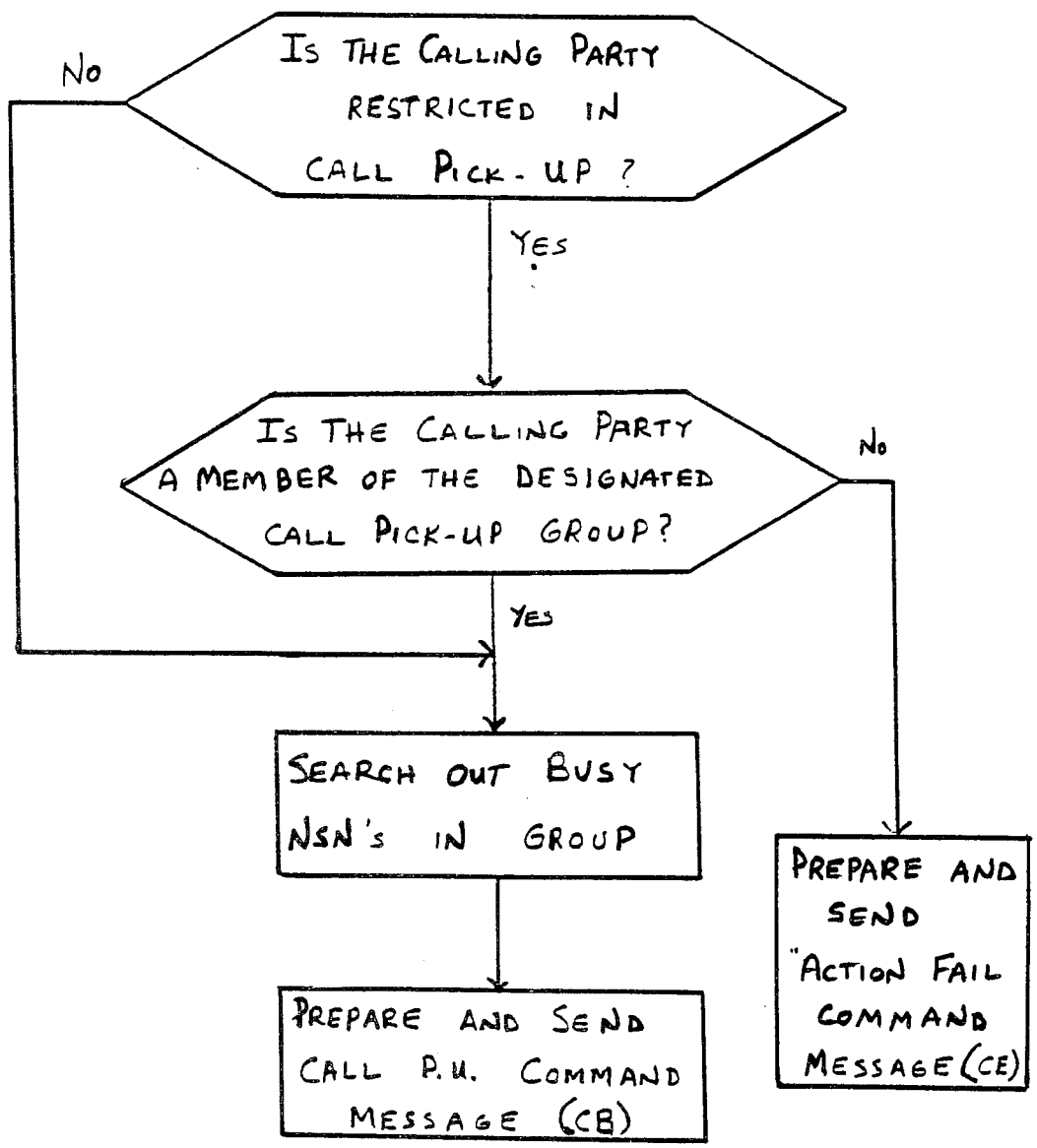

Call Pick-Up (FIG. 22)

The steps executed under sub-program control in the data base microprocessor in response to the reading of the instruction (110) designating call pick-up from the identifier word in a location in the directory number table, are illustrated in this Figure. "Call Pick-Up" is a system function by which one station may answer incoming calls to any station in a "call pick-up group". Thus, referring to FIG. 22, if it is determined that the calling party is restricted, from general call pick-up, and is not a member of the designated call pick-up group, the data base microprocessor sends an action fail (CE) message. Otherwise it will search out the network slot numbers in the group that are in a "busy" state and prepare and send a call pick-up (CB) command message using the network slot number of a station searched out in the preceding step.

Figure 23:
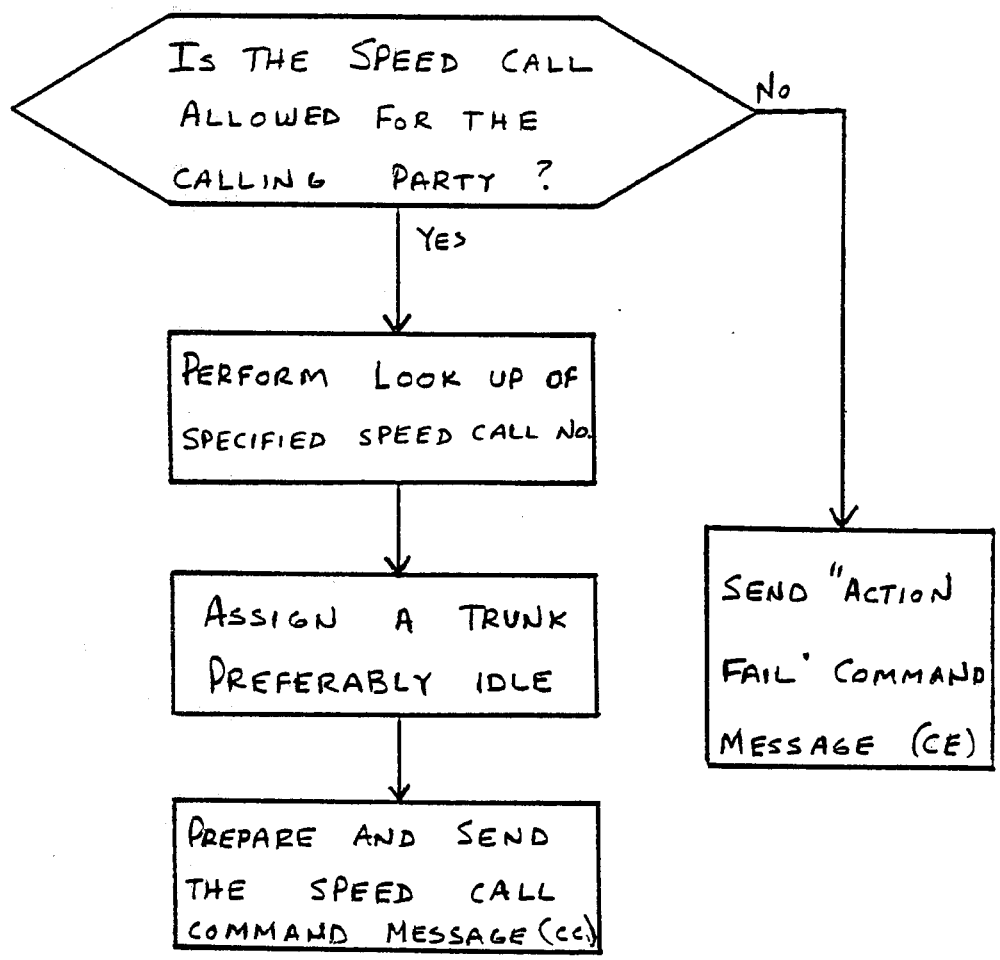

Speed Call (FIG. 23)

The programmed operations carried out by the data base microprocessor under subprogram control in response to the reading of an instruction (011) of an identifier word in the directory number table designating "speed call" are shown in FIG. 23. These steps conclude with the preparation and sending of the "speed call" command message CC (See Table 3) by the data base microprocessor. "Speed call" is the system function in which by dialing a directory number, typically abbreviated, a more extensive multi-digit number is located in a look-up table containing the correlation between the abbreviated directory number and the pre-designated multidigit number. As shown in FIG. 23, the data base microprocessor DMP carries out the step of performing look-up of the specified speed dial number, a trunk is assigned, preferably an idle trunk, and the "speed call" command message CC is transmitted to the state microprocessor which executes the steps required to transmit the dial tones over the trunk and complete the call.

Figure 24:
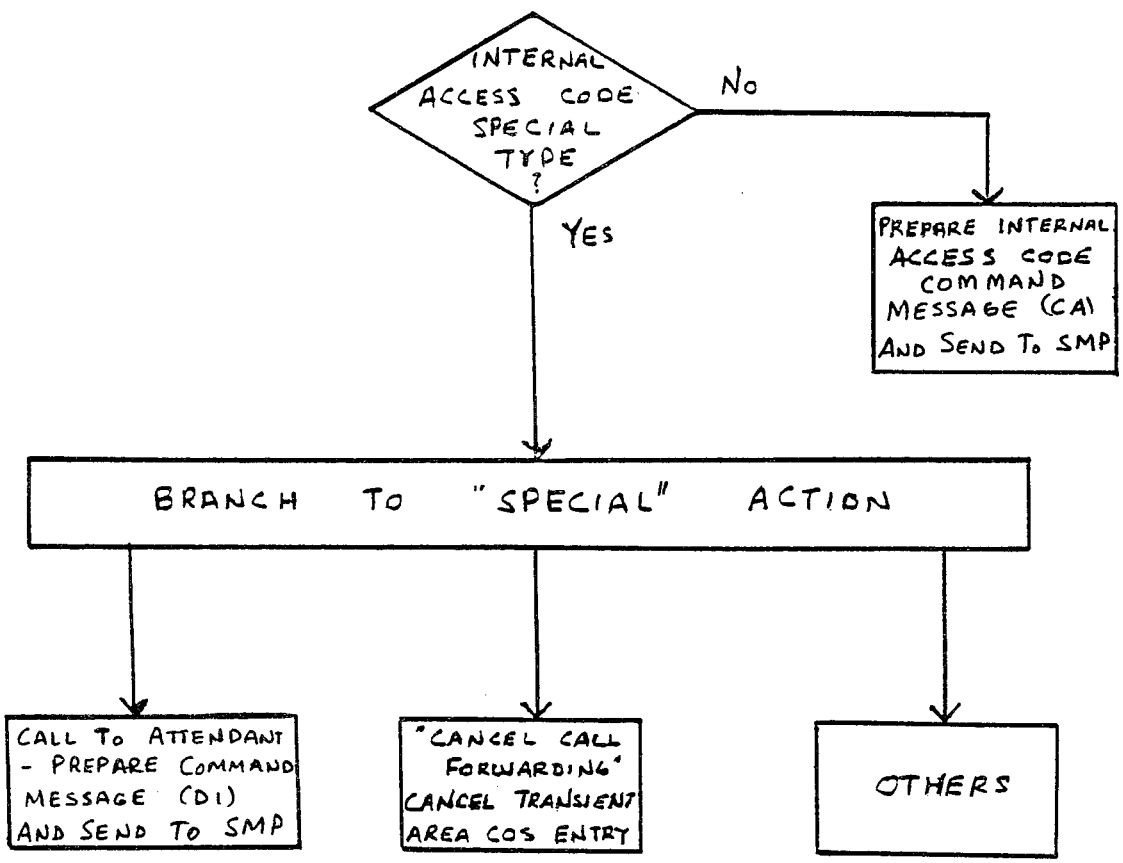

Miscellaneous Function Access Code (FIG. 24)

Now turning to FIG. 24, the steps are shown which are carried out by the data base microprocessor DBM in response to reading an identifier word from the directory number table 300, having the instruction (010) in the left three bits, designating that the internal access code in the argument portion of the identifier word is in the class of miscellaneous functions or features. Thus, the question is asked (FIG. 24) "internal access code special type?". If "yes", as indicated the sub-program branches to one of several routines for handling a special type of code. Examples given are "call to attendant" and "cancel call forwarding". These "special type" access codes are provided because they represent system functions which are required typically on a very frequent basis or which are directly completed by the data base microprocessor DMP without further interchange of commands with other microprocessors. An example of the latter case is to cancel a station on "call forwarding" so that subsequent calls will be completed as dialed, rather than to the call forwarding network slot number. Such involves the straight-forward step shown in FIG. 24, of canceling "transient area COS entry". Since the state of a party on the "call forwarding" status is determined by checking the transient area for the designated network slot number, to remove a party from call forwarding requires only canceling the transient area entry, as shown. The former case is illustrated by "call to attendant" which results in the data base microprocessor DMP preparing a special command message, (D1) which is loaded into the outgoing IPB in the communication path with the state microprocessor SMP, and initiates the operation of the microprocessors to execute that special function.

Other miscellaneous function access codes, not considered special are handled by the data base microprocessor DMP constructing the access code command message (CA) and inserting into it the standardized internal access code given in the argument portion of the identifier word, and loading that command message in the IPB in the communications path with the state microprocessor SMP.

TABLE 2

| | Abbreviations of IPB Commands |
|---|---|
| A | ATTENDANT |
| AL | ALPHA |
| ARG | ARGUMENT |
| AS | ATTENUATOR SELECTION |
| BI | BUSY IDLE |
| CCF | CODE CALL FLAG NIBBLE |
| CG | CUSTOMER GROUP |
| CONF | CONFERENCE |
| COS | CLASS OF SERVICE |
| TAAS | TRUNK ANSWER ANY STATION |
| PCD | PATIENT CALL DIVERSION |
| DN | DIRECTORY NUMBER |
| DSPL | DISPLAY |
| ET | ELAPSED TIME |
| F | FLAG |
| FNS | FLEXIBLE NIGHT SERVICE |
| GB | GROUP BUSY |
| G/S | GROUP/SPECIFIC FLAG |
| HIG | HIGH ORDER PART OF GROUP NO. |
| LOG | LOW ORDER PART OF GROUP NO. |
| LS8 | LEAST SIGNIFICANT 8 DIGITS OF NSN |
| MS4 | MOST SIGNIFICANT 4 DIGITS OF NSN |
| NS | NIGHT SERVICE |
| NSN | NETWORK SLOT NUMBER |
| OF | OVERRIDE FLAG |
| OCOS | ORIGINATING CLASS OF SERVICE |
| OG | OUT-GOING |
| OW | OUTWARD |
| P | PARTY |
| PS | PARTY SPLITTING |
| PP | PARTY PARKED |
| QF | QUANTITY FOLLOWING (NUMBER OF BYTES FOLLOWING IN COMMAND) |
| R | REGISTER (WHEN ALONE, ALWAYS MEANS REGISTER EQUIPMENT NUMBER) |
| RMJ | RIGHT MOST JUSTIFIED |
| RSN | REASON |
| S | STATION |
| SAC | STANDARDIZED ACCESS CODE |
| SG | STATION GROUP |
| SH | SECRETARY HUNT |
| STD | STANDARD |
| T | TRUNK |
| TCOS | TERMINATING CLASS OF SERVICE |
| TG | TRUNK GROUP |
| TGN | TRUNK GROUP NUMBER |
| V | VECTOR POINTING TO ASSOCIATED ATTENDANT'S LOOP |
| / | SEPARATION OF BYTES WITHIN COMMAND MESSAGE FORMAT |
| ; | SEPARATION OF FIELDS WITHIN MESSAGE BYTES |

TABLE 3

| IPB COMMANDS | | | | |
|---|---|---|---|---|
| COMMANDS RECEIVED BY THE LMP | | | | |
| Ref. Code | Rcvr. | Sender | Command Description | Command Message Format Byte 1 Byte 2 |
| 02 | LMP | SMP | Terminate Ring | LS8 / MS4 |
| 03 | LMP | SMP | Send Ring | LS8 / AS Code; MS4 |
| 04 | LMP | SMP | Disable Flash | LS8 / MS4 |
| 05 | LMP | SMP | Enable Flash | LS8 / AS Code; MS4 |
| 06 | LMP | SMP | Set Attenuator | LS8 / AS Code; MS4 |
| COMMANDS SENT BY THE LMP | | | | |
| Ref. Code | Rcvr. | Sender | Command Description | Command Message Format Byte 1 Byte 2 |
| A2 | SMP | LMP | Line Origination | LS8 / MS4 |
| A3 | SMP | LMP | Line Flash | LS8 / MS4 |

TABLE 3-continued

IPB COMMANDS

| Ref. Code | Rcvr. | Sender | Command Description | Command Message Format |
|---|---|---|---|---|
| A4 | SMP | LMP | Line Disconnect | LS8 / MS4 |

COMMANDS RECEIVED BY THE TMP

| Ref. Code | Rcvr. | Sender | Command Description | Command Message Format Byte 1 Byte 2 |
|---|---|---|---|---|
| 12 | TMP | SMP | Seize Trunk | LS8 / AS Code; MS4 |
| 13 | TMP | SMP | Request Trunk Disc. | LS8 / MS4 |
| 14 | TMP | SMP | Dialing Complete | LS8 / MS4 |
| 15 | TMP | SMP | P2 Answer | LS8 / AS Code; MS4 |
| 16 | TMP | SMP | Disconnect 9th Bit | LS8 / MS4 |
| 17 | TMP | SMP | Register Assigned | LS8 / MS4 |
| 18 | TMP | SMP | Register Released | LS8 / AS Code; MS4 |
| 19 | TMP | SMP | Recognize Flash | LS8 / AS Code; MS4 |
| 1A | TMP | SMP | Disregard Flash | LS8 / MS4 |
| 1B | TMP | SMP | Set Attenuator | LS8 / AS Code; MS4 |

COMMANDS SENT BY THE TMP

| Ref. Code | Rcvr. | Sender | Command Description | Command Message Format Byte 1 Byte 2 |
|---|---|---|---|---|
| A8 | SMP | TMP | Incoming Trunk | LS8 / MS4 |
| A9 | SMP | TMP | Trunk Disconnect | LS8 / MS4 |
| AA | SMP | TMP | P2 Answer on O.G. Trunk | LS8 / MS4 |
| AB | SMP | TMP | Stop Dial | LS8 / MS4 |
| AC | SMP | TMP | Allow Dial | LS8 / MS4 |
| AD | SMP | TMP | Trunk Flash | LS8 / MS4 |
| AE | SMP | TMP | Seize Fail | LS8 / MS4 |

COMMANDS RECEIVED BY THE CMP

| Ref. Code | Rcvr. | Sender | Command Description | Command Message Format Byte 1 Byte 2 Byte 3 Byte 4 |
|---|---|---|---|---|
| 42 | CMP | SMP | Attendant Call | LS8 / MS4 / Type |
| 43 | CMP | SMP | Attendant Recall | LS8 / MS4 / Type |
| 46 | CMP | SMP | Disconnect in Queue | LS8 / MS4 |
| 47 | CMP | SMP | Disconnect in Loop | LS8 (P) / MS4/ LS8 (A)/MS4 |
| 48 | CMP | SMP | P2 Answer | LS8(P2)/MS4/LS8(A)/MS4 |
| 49 | CMP | SMP | In-Loop Recall | LS8(P)/ MS4/LS8(A)/MS4 |
| 4A | CMP | SMP | Affirm (Conn. Compl.) | LS8(P)/ MS4/ V |
| 4B | CMP | SMP | Disaffirm (Conn. Fail) | LS8(P)/MS4/V/RSN |
| 4C | CMP | SMP | Wake-up Fail | LS8/MS4 |
| 4D | CMP | SMP | TAAS Request | LS8/MS4/TAAS COS |
| 4E | CMP | SMP | Split to Attendant | LS8(PS)/MS4/LS8(PP)/MS4 |
| 4F | CMP | SMP | Call to Specific Attn. | LS8(P)/MS4/LS8(A)/MS4 |
| 50 | CMP | SMP | Conference Net Status | Busy / Idle-Flag |
| 58 | CMP | DMP | Std. COS Retrieval | COS/COS/COS/DSPL#1/DSPL#2 |
| 5A | CMP | DMP | Trunk Group Status | 15-8 BI/7-0 BI |
| 5B | CMP | DMP | Wake Up Time | LS8/MS4/Hrs/Min |
| 5C | CMP | DMP | Split COS Retrieval | Same as 58, but 2 NSN's |

COMMANDS SENT BY THE CMP

| Ref. Code | Rcvr. | Sender | Command Description | Command Message Format Byte 1 Byte 2 Byte 3 Byte 4 |
|---|---|---|---|---|
| 88 | DMP | CMP | Request Console COS | LS8/MS4/Type |
| 8A | DMP | CMP | Seize Trunk of Group | CG, TGN/V |
| 8B | DMP | CMP | Restrict Trunk Group | CG,TGN |
| 8C | DMP | CMP | Unrestrict Trunk Group | CG,TGN |
| 8D | DMP | CMP | Group Camp-On | LS8/MS4/CG,TGN/V |
| 8E | DMP | CMP | Talk to Specific DN | CG/D3,D4/D1,D2/V |
| B8 | SMP | CMP | Park1 | LS8(P)MS4/LS8(A)/MS4 |
| B9 | SMP | CMP | Talk1 | LS8(P)MS4/LS8(A)/MS4/V |
| BA | SMP | CMP | Park2 LS8(P1)/ | LS8(P2)/MS4/LS8(A)/MS4 |
| BB | SMP | CMP | Talk2 LS8(P1)/MS4/ | LS8(P2)/MS4/LS8(A)/MS4/V |
| BC | SMP | CMP | Release | LS8(P1)/MS4/LS8(P2)/MS4 |
| BD | SMP | CMP | Disconnect | LS8(P)/MS4/LS8(A)/MS4 |
| BE | SMP | CMP | Start Dial | LS8(A)/MS4/V |
| BF | SMP | CMP | Conference | LS8(P)/MS4/LS8(A)/MS4/V |
| C0 | SMP | CMP | Override Disconnect | LS8(P2)/MS4/LS8(A)/MS4 |
| C1 | SMP | CMP | Override Talk | LS8(P2)/MS4/LS8(A)/MS4 |
| C2 | SMP | CMP | Unserviced | LS8/MS4 |
| C3 | SMP | CMP | Chain | LS8/MS4 |
| C4 | SMP | CMP | Wake-Up Ring | LS8/MS4 |

COMMANDS RECEIVED BY THE RMP

| Ref. Code | Rcvr. | Sender | Command Description | Command Message Format Byte 1 Byte 2 Byte 3 Byte 4 |
|---|---|---|---|---|
| 22 | RMP | SMP | Originating Station | R/LS8/MS4 |

TABLE 3-continued

IPB COMMANDS

| | | | | |
|---|---|---|---|---|
| 23 | RMP | SMP | Orig. D.I.D. Trunk | R/LS8/MS4 |
| 24 | RMP | SMP | Flash (Split) Station | R/LS8/MS4 |
| 25 | RMP | SMP | Set Call Forwarding | R/LS8/MS4 |
| 26 | RMP | SMP | Set Secretary Hunt | R/LS8/MS4 |
| 27 | RMP | SMP | Set P.C.D. | R/LS8/MS4 |
| 28 | RMP | SMP | Set Remote Call Fwd. | R/LS8/MS4 |
| 29 | RMP | SMP | Orig. Sta. C.F. Mode | R/LS8/MS4 |
| 2A | RMP | SMP | Cancel P.C.D. | R/LS8/MS4 |
| 2B | RMP | SMP | Set RM Outdial Restrict | R/LS8/MS4 |
| 2C | RMP | SMP | Set Flexible N.S. | R/LS8(A)/MS4 |
| 2D | RMP | SMP | Set Speed Dialing | R/LS8/CG, MS4 |
| 2E | RMP | SMP | Set Wake-Up Time | R/LS8(A)/MS4 |
| 2F | RMP | SMP | Dial by NSN | R/LS8/MS4 |
| 30 | RMP | SMP | Receive Suffix Digit | R |
| 31 | RMP | SMP | Send Digits Given | R/QF/D1,D2/D3,D4/.../DX |
| 32 | RMP | SMP | Rcv. and Send Digits | R |
| 33 | RMP | SMP | Toll Restrict | R/LS8(Trunk)/MS4 |
| 34 | RMP | SMP | Rcv.,Send, and Restrict | R/LS8(Trunk)/MS4 |
| 35 | RMP | SMP | Register Abort | R |
| 36 | RMP | SMP | Stop Dial | R |
| 37 | RMP | SMP | Allow Dial | R |
| 38 | RMP | SMP | Rcv. Suffix Digit/Grp | R |
| 39 | RMP | SMP | Cancel Remote C.F. | R/LS8/MS4 |
| 3A | RMP | SMP | Rcv. & Send Code Call | R/CCF,- |
| 3B | RMP | SMP | Receive N More Digits | R/N |

COMMANDS SENT BY THE RMP

| Ref. Code | Rcvr. | Sender | Command Description | Command Message Format Byte Sequence |
|---|---|---|---|---|
| 72 | DMP | RMP | Request 1st # Xlation | R/Digit/LS8/MS4 |
| 73 | DMP | RMP | Toll Restrict Inquiry | R/LS8(T)/MS4/D5,D6/D3,D4/D1,D2 |
| 74 | DMP | RMP | Dialed #, Normal | LS8/MS4/D3,D4/D1,D2 |
| 75 | DMP | RMP | Dialed #, Set C.F. | LS8/MS4/D3,D4/D1,D2 |
| 76 | DMP | RMP | Dialed #, Set S.H. | LS8/MS4/D3,D4/D1,D2 |
| 77 | DMP | RMP | Dialed #, Set P.C.D. | LS8/MS4/D3,D4/D1,D2 |
| 78 | DMP | RMP | Dialed #, Set RM. RST. | LS8/MS4/D3,D4/D1,D2 |
| 79 | DMP | RMP | Dialed #, Set Flex N.S. | LS8(A)/MS4/D3,D4/D1,D2 (T)/D3,D4/D1,D2 (STA) |
| 7A | DMP | RMP | Dialed #, Set Speed Dial | LS8/CG,MS4/QF/DN,DN-1/.../.../D1,D2 |
| 7B | DMP | RMP | Dialed #, Set Wake-Up | LS8/MS4/D3,D4/D1,D2/HR/MIN |
| 7C | DMP | RMP | Set Remote Diversion | LS8/MS4/D3,D4/D1,D2 (FROM)/D3,D4/D1,D2(TO) |
| 7D | DMP | RMP | Dialed #, NSN | LS8/MS4/D3,D4/D1,D2 |
| 7E | DMP | RMP | Reset Rm. Restrict | LS8/MS4/D3,D4/D1,D2 |
| 7F | DMP | RMP | Cancel PCD | LS8/MS4/D3,D4/D1,D2 |
| 80 | DMP | RMP | Cancel Remote | LS8/MS4/D3,D4/D1,D2 |
| B0 | SMP | RMP | Suffix Digit for Grp | Register #/Digit |
| B1 | SMP | RMP | Register Done | Register # |
| B2 | SMP | RMP | Suffix Digit | Register #/Digit |
| B3 | SMP | RMP | Register Time Out | Register # |
| B4 | SMP | RMP | Apparent Disconnect | Register # |
| B5 | SMP | RMP | Flash In-Register | Register # |
| B6 | SMP | RMP | Audible Tone Cycle | Cycle # |

COMMANDS RECEIVED BY THE DMP

| Ref. Code | Rcvr. | Sender | Command Description | Command Message Format Byte Sequence |
|---|---|---|---|---|
| 62 | DMP | SMP | Request Orig. COS | LS8/MS4 |
| 63 | DMP | SMP | Request Term. CQS | LS8/MS4 |
| 64 | DMP | SMP | AIOD Send | LS8/MS4 |
| 65 | DMP | SMP | Group Camp-On | LS8/MS4/LOG/HIG |
| 69 | DMP | SMP | Hot Line | LS8/MS4 |
| 6A | DMP | SMP | Traffic Usage Data | LS8/MS4/ET |
| 6E | DMP | SMP | Busy | LS8/MS4 Could also be |
| 6F | DMP | SMP | Idle | LS8/MS4 issued to BMP |
| 72 | DMP | RMP | Request 1st # Xlation | R/Digit/LS8/MS4 |
| 73 | DMP | RMP | Toll Restrict Inquiry | R/LS8(T)/MS4/D5,D6/D3,D4/D1,D2 |
| 74 | DMP | RMP | Dialed #, Normal | LS8/MS4/D3,D4/D1,D2 |
| 75 | DMP | RMP | Dialed #, Set C.F. | LS8/MS4/D3,D4/D1,D2 |
| 76 | DMP | RMP | Dialed #, Set S.H. | LS8/MS4/D3,D4/D1,D2 |
| 77 | DMP | RMP | Dialed #, Set P.C.D. | LS8/MS4/D3,D4/D1,D2 |
| 78 | DMP | RMP | Dialed #, Set RM. RST. | LS8/MS4/D3,D4/D1,D2 |
| 79 | DMP | RMP | Dialed #, Set Flex N.S. | LS8(A)/MS4/D3,D4/D1,D2(T) D3,D4/D1,D2(STA |

TABLE 3-continued

IPB COMMANDS

| Ref. Code | Rcvr. | Sender | Command Description | Command Message Format Byte Sequence |
|---|---|---|---|---|
| 7A | DMP | RMP | Dialed #, Set Speed Dial | LS8/CG,MS4/QF/DN,DN-1/...../D1,D2 |
| 7B | DMP | RMP | Dialed #, Set Wake-Up | LS8,MS4/D3,D4/D1,D2/HR./MIN. |
| 7C | DMP | RMP | Set Remote Diversion | LS8/MS4/D3,D4/D1,D2 (FROM)/D3,D4/D1,D2(TO) |
| 7D | DMP | RMP | Dialed #, NSN | LS8/MS4/D3,D4/D1,D2 |
| 7E | DMP | RMP | Reset Rm. Restrict | LS8/MS4/D3,D4/D1,D2 |
| 7F | DMP | RMP | Cancel PCD | LS8/MS4/D3,D4/D1,D2 |
| 80 | DMP | RMP | Cancel Remote | LS8/MS4/D3,D4/D1,D2 |
| 88 | DMP | CMP | Request Console COS | LS8/MS4/Type |
| 8A | DMP | CMP | Seize Trunk of Group | CG, TGN/V |
| 8B | DMP | CMP | Restrict Trunk Group | CG, TGN |
| 8C | DMP | CMP | Unrestrict Trunk Group | CG,TGN |
| 8D | DMP | CMP | Group Camp-On | LS8/MS4/CG,TGN/V |
| 8E | DMP | CMP | Talk to Specific DN | CG/D3,D4/D1,D2/V |

COMMANDS SENT BY THE DMP

| Ref. Code | Rcvr. | Sender | Command Description | Command Message Format Byte Sequence |
|---|---|---|---|---|
| 3B | RMP | DMP | Receive N More Digits | R/N |
| 58 | CMP | DMP | Std. COS Retrieval | COS/COS/COS/DSPL#1/DSPL#2/TAAS GRP/DN/DN/LS8/MS4/TYPE |
| 5A | CMP | DMP | Trunk Group Status | 15-8 BI/7-0 BI |
| 5B | CMP | DMP | Wake Up Time | LS8/MS4/HRS/MIN |
| 5C | CMP | DMP | Split COS Retrieval | Same as 58, but 2 NSN |
| C8 | SMP | DMP | Originating COS Data | LS8/TRCOS,MS4/OCOS |
| C9 | SMP | DMP | Standard Call | LS8(P1)/MS4/LS8(P2)/MS4/(P1) TCOS/(P2) TCOS/(P2)OCOS |
| CA | SMP | DMP | Access Code Dialed | LS8/MS4/SAC/AC COS/ARG1/ARG2 |
| CB | SMP | DMP | Call Pickup | LS8/MS4/MORE-TO-COME FLAG, QF/LS8/MS4/LS8 MS4/..../LS8/TAAS |
| CC | SMP | DMP | Speed Call | LS8(P1)/MS4/LS8(T)/MS4/QF/DZ,D1/D4,D3/. |
| CD | SMP | DMP | Action Successful | LS8/MS4 |
| CE | SMP | DMP | Action Fails | LS8/MS4 |
| CF | SMP | DMP | Call from Group Queue | LS8(P1)/MS4/LS8(P2)/GS MS4/P1TCOS/P2TCOS/P2OCOS |
| D0 | SMP | DMP | Preset Conf. | LS8(P1)/MS4/LS8(Conf) OF, MS4/OF/LS8/MS4/. |
| D1 | SMP | DMP | Route to Attendant | LS8/MS4/TYPE |
| D2 | SMP | DMP | Make Connection | LS8-P1/MS4/LS8-P2/MS4 OCOS(P2) |
| D4 | SMP | DMP | COS Data | LS8/#, MS4/COS BYTE |
| D5 | SMP | DMP | Call from ATT. | Same as Std. Call & Vector |
| D6 | SMP | DMP | Specific ATT. | LS8(P1)/MS4/LS8(A)/MS4/OCOS |
| D7 | SMP | DMP | Conference | LS8/MS4/LO CONF/HI CONF ACCOS |
| D8 | SMP | DMP | Group Busy | LS8(P1)/MS4/TCOS (P1)/LOG/T-SFLAG, HIG/P1-TCOS |

COMMANDS RECEIVED BY THE SMP

| Ref. Code | Rcvr. | Sender | Command Description | Command Message Format Byte Sequence |
|---|---|---|---|---|
| A2 | SMP | LMP | Line Origination | LS8/MS4 |
| A3 | SMP | LMP | Line Flash | LS8/MS4 |
| A4 | SMP | LMP | Line Disconnect | LS8/MS4 |
| A8 | SMP | TMP | Incoming Trunk | LS8/MS4 |
| A9 | SMP | TMP | Trunk Disconnect | LS8/MS4 |
| AA | SMP | TMP | P2 Answer on O.G. Trunk | LS8/MS4 |
| AB | SMP | TMP | Stop Dial | LS8/MS4 |
| AC | SMP | TMP | Allow Dial | LS8/MS4 |
| AD | SMP | TMP | Trunk Flash | LS8/MS4 |
| AE | SMP | TMP | Seize Fail | LS8/MS4 |
| B0 | SMP | RMP | Suffix Digit for GRP | Register #/Digit |
| B1 | SMP | RMP | Register Done | Register # |
| B2 | SMP | RMP | Suffix Digit | Register #/Digit |
| B3 | SMP | RMP | Register Time Out | Register # |
| B4 | SMP | RMP | Apparent Disconnect | Register # |
| B5 | SMP | RMP | Flash In-Register | Register # |

TABLE 3-continued

IPB COMMANDS

| | | | | |
|---|---|---|---|---|
| B6 | SMP | RMP | Audible Tone Cycle | Cycle # |
| B8 | SMP | CMP | Park1 | LS8 (P) MS4/LS8 (A)/MS |
| B9 | SMP | CMP | Talk1 | LS8 (P) MS4/LS8 (A)/MS V |
| BA | SMP | CMP | Park2 | LS8 (P1)/MS4/LS8 (P2)/ MS4/LS8 (A)/MS4 |
| BB | SMP | CMP | Talk2 | LS8 (P1)/MS4/LS8 (P2)/ MS4/LS8 (A)/MS4/V |
| BC | SMP | CMP | Release | LS8 (P1)/MS4/LS8 (P2)/MS |
| BD | SMP | CMP | Disconnect | LS8 (P)/MS4/LS8 (A)/MS4 |
| BE | SMP | CMP | Start Dial | LS8 (A)/MS4/V |
| BF | SMP | CMP | Conference | LS8 (P)/MS4/LS8 (A)/MS4/ |
| C0 | SMP | CMP | Override Disconnect | LS8 (P2)/MS4/LS8 (A)/MS4 |
| C1 | SMP | CMP | Override Talk | LS8 (P2)/MS4/LS8 (A)/MS4 |
| C2 | SMP | CMP | Unserviced | LS8/MS4 |
| C3 | SMP | CMP | Chain | LS8/MS4 |
| C4 | SMP | CMP | Wake-Up Ring | LS8/MS4 |
| C8 | SMP | DMP | Originating COS Data | LS8/TRCOS,MS4/OCOS |
| C9 | SMP | DMP | Standard Call | LS8 (P1)/MS4/LS8 (P2)/ MS4/ (P1) TCOS/(P2) TCOS/ (P2)OCOS |
| CA | SMP | DMP | Access Code Dialed | LS8/MS4/SAC/AC COS/ ARG1/ARG2 |
| CB | SMP | DMP | Call Pickup | LS8/MS4/MORE-TO-COME FLAG, QF/LS8/MS4/LS8/ MS4/.../LS8/MS4 |
| CC | SMP | DMP | Speed Call | LS8 (P1)/MS4/LS8 (T)/MS4 QF/D2,D1/D4,D3/... |
| CD | SMP | DMP | Action Successful | LS8/MS4 |
| CE | SMP | DMP | Action Fails | LS8/MS4 |
| CF | SMP | DMP | Call from Group Queue | LS8 (P1)/MS4/LS8 (P2)/GS MS4/P1TCOS/ P2TCOS/ P20COS |
| D0 | SMP | DMP | Preset Conf. | LS8 (P1/MS4/LS8 (CONF)/ OF,MS4/QF/LS8/MS4/... |
| D1 | SMP | DMP | Route to Attendant | LS8/MS4/TYPE |
| D2 | SMP | DMP | Make Connection | LS8-P1/MS4/LS8-P2/MS4/ OCOS(P2) |
| D4 | SMP | DMP | COS Data | LS8/#,MS4/COS BYTE |
| D5 | SMP | DMP | Call from ATT. | Same as Std. Call & Vector |
| D6 | SMP | DMP | Specific ATT. | LS8(P1)/MS4/LS8(A)/MS4 OCOS |
| D7 | SMP | DMP | Camp-On from ATT. | Same as Std. Call & Vector |
| D8 | SMP | DMP | Group Busy | LS8(P1)/MS4/TCOS(P1)/ LOG/T-S FLAG,HIG/ |

COMMANDS SENT BY THE SMP

| Ref. Code | Rcvr. | Sender | Command Description | Command Message Format Byte Sequence |
|---|---|---|---|---|
| 02 | LMP | SMP | Terminate Ring | LS8/MS4 |
| 03 | LMP | SMP | Send Ring | LS8/as Code ; MS4 |
| 04 | LMP | SMP | Disable Flash | LS8/MS4 |
| 05 | LMP | SMP | Enable Flash | LS8/as Code; MS4 |
| 06 | LMP | SMP | Set Attenuator | LS8/as Code ; MS4 |
| 12 | TMP | SMP | Seize Trunk | LS8/as Code ; MS4 |
| 13 | TMP | SMP | Request Trunk Disc. | LS8/MS4 |
| 14 | TMP | SMP | Dialing Complete | LS8/MS4 |
| 15 | TMP | SMP | P2 Answer | LS8/as Code; MS4 |
| 16 | TMP | SMP | Disconnect 9th Bit | LS8/MS4 |
| 17 | TMP | SMP | Register Assigned | LS8/MS4 |
| 18 | TMP | SMP | Register Released | LS8/as Code; MS4 |
| 19 | TMP | SMP | Recognize Flash | LS8/as Code; MS4 |
| 1A | TMP | SMP | Disregard Flash | LS8/MS4 |
| 1B | TMP | SMP | Set Attenuator | LS8/as Code; MS4 |
| 22 | RMP | SMP | Originating Station | R/LS8/MS4 |
| 23 | RMP | SMP | Orig. D.I.D. Trunk | R/LS8/MS4 |
| 24 | RMP | SMP | Flash (Split) Station | R/LS8/MS4 |
| 25 | RMP | SMP | Set Call Forwarding | R/LS8/MS4 |
| 26 | RMP | SMP | Set Secretary Hunt | R/LS8/MS4 |
| 27 | RMP | SMP | Set P.C.D. | R/LS8/MS4 |
| 28 | RMP | SMP | Set Remote Call Fwd. | R/LS8/MS4 |
| 29 | RMP | SMP | Orig. Sta. C. F. Mode | R/LS8/MS4 |
| 2A | RMP | SMP | Cancel PCD | R/LS8/MS4 |
| 2B | RMP | SMP | Set RM Outdial Restrict | R/LS8/MS4 |
| 2C | RMP | SMP | Set Flexible N.S. | R/LS8(A)/MS4 |
| 2D | RMP | SMP | Set Speed Dialing | R/LS8/CG, MS4 |
| 2E | RMP | SMP | Set Wake-Up Time | R/LS8(A)/MS4 |
| 2F | RMP | SMP | Dial by NSN | R/LS8/MS4 |

TABLE 3-continued

IPB COMMANDS

| | | | | |
|---|---|---|---|---|
| 30 | RMP | SMP | Receive Suffix Digit | R |
| 31 | RMP | SMP | Send Digits Given | R/QF/D1,D2/D3,D4/.../DN |
| 32 | RMP | SMP | Rcv. and Send Digits | R |
| 33 | RMP | SMP | Toll Restrict | R/LS8 (TRUNK)/MS4 |
| 34 | RMP | SMP | Rcv.,Send,and Restrict | R/LS8 (TRUNK)/MS4 |
| 35 | RMP | SMP | Register Abort | R |
| 36 | RMP | SMP | Stop Dial | R |
| 37 | RMP | SMP | Allow Dial | R |
| 38 | RMP | SMP | Rcv. Suffix Digit/GRP | R |
| 39 | RMP | SMP | Cancel Remote C.F. | R/LS8/MS4 |
| 3A | RMP | SMP | Rcv. & Send Code Call | R/CCF,- |
| 42 | CMP | SMP | Attendant Call | LS8/MS4/TYPE |
| 43 | CMP | SMP | Attendant Recall | LS8/MS4/TYPE |
| 46 | CMP | SMP | Disconnect in Queue | LS8/MS4 |
| 47 | CMP | SMP | Disconnect in Loop | LS8(P) MS4/LS8(A)/MS4 |
| 48 | CMP | SMP | P2 Answer | LS8(P2)/MS4/LS8(A)/MS4 |
| 49 | CMP | SMP | In-Loop Recall | LS8(P)/MS4/LS8(A)/MS4 |
| 4A | CMP | SMP | Affirm (Conn. Compl.) | LS8 (P)/MS4/V |
| 4B | CMP | SMP | Disaffirm (Conn. Fail) | LS8 (P)/MS4/V/RSN |
| 4C | CMP | SMP | Wake-up Fail | LS8/MS4 |
| 4D | CMP | SMP | TAAS Request | LS8/MS/TAAS COS |
| 4E | CMP | SMP | Split to Attendant | LS8(PS)/MS4/LS8(PP)/MS4 |
| 4F | CMP | SMP | Call to Specific Attn. | LS8(P)/MS4/LS8(A)/MS4 |
| 50 | CMP | SMP | Conference Net Status | BUSY/IDLE-FLAG |
| 62 | DMP | SMP | Request Orig. COS | LS8/MS4 |
| 63 | DMP | SMP | Request Term. COS | LS8/MS4 |
| 64 | DMP | SMP | AIOD Send | LS8/MS4 |
| 65 | DMP | SMP | Group Camp-On | LS8/MS4/LOG/HIG |
| 69 | DMP | SMP | Hot Line | LS8/MS4 |
| 6A | DMP | SMP | Traffic Usage Data | LS8/MS4/ET |
| 6E | DMP | SMP | Busy | LS8/MS4 ALSO TO BMP |
| 6F | DMP | SMP | Idle | LS8/MS4 ALSO TO BMP |

The basic operational functions of each of the microprocessors 130, 140, 150, 160, 170, 180 and 190 of the control complex 55 are given in outlined itemized format below:

State Microprocessor (SMP) Functions

1. Maintain a record of the state of every NSN in system
    Current situation
    NSN to which connected
    Time of connection
2. Determine, from the current state, a command, and COS information, what the next state of NSN should be
3. Issue commands and controls appurtenant to new states
    Start and stop ring to LMP
    Seize and disconnect to TMP
    Attenuation information to TMP and LMP
    Flash and signalling control to TMP and LMP
    Connect for - (function) to RMP
    Send number to RMP
    Start/stop sending to RMP
    Call to attendant to CMP
    Attentant status and confirmation updates to CMP
    Group CAMP-ON request to DMP
    Class of service requests to DMP
    Network connection control
4. Maintain table of available registers and make assignments
5. Maintain queue of CAMP-ONS to specific NSN's
6. Control conference networks
7. Perform short timing actions such as tone bursts
8. Collect PEG counts and elapsed times for traffic and usage counters
8. Collect and record pertinent call events for detailed call analysis
10. Perform continual audit of NSN states, their related connections, and their elapsed time

Line Microprocessor (LMP) Functions

1. Scan lines (up to 2400)
    A. Detect new OFF-HOOK
    B. Detect new ON-HOOK
    C. Selectively detect flash (0.5–1.5 second ON-HOOK)
2. Number translations
    A. Equipment number (EA) to network slot number (NSN)
    B. NSN to EA
3. Inform SMP of valid line action
4. Ring or cancel ringing of a line as directed by SMP
5. Set attenuation of a line as directed by SMP

Register Microprocessor (RMP) Functions

1. Collect digits as requested by SMP (64 registers, rotary or DTMF)
    A. Normal dialing—quantity by first digit translation
    B. Feature programming dialing (fixed & variable lengths)
    C. Toll restriction
    D. Suffix digits (singular)
    E. Outside dialing—quantity determined by alogrithim in RMP
2. Deliver and cutoff appropriate dial tone
3. Detect end-of-dialing by caller hesitation
4. Detect flash and reset register of flashing party
5. Cancel register after:
    A. Excessive inter-digit time (computed variable)
    B. Abort command from SMP
    C. Normal completion of dialing
6. Deliver dialed number to DMP (SMP for suffix digit)
7. Send pulsed digits (requested by SMP)
    A. Repeating digits collected
    B. Number given
    C. Hold and allow sending per SMP request 8. Digit collection, sending, and toll restriction may be in conjunction with each other

Trunk Microprocessor (TMP) Functions

1. Scan trunks
   A. Detect distant end seizure
   B. Detect distant end release
   C. Selectively detect flash
2. Number translations
   A. EA to NSN
   B. NSN to EA
3. Inform SMP of valid trunk action
4. Seize or release trunks as directed by SMP
5. Set attenuation of trunks as directed by SMP
6. Permit/deny 9th bit signalling as directed by SMP
7. Execution of "Handshake" protocol with distant trunk circuit
8. Translation of signalling logic into uniform format
9. Standardize interface of all trunk types to a single, uniform format to/from the control complex

Data Base Microprocessor (DMP) Functions

1. Maintain class of service and characteristics information for each device (line, trunk, etc.) connected to the system
2. Maintain and utilize directory number (DM) to network slot number (NSN) and NSN to DN translations
3. Maintain and utilize directory number to standard access code translations
4. Maintain first digit to quantity-of-digits-expected table
5. Maintain and utilize tables of customer groups, trunk groups, line hunt groups, and call pick-up groups
6. Maintain and utilize alternate number translation
7. Maintain and utilize toll restrict tables
8. Maintain miscellaneous system, customer group, and other parameters
9. Maintain traffic and usage peg counters
10. Deliver COS information and translated numbers to CMP and SMP as required
11. Perform group hunts and alternate address conversions prior to translations when required
12. Maintain a busy/idle map to facilitate group hunts
13. Maintain speed dialing information
14. Maintain and utilize group CAMP-ON queues
15. Drive AIOD equipment (automatic identification outward dial)
16. Drive OND equipment (origination number display)
17. Output traffic and usage information to hard copy terminal
18. Perform above functions for each of eight customer groups

Console microprocessor (CMP) Functions

1. Scan attendant consoles for button activity
2. Maintain a record of
   A. The state of each console
   B. The state of each loop
3. Receive new call assignments from SMP and place in attendant queue or priority queue
4. Assign calls to available attendant
5. Alter console and loop states per console button presses and SMP requests
6. Control console lamps per console and loop states
7. Display numeric and alpha information on console per state and IPB command information
8. Notify SMP and receive affirmation from SMP of state changes
9. Control flexible and trunk answer any station night service
10. Control wake-up calls in hotel/motel environment
11. Perform above functions for 1 to 8 customer groups

Busy Lamp Field Microprocessor (BMP) Functions

1. Maintain a busy/idle map of all stations in the system
2. For each console, drive a busy/idle display for a group of 100 stations selected by the attendant
3. Read direct station select switch closures, translate into a directory number, and send to DMP The microprocessor control complex 55 offers a wide range of service features that can be provided regardless of switching system size. Service features are easily added at any time since the majority of features are software implemented and are contained in a single software package. An exemplary list of the service features as provided by the control complex 55 are categorized in Table 4 below under ten feature groups as are thought to be commonly understood in the pertinent art.

TABLE 4

Microprocessor Service Features

Station Features
Station-to-Station Calling
Station-to-Trunk Calling (DOD)
Station Controlled Transfer (all calls to a station or trunk)
Consultation Hold (all calls to a station or trunk)
Add-On Conference
Attendant Recall
Call Hold
Dial Access to Attendant
Call Pickup
Call Waiting
Station Camp-On (Ring Back)
Executive Camp-On
Executive Override
Call Forwarding (all incoming Calls)
Call Forwarding to Speed Call Number
Secretarial Hunt
Don't Answer - Call Forwarding (DID)
Busy Station - Call Forwarding (DID)
Manual Line
Executive Line
"Hot" Line-Direct to Trunk
"Hot" Line-Direct to Station
"Hot" Line-With Dialing into "CO"
Outgoing Trunk Queuing
Attendant Features
Cordless Console (switched loop)
Six Loops
Busy Lamp Field (optional)
DSS (included with BLF)
Trunk Group Busy Lamps
Switched Loop Operation
Control of Trunk Group Access
Alphanumeric Display
Station or Trunk Number
Identification of Call Type
Busy Lamp Field and Direct Station Select (BLF/DSS)
Automatic and 2-way Splitting
Camp On, with Indication
Busy Verification

TABLE 4-continued

Microprocessor Service Features

Automatic Attendant Recall
"Wake-Up" Service
"Do-Not-Disturb" Service
Third Party Call Forwarding
Origination and Completion of
All Call Types
Music on Hold and Camp-On
Chain Calling
Attendant Through Dialing
Attendant Delayed Calls
Attendant Keysender Overlap
Priority Queue to Attendant
Attendant Call-Through Test
on Trunks
Outgoing Trunk Queue via
Attendant
Attendant Transfer
Consoleless Operation
Night Service Features
Trunk Answer any Station
(Universal Answer)
Flexible Night Service
Combined Night Service
Group Hunt Features
Station Group Hunt
Master Number Activation
Unbalanced Distribution
Balance Distribution
Last Resort Number
Secretarial Hunt
Conference Features
Attendant Controlled
Meet-Me
Station Controlled (progressive)
Preset
Special Service Features
Paging Access
Dictation Access
Code Call
DTMF Signaling (to Rotary Dial
Pulse Conversion)
Speed Calling (Abbreviated
Dialing)
ALOD
Call Recording and Storage
(all calls)
Hotel/Motel Features
Station-Room Number Correlation
Message Waiting
Message Registration
Station Dialing Restriction
Single Digit Service
LD Trunks
Hotel/Motel Identification over
CO Trunks
Toll Diversion
Wake-Up Service
Do-Not-Disturb Service
Room-to-Room Dialing Restriction
Manual Lines
Originating Number Display
Room Number Display ("0" Calls)
Room Status
System Features
Customer Groups
Automatic Call Distribution
Whole System
One or More Customer Groups
Main-Satellite Operation
Centralized Attendant Service
Camp-On Busy
Station Transfer
Traffic Measuring and Storage
On-Site Access
Remote Access with Security
Remote Access to PBX Service
Flexible Route Selection
Trunk Group Overflow
Alternate Routing

TABLE 4-continued

Microprocessor Service Features

Conversation Timing
Intercept Facilities
Attendant
Tone
Optional Recording
Ringing Drop of Call
Immediate Ringback Tone
100 Percent Line Lockout
No Dial Alarm
Trunks
Central-Office Trunks
(ground-start or loop-start)
Ringdown Tie Trunks
Dial Repeating Tie Trunks
(Loop or E&M Signaling)
Tandem trunks
DID Trunks (Listed Directory
Number)
CCSA Trunks (Common Control
Switching Arrangement)
Attendant Completing Trunks
(to Satellite PBX)
Digital Trunks (interface with
T1 line)
Outgoing Trunk Queueing (station
and attendant)
Station Restrictions
Station-to-Trunk (Access Denial)
Trunk-to-Station (Station-to-Station Only)
Origination (Termination Only)
Termination (Origination Only)
Toll Denial and Diversion (battery reversal or digit monitoring)
Patient Call Diversion (incoming diversion by control station)

I claim as my invention:

1. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group in response to dialed numbers included within a separate comprehensive number plan for each customer group, one of said operational functions comprising processing a standard call between stations on lines in the same customer group, said control means including data base memory means for storing coded electrical signals correlating system operational functions and dialed directory numbers separately for each customer group.

2. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group in response to dialed numbers included within a separate comprehensive number plan for each customer group, one of said operational functions comprising processing a standard call between stations on lines in the same customer group, said control means including data base memory means for storing coded electrical signals correlating system operational functions and dialed directory numbers separately for each customer group, and for storing coded electrical signals correlating the same system operational function with dialed directory numbers originating from different customer groups.

3. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group in response to dialed numbers included within a separate comprehensive number plan for each customer group, one of said system operational functions comprising processing a standard call between stations on lines in the same customer group, said control means including data base memory means for storing data in a table structure of separate groups of locations for each customer group of stations, each location being addressed in response to a dialed directory number and having stored therein coded electrical signals representing an instruction to execute one of said system operational functions, the same location being addressed in response to directory numbers from different customer groups, to provide selective cross-over between customer groups.

4. In a telecommunication switching system adapted to be connected to lines and trunks, and having a digital switching network, the improvement comprising:

control means connected to said switching network for executing system operational functions in response to coded electrical signals representing dialed directory numbers of a comprehensive number plan, received from stations on lines served by said network, one of said operational functions comprising processing a standard call between said stations, said control means including data base memory means for storing coded electrical signals, said data base memory means including addressed locations in a first level of a multiple level linked table structure, each of said addressed locations providing means for storing coded electrical signals representing an instruction designating a specific operational function, said first level of said table structure providing separate blocks of said locations, each of said locations in each of said separate blocks having a directory number address employing certain digits of the directory number, said table structure having a second level of locations, each location in said second level having a directory number address employing other digits of the directory number and containing a pointer to one of said blocks of said first level, any one or more of said memory locations being preassignable to any one or more directory numbers in said plan so that a dialed number results in the execution of one of the different operational functions represented by instruction representing signals stored in said locations in said data base memory means table structure first level.

5. In a telecommunication switching system adapted to be connected to lines and trunks, and having a digital switching network, the improvement comprising:

control means connected to said switching network for executing system operational functions in response to coded electrical signals representing dialed directory numbers received from stations in separate customer groups, said customer groups comprising groups of stations on discrete sets of lines served by said system, all customer groups sharing hardware associated with said switching network while all operational functions are normally separately executed for each customer group in response to dialed directory numbers included within a separate comprehensive directory number plan for each customer group, one of said operational functions comprising processing a standard call between stations on lines in the same customer group, said control means including data base memory means for storing coded electrical signals, said data base memory means including discrete groups of addressed locations corresponding to respective customer groups distributed throughout a first level of a multiple level inked table structure, each of said addressed locations providing means for storing coded electrical signals representing an instruction designating a specific operational function, said first level of said table structure providing separate blocks of said locations, each of said locations in each of said separate blocks having a directory number address employing certain digits of the directory number, said table structure having an entry level block of locations, each location in said entry level block of locations having a customer group identification number address, pointers linking said entry level and said first level, the combination of said pointers and directory number addresses to locate an instruction serving to correlate operational functions and directory numbers separately for each customer group.

6. In a telecommunication switching system adapted to be connected to lines and trunks, and having a digital switching network, the improvement comprising:

control means connected to said switching network for executing system operational functions in response to coded electrical signals representing dialed directory numbers received from stations in separate customer groups, said customer groups comprising groups of stations on discrete sets of lines served by said system, all customer groups sharing hardware associated with said switching network while all operational functions are normally separately executed for each customer group in response to dialed directory numbers included within a separate comprehensive directory number plan for each customer group, one of said operational functions comprising processing a standard call between stations on lines in the same customer group, said control means including data base memory means for storing coded electrical signals, said data base memory means including discrete groups of addressed locations corresponding to respective customer groups distributed throughout a first level of a multiple level linked table structure, each of said addressed locations providing means for storing coded electrical signals representing an instruction designating a specific operational function, said first level of said table structure providing separate blocks of said locations, each of said locations in each of said separate blocks having a directory number address employing certain digits of the directory number, and each block of said first level of locations having a pointer address from an intermediate level of separate blocks of locations in said table structure, each location in each of said blocks of said intermediate level of locations having a directory number address employing other digits of the directory number, and each block of said intermediate level locations having a pointer address from an entry level block of locations, each location in said entry level block of locations having a customer group identification number address, the combination of said pointer and directory number addresses to locate an instruction serving to correlate operational functions and directory numbers separately for each customer group.

7. In a telecommunication switching system adapted to be connected to lines and trunks, and having a digital switching network, the improvement comprising:

control means connected to said switching network for executing system operational functions in response to coded electrical signals representing dialed directory numbers received from stations on lines served by said system, one of said operational functions comprising processing a standard call between stations on said lines, said control means including data base memory means for storing coded electrical signals correlating system operational functions and dialed directory numbers, said data base memory means including addressed locations distributed throughout a first level of a multiple level linked table structure, each of said addressed locations providing means for storing coded electrical signals representing an instruction designating a specific operational function, said first level of said table structure providing separate blocks of said locations, each of said locations in each of said separate blocks having a directory number address employing certain digits of the directory number, said table structure having one or more intermediate levels depending on the total number of digits in the largest size directory number in said plan, said intermediate levels being linked to said first level by pointer addresses employing digits of the directory number, said table structure having an entry level block of locations, each location in said entry level block of locations having an identification number address and containing a pointer to an intermediate level of said table structure.

8. The arrangement according to claim 7, wherein said data base memory means includes means for correlating system operational functions and dialed directory numbers, wherein said first level of said multiple level linked table structure, which comprises the lowest level of said table structure, may be addressed by one or a plurality of different directory numbers by having two pointers from one of the levels of locations of said table structure pointing to the same block of locations in the next lower level of said table structure.

9. The arrangement according to claim 7 wherein said control means is connected to said switching network for executing system operational functions in response to coded electrical signals representing dialed directory numbers received from stations in separate customer groups, said customer groups comprising groups of stations on discrete sets of lines served by said system, all customer groups sharing the hardware forming said switching system while all operational functions are normally separately executed for each customer group in response to dialed directory numbers included within a separate comprehensive directory number plan for each customer group, said data base memory means including discrete groups of addressed locations corresponding to respective customer groups distributed throughout a first level of said multiple level linked table structure, and wherein the same location in said first level of said table structure, which comprises the lowest level of said table structure, may be addressed by one or a plurality of different directory numbers in either the same number plan or in number plans of different customer groups, by having two pointers from one of the levels of locations of said table structure pointing to the same block of locations in the next lower level of said table structure.

10. In a telecommunication switching system adapted to be connected to lines and trunks, and having a digital switching network, the improvement comprising:

control means connected to said switching network for executing a specific system operational function in response to coded electrical signals representing an instruction to execute all tasks to carry out said specific function, said control means including data base memory means for storing coded electrical signals for correlating system operational functions and dialed directory numbers, said data base memory means including a plurality of addressed locations, each of said locations providing means for storing coded electrical signals representing an instruction designating a specific operational function, each of said locations having a directory number address employing digits of the directory number.

11. In a telecommunication switching system adapted to be connected to lines and trunks, and having a digital switching network, the improvement comprising:

control means connected to said switching network for executing system operational functions in response to dialed directory numbers received from stations served by the system, all operational functions being executed in response to dialed directory numbers received from stations served by the system, all operational functions being executed in response to dialed numbers included within a comprehensive directory number plan, one of said operational functions comprising processing a standard call between stations on lines in the same customer group, said control means including data base memory means for storing coded electrical signals in a table structure of separate groups of locations for each customer group of stations, each location in each of said groups being addressed by coded electrical signals representing a directory number and having stored therein coded electrical signals representing an operational function identifier word, processor means for addressing said data base memory means in response to coded electrical signals representing a dialed directory number received from an originating station to provide a unique location in said data base memory means designated by the number dialed from said originating station and the specific operational function identifier word stored therein, said processor means including means receptive to command signals based on said coded electrical identifier word signals for executing the operational function designated thereby.

12. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group, one of said system operational functions comprising processing a standard call between stations on lines in the same customer group, said control means including data base memory means storing data in a table structure of separate groups of locations for each customer group of stations, each location having stored therein coded electrical signals representing an identifier word including an instruction to execute one of said system operational functions, and processor means for addressing said data base memory means in response to the combination of (1) coded electrical signals representing a dialed number received from an originating station and (2) coded electrical signals identifying the customer group of said originating station, to provide a location in said data base memory means designated by the dialed number and the specific instruction coded electrical signals stored therein, said processor means including means responsive to command signals based on said specific instruction coded electrical signals for executing the specific system operational function designated thereby.

13. In a telecommunication switching system adapted to be connected to lines and trunks, said system having a digital switching network, and a control complex for executing system operational functions in response to dialed numbers included within a comprehensive directory number plan, one of said operational functions comprising processing a standard call between stations on said lines, utilizing said digital switching network, the improvement wherein said control complex comprises:

processor means operable under control of programs and interconnected with said network, program memory means for said processor means for storing programs, which, when executed by said processor means, provide said operational functions; means for selecting programs from said program memory means to carry out a designated one of said operational functions in response to specific command signals, data base memory means connected to said processor means providing a plurality of addressed memory locations with each of said locations pre-assigned to and addressed by coded electrical signals representing a directory number, and providing means for storing coded electrical signals representing an identifier word with a group of bits the pattern of which represents an instruction to carry out a designated one of said operational functions, said processor means including means operable under said programs receptive to said directory number coded electrical signals for addressing said data base memory means in response to a dialed number to provide the location pre-assigned to said dialed number, for reading instruction coded electrical signals from said pre-assigned location, and for transmitting coded electrical signals representing a specific command based on said instruction signals to operate said program selecting means, any one or more of said memory locations being pre-assignable to any one or more directory numbers in said plan so that a dialed number results in the execution of one of the different operational functions represented by instruction signals stored in said locations in said data base memory means.

14. An arrangement in a telecommunication switching system having an improved control complex according to claim 13, wherein said program memory means includes means for storing programs to carry out system operational functions including, in addition to processing (1) a standard call, the following categories of operational functions:

(2) conference call,
(3) group hunt,
(4) call pick-up,
(5) speed call, and
(6) miscellaneous functions; and having said data base memory means providing a plurality of addressed memory locations providing means for storing coded electrical signals representing identifier words with groups of bits the patterns of which represent instructions uniquely designating ones of said categories of functions for which programs are stored in said program memory means.

15. An arrangement in a telecommunication system according to claim 14 wherein said data base memory means includes means for storing restricted class of service information in memory fields providing locations indicative of individual originating stations, each said memory field location having means for storing coded electrical signals representing a restriction on an individual originating station from access to certain of said operational functions while permitting access to other operational functions, and said processor means including means for addressing said memory fields in response to coded electrical signals representing an originating station, to provide restricted class of service information as to said originating station, said means, included in said processor means and operable under the programs stored by said program memory means receptive to said directory number coded electrical signals for addressing said data base memory means in response to a dialed number, being operable to provide the location pre-assigned to said dialed number when restricted class of service information has not been provided as to said originating station for the operational function designated thereby.

16. In a telecommunication switching system adapted to be connected to lines and trunks, said system having a digital switching network; and a control complex for executing system operational functions in response to dialed numbers included within a comprehensive directory number plan, one of said operational functions comprising processing a standard call between stations on said lines, utilizing said digital switching network, the improvement wherein said control complex comprises:

processor means operable under control of separate programs and interconnected with said network, separate program memory means for said processor means for storing said separate programs, said separate program memory means including programs stored among more than one of said separate program memory means which, when executed by said processor means, combine to provide said operational functions; means for selecting programs from said program memory means to carry out a designated one of said operational functions in response to specific command signals, data base memory means connected to said processor means providing a plurality of addressed memory locations with each of said locations pre-assigned to and addressed by coded electrical signals representing a directory number, and providing means for storing coded electrical signals representing an identifier word with a group of bits the pattern of which represents an instruction to carry out a designated one of said operational functions, said processor means including means operable under said programs receptive to said directory number coded electrical signals for addressing said data base memory means in response to a dialed number to provide the location pre-assigned to said dialed number, for reading instruction coded electrical signals from said pre-assigned location, and for transmitting coded electrical signals representing a specific command based on said instruction signals to operate said program selecting means, any one or more of said memory locations being pre-assignable to any one or more directory numbers in said plan so that a dialed number results in the execution of one of the different operational functions represented by instruction signals stored in said locations in said data base memory means.

17. In a telecommunication switching system adapted to be connected to lines and trunks, said system having a digital switching network, and a control complex for executing system operational functions in response to dialed numbers included within a comprehensive directory number plan, one of said operational functions comprising processing a standard call between stations on said lines, utilizing said digital switching network, the improvement wherein said control complex comprises:

a plurality of independent processors operable asynchronously under control of separate programs for said processors, respectively, and interconnected with one another and said network, including a data base processor, separate program memory means for each of said processors for storing said programs, said separate program memory means including programs stored among more than one of said separate program memory means which, when executed by respective processors in a prescribed sequence provide said operational functions, respective processors executing separate programmed operations in said sequence while operating asynchronously; means for selecting programs from said program memory means to carry out a designated one of said operational functions in response to specific command signals from said data base processor, data base memory means connected to said data base processor providing a plurality of addressed memory locations with each location pre-assigned to and addressed by a directory number, and storing an identifier word with a group of bits the pattern of which represents an instruction signal to carry out a designated one of said operational functions, said data base processor including means operable under program routines for addressing said data base memory means in response to a dialed number received by said data base processor, to provide the location pre-assigned to said dialed number, for reading an instruction from said pre-assigned location, and for transmitting a specific command signal based on said read instruction signal to another processor of said control complex which is receptive to said specific command signal and operates said selecting means, any one or more of said data base memory locations being pre-assignable to any one or more directory numbers in said plan so that a dialed number results in the execution of one of the different operational functions represented by instruction signals stored in said locations in said data base memory means.

18. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group in response to dialed numbers included within a separate comprehensive directory number plan for each customer group, one of said operational functions comprising processing a standard call between stations on lines in the same customer group, said control means including data base memory means for storing coded electrical signals correlating system operational functions and directory numbers for said customer groups, and means for reading coded electrical signals stored in said memory means and for executing one operational function in response to a dialed directory number received from a station in one of said customer groups, and for reading said stored signals and for executing the same operational function in response to the same or a different dialed directory number received from a station in a different one of said customer groups, said operational functions being correlated to the respective dialed directory numbers by said stored coded electrical signals.

19. In a telecommunication switching system adapted to be connected to lines and trunks, and having a digital switching network, the improvement comprising:

control means connected to said switching network for executing system operational functions in response to dialed numbers received from stations in separate customer groups, said customer groups comprising groups of stations on discrete sets of lines served by said system, all customer groups sharing hardware associated with said switching network while all operational functions are normally separately executed for each customer group in response to dialed numbers included within a separate comprehensive number plan for each customer group, one of said system operational functions comprising processing a standard call between stations on lines in the same customer group, said control means including data base memory means for storing function instruction data in a table structure of separate groups of locations for each customer group of stations, each location having stored therein coded electrical signals representing an identifier word including an instruction to execute one of said system operational functions, and for storing restricted class of service information in memory fields providing locations for individual originating stations in said customer groups, each said memory field location having means for storing coded electrical signals representing a restriction on an individual originating station from access to certain of said operational functions while permitting access to other operational functions, and processor means for addressing said memory fields in response to coded electrical signals representing an originating station, and for addressing said table structure in response to the combination of (1) coded electrical signals repesenting a dialed number received from said originating station and (2) coded electrical signals identifying the customer group of said originating station, to provide restricted class of service information as to said originating station, the location in said data base memory means designated by the dialed number, and the specific instruction coded electrical signals stored therein, when said originating station is unrestricted from access to the operational function designated thereby, said processor means including means responsive to command signals based on said specific instruction coded electrical signals for executing the specific system operational function designated thereby.

20. In a telecommunication switching system adapted to be connected to lines and trunks, said system having a digital switching network, and a control complex for executing system operational functions in response to dialed numbers included within a comprehensive directory number plan, one of said operational functions comprising processing a standard call between stations on said lines, utilizing said digital switching network, the improvement wherein said control complex comprises:

processor means operable under program control of separate programs and interconnected with said network, separate program memory means for said processor means for storing said separate programs, said separate program memory means including programs stored among more than one of said separate program memory means which, when executed by said processor means in sequence, combine to provide said operational functions;

means for invoking programs from said program memory means to carry out preliminary steps, common to all said operational functions, in response to coded electrical signals representing an originating station going off-hook, and means receptive to specific command signals generated in response to a directory number dialed by said originating station after going off-hook for selecting other programs from said program memory means for carrying out further steps unique to a specific one or another of said operational functions.

21. An arrangement in a telecommunication switching system, having an improved control complex as set forth in claim 20, which further comprises:

data base memory means connected to said processor means providing a plurality of addressed memory locations with each of said locations pre-assigned to and addressed by coded electrical signals representing a directory number, and providing means for storing coded electrical signals representing an instruction to carry out a designated one of said operational functions, said processor means including means operable under said programs invoked in response to said originating station going off-hook for carrying out said preliminary steps including connecting said originating station to register means for collecting dialed digits of a directory number, for addressing said data base memory means in response to the digits of a dialed number received by said register means, to provide the location pre-assigned to said dialed number, for reading instruction coded electrical signals from said pre-assigned location, and for transmitting coded electrical signals representing a specific command based on said instruction signals to operate said program selecting means to select said other programs for carrying out said further steps, any one or more of said memory locations being pre-assignable to any one or more directory numbers in said plan so that a dialed number results in the execution of one of the different operational functions represented by instruction signals stored in said locations in said data base memory means.

22. In a microprocessor control means for use with telephone switching exchange means comprising a plurality of microprocessor means distributed in a spaced multiprocessor configuration, each microprocessor means having associated stored program memory means containing predetermined selectible data programs, a first of said microprocessor means comprising state microprocessor means having a communication path to said switching exchange means for receiving current party conditions and changed party conditions for input to said associated stored program memory means therefor, and for providing first output signals to said switching exchange means from said associated program memory means therefor, said first output signals selectively controlling the operations of said switching exchange means in accordance with a predetermined one of said selectible data programs of said stored program memory means thereof responsive to either said received current party conditions or to said received changed party conditions, said state microprocessor means further providing second and third output signals therefrom, a second of said microprocessor means comprising register microprocessor means having a signal path to said switching exchange means for receiving signals representing dialed numbers therefrom for input to said associated stored program memory means therefor, and a communication path to said state microprocessor means for receiving said second output signals therefrom for input to said associated stored program memory means therefor, said second output signals causing said register microprocessor means to process data in accordance with a predetermined one of said selectible data programs of said stored program memory means thereof, and said register microprocessor means providing signals representing dialed numbers as first output signals therefrom, and a third of said microprocessor means comprising data base microprocessor means having a communication path to said state microprocessor means for receiving said third output signals therefrom for input to said associated stored program memory means therefor, said third output signals causing said data base microprocessor means to process data in accordance with a predetermined one of said selectible data programs of said stored program memory means therefor, and having a communication path to said state microprocessor means for providing dialed number translation signals and class-of-service signals responsive to said dialed number signals, and having a communication path to said register microprocessor means for receiving said dialed number signals comprising said first output signals from said register microprocessor means causing said second microprocessor means to process data in accordance with another predetermined one of said selectible data programs of said stored program memory means therefor, the improvement wherein said data base microprocessor means has associated data base memory means providing addressed locations storing coded electrical signals representing instructions designating system functions, and said dialed number translation signals from said data base microprocessor means to said state microprocessor means comprise commands based on stored instruction signals retrieved from said data base memory means in response to dialed number signals, said data microprocessor means being operable to provide said first output signals under control of programs of said stored program memory means thereof selected in response to said commands to perform system operational functions by controlling the operation of said switching exchange means.

23. In a microprocessor control means for a telephone switching system having switching network means supervised by network controller means providing sense and control point pair means for deriving and terminating information respectively, said microprocessor control means comprising first microprocessor means including first memory means and first interprocessor buffer means for monitoring said sense points, writing said control points and storing the current status for all lines, trunks and registers of the switching system and providing next states-of-call therefor, second microprocessor means including second memory means and second interprocessor buffer means for controlling a plurality of registers to accept and process dialing information, third microprocessor means including third memory means and third interprocessor buffer means for performing dialed number translations, and means for selectively interconnecting said interprocessor buffers to exchange data between said microprocessor means for controlling said telephone switching system; the improvement in said means for performing dialed number translations comprising: data base memory means for correlating system operational functions and dialed numbers including a plurality of addressed locations, each of said locations providing means for storing coded electrical signals representing an instruction designating a specific operational function, each of said locations having an address employing digits of a directory number and said third microprocessor means including means for addressing said data base memory means in response to a dialed directory number to retrieve a designated instruction, said third microprocessor means providing commands based on retrieved instructions to other of said microprocessor means, for controlling said switching system.

24. In a telecommunication switching system having a plurality of asynchronously operating microprocessor control units, means for distributing the functions of the system among said control units, each microprocessor control unit including a microprocessor, memory means for causing the microprocessor to perform the functions distributed thereto, and interprocessor buffer means for communicating between microprocessors independently of at least one of the communicating microprocessors, said microprocessor control units comprising, a line unit for control of line circuits, a trunk unit for control of trunk circuits, a register unit for processing dialing information, and a state unit; the improvement wherein:

one of said control units comprises a data base unit for performing dialed number translations including data base memory means for storing coded electrical signals correlating dialed numbers and system functions, said state unit providing means for maintaining a current status record and issuing commands to the others of said units including commands based on dialed number translations made by said data base unit by accessing said data base memory means for forwarded to said state unit.

25. In a telecommunication switching system adapted to be connected to lines and trunks, said system having: a switching network complex including circuits, hardware and a digital switching network; and control means including stored program operated processor means controlling said switching network complex to perform system operational functions to provide service to a multiplicity of stations on said lines, including the function of processing a standard call by establishing connections between said lines or between said lines and trunks via said digital switching network, improvements in said control means characterized by providing memory means storing programs to operate said processor means to control said switching network complex to carry out a set of said system operational functions, in response to a corresponding set of coded electrical signals each representing an instruction to said processor means to execute under program control all tasks for a specific operational function, said improved control means further including data base memory means correlating said system operational functions and dialed directory numbers by providing a plurality of addressed locations, each of said locations storing one of said set of coded electrical signals representing an instruction designating one of said set of operational functions, and having an address corresponding to a directory number, and said processor means being operative when a dialed directory number is received on a line or trunk to derive the coded electrical signals representing an instruction stored in the location addressed by the dialed directory number, and to carry out the tasks for the designated function.

26. In a telecommunication switching system, an improved control means according to claim 25, each of said locations in said data base memory means storing coded electrical signals correlating system operational functions and dialed directory numbers separately for each of a plurality of customer groups, said customer groups comprising groups of stations on discrete sets of lines served by said system, all customer groups sharing circuits and hardware associated with said switching network while all operational functions are normally separately executed for each customer group in response to dialed numbers included within a separate comprehensive number plan for each customer group, one of said operational functions comprising processing a standard call between stations on lines in the same customer group, each of said locations also having a customer group address corresponding to the customer group of the originating station.

27. In a telecommunication switching system, an improved control means according to claim 26, each of said locations in said data base memory means also providing for storing coded electrical signals correlating the same system operational function with dialed directory numbers originating from stations in different customer groups by having certain of said locations addressable from originating stations in different customer groups.

28. In a telecommunication switching system, an improved control means according to claim 25, said data base memory means comprising means for storing data in a table structure of separate groups of locations for each customer group of stations, each of said locations being addressable by the combination of a directory number and a number identifying one or more originating stations customer groups, to provide selective cross-over between customer groups.

29. In a telecommunication switching system, an improved control means according to claim 25, wherein said directory numbers are included in a comprehensive number plan, and one of said operational functions comprises processing a standard call between said stations on lines served by said network, and wherein said addressed locations are included in a first level of a multiple level linked table structure, said first level of said table structure providing separate blocks of said locations, each of said locations in each of said separate blocks having a directory number address employing certain digits of the directory number, said table structure having a second level of locations, each location in said second level having a directory number address employing other digits of the directory number and containing a pointer to one of said blocks of said first level, any one or more of said memory locations being preassignable to any one or more directory numbers in said plan so that a dialed number results in the execution of one of the different operational functions represented by instruction representing signals stored in said locations in said data base memory means table structure first level.

30. In a telecommunication switching system, an improved control means according to claim 25, wherein said directory numbers are included in a separate comprehensive directory number plan for each of a plurality of separate customer groups, said customer groups comprising groups of stations on discrete sets of lines served by said system, all customer groups sharing circuits and hardware associated with said switching network while all operational functions are normally separately executed for each customer group in response to dialed directory numbers, one of said operational functions comprising processing a standard call between stations on lines in the same customer group, and wherein said addressed locations are included in discrete groups corresponding to respective customer groups distributed throughout a first level of a multiple level linked table structure, said first level of said table structure providing separate blocks of said locations, each of said locations in each of said separate blocks having a directory number address employing certain digits of the directory number, said table structure having an entry level block of locations, each location in said entry level block of locations having a customer group identification number address, pointers linking said entry level and said first level, the combination of a pointer and a directory number address serving to locate an instruction to correlate operational functions and directory numbers separately for each customer group.

31. In a telecommunication switching system, an improved control means according to claim 25, wherein system operational functions are executed in response to dialed numbers included within a comprehensive directory number plan, further including:

means for selecting programs from said program memory means to carry out a designated one of said operational functions in response to specific command signals;

wherein said locations providing means for storing coded electrical signals are pre-assigned to and addressed by coded electrical signals representing a directory number, and said coded electrical signals represent an identifier word with a group of bits the pattern of which represents an instruction to carry out a designated one of said operational functions; and wherein said processor means in operative under said stored programs and receptive to said directory number coded electrical signals for addressing said data base memory means in response to a dialed number to provide a location preassigned to said dialed number, for reading instruction signals from said pre-assigned location, any one or more of said memory locations being pre-assignable to any one or more directory numbers in said plan so that a dialed number results in the execution of one of the different operational functions represented by instruction signals stored in said locations in said data base memory means.

32. In a telecommunication switching system, an improved control means according to claim 25,
wherein said processor means is operative under control of separate groups of processor function related programs to control said switching network complex, and
separate program memory sections are provided for said separate groups of related programs, wherein programs stored among more than one of said separate program memory sections, are operative in combination to control said processor means to execute said system operational functions.

33. In a telecommunication switching system, an improved control means according to claim 32,
wherein said processor means comprise a plurality of independent processors operable asynchronously under control of said separate groups of programs for said processors, respectively, and interconnected with one another and said switching network complex.

34. In a telecommunication switching system, an improved control means according to claim 26,
wherein said data base memory means comprises a plurality of data fields in addition to said locations which form a table structure correlating system operational functions and directory numbers for each customer group of stations,
said data fields storing for individual stations in said customer groups, coded electrical signals representing originating and/or terminating class of service,
wherein said processor means is operative under said stored programs to address said memory fields in response to coded electrical signals representing an originating or a terminating station, and to address said table structure in response to the combination of (1) coded electrical signals representing a dialed number received from said originating station, and (2) coded electrical signals identifying the customer group of said originating station, to derive restricted class of service data as to said originating station, the location in said data base memory means designated by the dialed number, and the specific instruction in coded signal form stored therein, when said originating station is unrestricted from access to the operational function designated thereby,
said processor means being operative responsive to command signals based on said specific instruction to execute the specific system operational function designated thereby.

35. The arrangement defined in claim 25 wherein the improvements in said control means are further characterized in that said data base memory means is conditioned to store coded electrical signals representing the same instructions at a predetermined plurality of locations in such memory, whereby a given operational function may be carried out by fetching said same instruction in response to any one of a predetermined plurality of directory numbers.

* * * * *